(12) United States Patent
Gao et al.

(10) Patent No.: US 10,793,450 B2
(45) Date of Patent: Oct. 6, 2020

(54) POTENTIAL OF ZERO CHARGE-BASED CAPACITIVE DEIONIZATION

(71) Applicant: University of Kentucky Research Foundation, Lexington, KY (US)

(72) Inventors: Xin Gao, Lexington, KY (US); Ayokunle Omosebi, Lexington, KY (US); James Richardson Landon, Lexington, KY (US); Kunlei Liu, Lexington, KY (US)

(73) Assignee: UNIVERSITY OF KENTUCKY RESEARCH FOUNDATION, Lexington, KY (US)

( * ) Notice: Subject to any disclaimer, the term of this patent is extended or adjusted under 35 U.S.C. 154(b) by 210 days.

(21) Appl. No.: 14/757,209

(22) Filed: Dec. 3, 2015

(65) Prior Publication Data

US 2016/0167984 A1 Jun. 16, 2016

Related U.S. Application Data

(60) Provisional application No. 62/086,857, filed on Dec. 3, 2014, provisional application No. 62/195,578, filed on Jul. 22, 2015.

(51) Int. Cl.
*C02F 1/469* (2006.01)
*C02F 1/461* (2006.01)

(52) U.S. Cl.
CPC .. *C02F 1/4691* (2013.01); *C02F 2001/46138* (2013.01); *C02F 2209/05* (2013.01)

(58) Field of Classification Search
CPC .................................................... C02F 1/4691
See application file for complete search history.

(56) References Cited

U.S. PATENT DOCUMENTS

| | | | |
|---|---|---|---|
| 4,997,804 | A | 3/1991 | Pekala |
| 5,789,338 | A | 8/1998 | Kaschitter et al. |
| 6,127,306 | A | 10/2000 | Hüsing et al. |
| 6,666,935 | B1 | 12/2003 | Simpson et al. |
| 6,695,986 | B1 | 2/2004 | Rolison et al. |
| 6,697,249 | B2 | 2/2004 | Maletin et al. |

(Continued)

FOREIGN PATENT DOCUMENTS

| | | |
|---|---|---|
| EP | 1555244 A2 | 7/2005 |
| WO | 03057367 A2 | 7/2003 |

(Continued)

OTHER PUBLICATIONS

"Evaluation of Operational Parameters for a Capacitive Deionization Reactor Employing Asymmetric Electrodes" by Lado et al., Sep. Purif. Technol. 133, pp. 236-245 (2014).*

(Continued)

*Primary Examiner* — Salil Jain
(74) *Attorney, Agent, or Firm* — Cantor Colburn LLP

(57) ABSTRACT

The invention is a capacitive, aka electrostatic, deionization apparatus and method that solves the problem of short lifetime of conventional capacitive deionization (CDI) and of membrane capacitive deionization (MCDI) devices and methods by shifting the Potential of Zero Charge of electrode surfaces through surface modifications. Such electrode surface modifications provide very long lifetime capacitive deionization devices and methods.

13 Claims, 57 Drawing Sheets

(56) References Cited

U.S. PATENT DOCUMENTS

| | | |
|---|---|---|
| 7,212,397 B2 | 5/2007 | Lang |
| 7,312,174 B2 | 12/2007 | Regalbuto et al. |
| 7,505,250 B2 | 3/2009 | Cho et al. |
| 8,143,471 B2 | 3/2012 | Fan |
| 8,261,891 B2 | 9/2012 | Thebault et al. |
| 8,497,225 B2 | 7/2013 | Zhamu et al. |
| 8,557,212 B2 | 10/2013 | Pak et al. |
| 2008/0078673 A1 | 4/2008 | Elson et al. |
| 2009/0303660 A1 | 12/2009 | Nair et al. |
| 2010/0190639 A1 | 7/2010 | Worsley et al. |
| 2011/0147197 A1 | 6/2011 | Xie |
| 2012/0028798 A1 | 2/2012 | Worsley et al. |
| 2012/0077006 A1 | 3/2012 | Worsley et al. |
| 2012/0228545 A1 | 9/2012 | Ebert et al. |
| 2012/0238445 A1 | 9/2012 | Ebert et al. |
| 2013/0040229 A1 | 2/2013 | Grigorian et al. |

FOREIGN PATENT DOCUMENTS

| | | |
|---|---|---|
| WO | 2004028680 A1 | 4/2004 |
| WO | 2013136034 A1 | 9/2013 |

OTHER PUBLICATIONS

"Enhanced Charge Efficiency in Capacitive Deionization Achieved by Surface-Treated Electrodes and by Means of a Third Electrode" by Cohen et al., J. Phys. Chem. C 115, pp. 19856-19863 (2011).*

"Asymmetric Electrode Configuration for Enhanced Membrane Capacitive Deionization" by Omosebi et al., ACS Appl. Mater. Interfaces 6, pp. 12640-12649 (2014).*

"Capacitive Deionization as an Electrochemical Means of Saving Energy and Delivering Clean Water. Comparison to Present Desalination Practices: Will it compete?" by Anderson et al., Electrochim. Acta 55, pp. 3845-3856 (2010).*

"Synthesis and Characterization of Asymmetric Electrochemical Capacitive Deionization Materials Using Nanoporous Silicon Dioxide and Magnesium Doped Aluminum Oxide" by Leonard et al., Electrochim. Acta 54, pp. 5286-5291 (2009).*

"Continuous Operation of Membrane Capacitive Deionization Cells Assembled with Dissimilar Potential of Zero Charge Electrode Pairs" by Omosebi et al., J. Colloid Interface Sci. 446, pp. 345-351 (2015).*

"Ion-selective Carbon Nanotube Electrodes in Capacitive Deionisation" by Yang et al., Electrochimica Acta 91, pp. 11-19, (2013).*

Avraham et al, The Dependence of the Desalination Performance in Capacitive Deionization Processes on the Electrodes PZC, J. Electrochem. Soc. 158 p. 168, 2011.*

Gao, et al.; "Enhancement of the charge efficiency for a capacitive deionization cell using carbon xerogel with modified potential of zero charge"; Electrochemistry Communications, vol. 39, Feb. 2014, pp. 22-25.

Gao, et al.; "Dependence of the Capacitive Deionization Performance on Potential of Zero Charge Shifting of Carbon Xerogel Electrodes during Long-Term Operation"; Journal of the Electrochemical Society, vol. 39, 2014, pp. E159-E166.

Gao, et al.; "Surface charge enhanced carbon electrodes for stable and efficient capacitive deionization using inverted adsorption-desorption behavior"; Energy & Environmental Science, vol. 8, 2015, pp. 897-909.

Omosebi, et al.; "Asymmetric Electrode Configuration for Enhanced Membrane Capacitive Deionization"; ACS Applied Materials & Interfaces, vol. 6, 2014, pp. 12640-12649.

Omosebi, et al.; "Continuous operation of membrane capacitive deionization cells assembled with dissimilar potential of zero charge electrode pairs"; Journal of Colloid and Interface Science, vol. 446, 2015, pp. 345-351.

Gao, et al.; "Enhanced Salt Removal in an Inverted Capacitive Deionization Cell Using Amine Modified Microporous Carbon Cathodes"; Environmental Science & Technology, vol. 49, 2015, pp. 10920-10926.

International Search Report in PCT counterpart app, PCT/US20151000142. All "A" references. No "X" or "Y" references.

Extended European Search Report in counterpart EP app No. 15 864 882.

A.Omosebi, X.Gao, J.Rentschler, J.Landon, and K.Liu, "Continuous operation of membrane capacitive deionization cells assembled with dissimilar potential of zero charge electrode pairs". J.Colloid. Interface Sci.446 (2015) 344-350.

I.Cohen, E.Avraham, M.Noked, A.Soffer and D.Aurbach, "Enhanced Charge Efficiency in Capacitive Deioinization Achieved by Surface-Treated Electrodes adn by Means of a Third Electrode" J.Phys. Chem., 2011. 115. 19856-19863.

Baumann, Theodore F., et al. "High surface area carbon aerogel monoliths with hierarchical porosity." Journal of Non-Crystalline Solids 354.29 (2008): 3513-3515.†

Hatzell, Marta C., et al. "Effect of strong acid functional groups on electrode rise potential in capacitive mixing by double layer expansion." Environmental Science & Technology 48.23 (Nov. 3, 2014): 14041-14048.†

Avraham, Eran, et al. "The dependence of the desalination performance in capacitive deionization processes on the electrodes PZC." Journal of the Electrochemical Society 158.12 (2011): p. 168-p. 173.†

\* cited by examiner
† cited by third party (a) capacitive deionization (CDI)

(b) inverted capacitive deionization (i-CDI)

- Cation
- Anion
- H$_2$O
- Current Collector
- Carbon Electrode
- AEM
- CEM

- Cation
- Anion
- H$_2$O
- Current Collector
- Carbon Electrode
- AEM
- CEM

- Cation
- Anion
- H$_2$O
- Current Collector
- Carbon Electrode
- AEM
- CEM
- Positive Surface Charge
- Negative Surface Charge

- Cation
- Anion
- H$_2$O
- Current Collector
- Carbon Electrode
- AEM
- CEM
- Positive Surface Charge
- Negative Surface Charge

POTENTIAL OF ZERO CHARGE-BASED CAPACITIVE DEIONIZATION

RELATED APPLICATIONS

This application claims the benefit under 37 CFR 1.78 of U.S. provisional patent application No. 62/086,857, filed 3 Dec. 2014, and U.S. provisional patent application No. 62/195,578, filed 22 Jul. 2015.

FEDERAL FUNDING AND JOINT RESEARCH AGREEMENT

The research leading to the invention disclosed herein was partially funded by U.S. Dept. of Energy contract no. DE-PI0000017, which contract provides partial funding for a Joint Research Agreement among the University of Kentucky, West Virginia University Research Corporation, Huazhong University of Science and Technology, and 26 additional parties listed at http://www.us-china-cerc.org/Advanced_Coal_Technology.html.

BACKGROUND OF THE INVENTION

Field of the Invention

The field of the invention is capacitive, aka electrostatic, deionization devices and methods used to remove salt and other ions from solutions.

Definitions

"Adsorption" means attracting ions in an input stream to, and retaining those ions on an electrode surface.

"aMCDI" means a CDI cell in which each electrode is surrounded by a membrane and in which either or both the anode and cathode contain surface-charge enhanced surfaces.

"AMX-CDI" means a CDI cell in which each anode is covered by an anion exchange membrane while the cathode remains uncovered.

"AMX-aCDI" means a CDI cell in which each anode is covered by an anion exchange membrane while the cathode is uncovered and contains negative surface charge.

"BET surface area" means surface area determined by the Brunauer-Emmett-Teller method, which is a physical adsorption-based method using nitrogen to determine the surface area of a material.

"Capacitive deionization" means removing ions from an input stream to a cell by adsorption, and passing the deionized stream to the cell output.

"Capacitive deionization cell" means a cell that uses electrostatic forces to adsorb ions from an input stream. In a "traditional" or "conventional" capacitive deionization cell, a positive voltage is applied to an anode electrode, and a negative voltage is applied to a cathode electrode, to cause adsorption of negative ions to the anode and positive ions to the cathode while the voltages are applied.

"Cell" means a plurality of electrodes exposed to an input stream, with an outlet for the output stream/waste stream, a short-circuit switch or power supply attached to the electrodes, and a means of controlling the power supply. A cell can optionally include a means of controlling the input stream and the output stream/waste stream.

"Charging potential" means a voltage applied to, or inherent in surface functional groups of, an electrode of a cell and which causes movement of ions in the input stream of a cell to an electrode.

"CMX-CDI" means a CDI cell in which each cathode is covered by a cation exchange membrane while the anode remains uncovered.

"CMX-aCDI" means a CDI cell in which each cathode is covered by a cation exchange membrane while the anode is uncovered and contains positive surface charge.

"Conductivity" means the electrical conductivity of an input stream, output stream, or a waste stream. Conductivity is a surrogate measurement for the molarity of ions in an output stream or waste stream. Conductivity is directly proportional to molarity of ions in such streams.

"Co-ion" means, in a CDI cell, an anion that is attracted to a cathode when the cathode's potential is higher than its $E_{PZC}$ and a cation that is attracted to an anode when the anode's potential is lower than its $E_{PZC}$.

"Counter-ion" means a negative ion that is attracted to a positively charged electrode and a positive ion that is attracted to a negatively charged cathode.

"CX" means carbon xerogel. CX electrodes possess a mesoporous structure with a nominal surface area of ~200 $m^2/g$.

"Cycle" means a cycle of operation, adsorption followed by desorption, of a capacitive deionization cell.

"Deionization" means removing ions in an input stream by adsorption to an electrode surface and passing the deionized stream as output.

"Deionization cell" means a cell that removes ions from an input stream. Deionization cells are of various types, e.g., traditional, MCDI, aMCDI, i-CDI.

"Desorption" means releasing adsorbed ions from an electrode and into a waste stream.

"Discharging potential" means a reduced or reversed polarity voltage applied to, or inherent in surface functional groups of, an electrode of a cell to cause desorption of ions from the electrode into a waste stream.

"Electrode" means a material, typically porous carbon, which is electrically conductive.

"i-CDI cell" means an "inverted" capacitive deionization cell according to the invention disclosed herein.

"$E_{PZC}$" or "potential of zero charge", mean the potential of an electrode at which there is a minimum in ion adsorption at the surface.

"$E_o$" is the potential vs. a reference electrode of a capacitive deionization cell when the electrodes are short-circuited (i.e., $E_o$ is the potential during a short-circuit condition).

"Flow rate" means the flow rate, typically in L/hr, ml/min, etc., of an input, output, or waste stream.

"Input stream" means a liquid, typically water containing various ions, admitted to a cell.

"MCDI cell" means a CDI cell in which each electrode is surrounded by a membrane.

"Membrane" means a carbon or carbon-based fabric or coating affixed or applied to an electrode.

"N-" means negative surface charge, e.g., N-CX means a carbon xerogel electrode with net negatively charged surface groups.

"Output stream" means a liquid that has passed through an adsorbing deionization cell and contains a lower molarity of ions than in the input stream.

"P-" means positive surface charge, e.g., P-CX means a carbon xerogel electrode with net positively charged surface groups.

"$pH_{PZC}$" means the pH of a solution at a given $E_{PZC}$ determined by varying the pH of the solution.

"Polarization window" means the span or range of potentials/voltages used to conduct deionization (adsorption) and regeneration (desorption) of a capacitive deionization cell.

"Polarity" means the polarity of a DC voltage, either positive or negative.

"Pristine" in reference to electrodes means without surface modifications; for example, a Spectracarb electrode, as supplied by the manufacturer, is pristine.

"Purify" means to remove ions from an input stream. Purification includes water softening, i.e., the removal of calcium, magnesium, and certain other metal cations in hard water.

"Relocation" of an $E_{PZC}$ is a change in potential (aka "location") of the $E_{PZC}$, as shown in a cyclic voltammogram, of an electrode by accumulation of adsorption/desorption cycles.

To "shift" or "position" of an $E_{PZC}$ means to alter the potential (aka "location") of the $E_{PZC}$ of an electrode by intentional chemical or electrochemical modification of the electrode surface.

"SC" means Spectracarb carbon electrode, a carbon electrode commonly used as a reference electrode, e.g., in cyclic voltammetry.

"SCE" means a saturated calomel electrode, a standard reference electrode.

"Si-CX" means silica-coated carbon xerogel.

"Surface-charge enhanced surface" means an electrode surface that has been treated.

"Treat" means to modify an electrode surface to shift the $E_{PZC}$ of the electrode as disclosed herein.

"Untreated" means an electrode without an electrode surface modification disclosed herein, i.e., a pristine carbon electrode.

"Voltage" and "potential" are synonymous herein. Voltage is direct current ("DC") unless otherwise specified.

"Waste stream" means a liquid that has passed through a desorbing deionization cell and contains a higher molarity of ions than in the input stream.

"Zeta potential" is the potential difference between a dispersion medium and the fluid surrounding the dispersed particle.

Related Art

As population increases and water demand continues to rise around the globe, access to potable drinking water will also increase in importance. To meet water standards for consumption, agriculture, power plants, or one of many other uses, numerous water purity conditions must be met, including level of salt content. Salt content is difficult to separate by conventional filtration methods due to the small molecular size of most salts. Many other dissolved ionic compounds are also challenging to separate via typical chemical precipitation routes. Dissolved ions such as $Na^+$, $K^+$, $Ca^{2+}$, $Fe^{2+}$, $Fe^{3+}$, $Cu^{2+}$, $Mg^{2+}$, $Cl^-$, $SO_4^{2-}$, and $NO_3^-$ are commonly found in water sources and require specific separation methods in order to produce purified water. Conventional separation methods include multi-stage flash distillation (MSF) and reverse osmosis (RO). In MSF, water is separated from a salt water stream using a distillation process, wherein water is boiled and vapor collected to produce a pure water stream. While effective, this method is quite energy intensive and suffers from equipment corrosion issues. In RO, very small pore sizes are used to separate slightly smaller water molecules from larger hydrated salt molecules. This process requires a pressure gradient to overcome the osmotic pressure of the salt solution and to transport water across the semipermeable membrane to a purified permeate stream. While RO is typically more efficient than MSF, it requires pumps capable of higher pressures and is subject to organic, biological, and precipitation-based fouling of the membrane surface, which ultimately limits the lifetime of the separation process and increases the expense, especially at municipal scale.

Capacitive deionization (CDI) is an emerging separation process that relies on the use of electrostatics to separate dissolved salts from water/aqueous solution. In conventional CDI, an electrical potential is applied to a pair of (typically) carbon electrodes with the anode defined as the electrode to which a positive potential is applied and the cathode as the electrode to which a negative potential is applied. In this conventional CDI process, negative ions or anions, such as $Cl^-$ and $SO_4^{2-}$, are attracted to the positively-polarized electrode (anode) while positive ions or cations, such as $Na^+$ and $Ca^{2+}$, are attracted to the negatively-polarized electrode (cathode) as shown in FIG. 1. When the carbon electrodes are saturated with salt/ions, the applied potential is reduced, short-circuited, removed, or reversed (either manually or under computer control) to desorb these ions into a concentrated waste stream. When the cell potential is reduced, short-circuited, or removed, the driving force for ion adsorption is subsequently reduced at the carbon surface, resulting in ion desorption. Desorption (removal of ions from the electrode surface) regenerates the carbon for adsorption/separation of more ions after voltage is reapplied to the electrodes (desorption of the electrode surface is not complete in a traditional CDI, as explained below). To accelerate desorption, the voltage polarity applied to the electrodes can be reversed: a reversed polarity (negative to anode, positive to cathode) voltage on the electrode surface will repel co-ions, resulting in faster ion desorption compared with an open circuit, short circuit, or reduced voltage of non-reversed polarity. Initial applied potentials for adsorption are typically between 0-2.0 V, but values up to 3.0 V have been reported. In this manner, salt can be periodically removed from solution and desorbed into a concentrated waste stream.

Separation of Aqueous Sodium Chloride with Traditional CDI

While this process sounds relatively simple, in actuality, the separation process is more complex, e.g., changing surface electrode properties substantially changes the salt separation process. The carbon electrodes used in a CDI process are typically designed to be inert, high surface area (i.e., very porous), and conductive electrodes for the adsorption and desorption of ions while being modulated by an applied electrical potential. The application of an electric potential to a carbon electrode changes the properties of most carbon electrodes. As shown in FIG. 2, initially, salt is adsorbed in a CDI cell with an applied electrical potential (shaded regions) with conductivity of the output stream decreasing with an applied potential (a decrease in conductivity of the output stream means that total adsorption of ions is increasing) and then desorbed when the cell is short-circuited (non-shaded regions). There is a peak when a voltage is applied (an initial spike to a lowest a (conductivity) upon application of potential, shown in the shaded areas of FIG. 2) and a reverse peak when a voltage is removed (or reversed or decreased, shown by a spike to a highest a (conductivity) upon short circuit of the electrodes in FIG. 2, shown in the unshaded areas of FIG. 2); FIG. 2 shows the alternate application of a charging potential to the electrodes (shaded areas) and then a short circuit of the electrodes (unshaded areas)). This experiment was carried out using ~4 g of carbon xerogel electrodes, 1.5 mm silicone spacers, 2 L of 4.3 mM $N_2$ deaerated NaCl solution, adsorption and desorption times of 30 min each, a charging potential of 1.2 V, a discharging potential of 0 V (short circuit), and a flow rate of 75 ml $min^{-1}$. FIG. 2 shows the first 7 cycles of a CDI process. While initially stable, with repeated cycling, this adsorption-desorption behavior begins to change: the higher σ (less reduction in conductivity) after a charging potential is applied means that far fewer ions are being adsorbed. Shown in FIG. 3 is the salt removal response of a CDI cell after 227 cycles. After 227 cycles, it is clearly evident that the steady state concentration difference in conductivity, as reflected in an essentially flat conductivity, σ, profile, with and without an applied potential: change in conductivity has decreased to almost zero, i.e., in both the shaded (1.2 V applied) and non-shaded (0 V, short circuited) regions, the steady state conductivity or level of salt content is nearly the same. The inversion peak upon applied voltage, denoted in FIG. 3, is indicative of inefficiency in the separation process that results in decreased net salt removal from the input stream. This means that the CDI cell is no longer functioning as a salt separation device: it has reached the end of device life and must be replaced. When salt adsorption capacity (in mg of salt per gram of carbon electrode) is plotted as a function of cycle number, the result is shown in FIG. 4. Salt adsorption capacity, Γ, is defined in equation 1 as:

$$\Gamma = (\Delta \sigma MV)/(mc) \quad (1)$$

where σ is the conductivity difference with and without an applied potential, M is the molecular weight, V is the solution volume, m is the mass of carbon electrodes, and c is a calibration constant for salt concentration vs. conductivity. Clearly in FIG. 4, the salt adsorption capacity of the carbon electrodes to adsorb salt continually degrades until no separation is seen. This degradation process is not unique to the carbon used in this example, but has also been shown for carbon xerogel, Spectracarb activated carbon cloth, and Zorflex® activated carbon cloth, making this degradation process almost universal for carbon in a conventional CDI system. The charge efficiency, Λ, is a measure of the separation efficiency of the overall process where one mole of electrons would remove one mole of salt in a perfectly efficient system. The charge efficiency is defined in equation 2 as:

$$\Lambda = (\Gamma F/M)/(Q_{ad}) \quad (2)$$

where Γ is the salt adsorption capacity, F is Faraday's constant, M is the molecular weight, and $Q_{ad}$ is the total charge passed during charging. Shown in FIG. 5 is a loss in the charge efficiency as the salt adsorption capacity decreases to zero. In order to commercialize an electrostatic separation (aka capacitive deionization) process, dramatic increases in the cell lifetime are required. In an automotive analogy, a CDI cell gets terrible gas mileage and is not economically acceptable. If a CDI cell were implemented with a current CDI cell lifetime of 10 days, and if each CDI cell costs $5000, the 2-year cell replacement cost would be $365,000, reflecting cell replacement every 10 days (but excluding labor and administrative costs), an obviously unacceptable value. CDI cell life depends upon total cycles, so actual CDI cell life can be much shorter than 10 days.

Research in carbon electrodes has focused on the improving the porosity of carbon materials with which to construct supercapacitor electrodes, but research has not been conducted that would be particularly relevant to ionic separation and water purification. Known advancements to the conventional CDI system include new cell designs, asymmetric electrode coatings, and the application of ion-exchange membranes. Probably the most successful advancement in capacitive deionization technology known before the invention disclosed herein has been the addition of ion-exchange membranes to form membrane capacitive deionization (MCDI). MCDI cells provide not only a more stable separation process but also higher salt adsorption capacities. However, the addition of membranes to the conventional CDI cell increases overall cell cost dramatically, making commercial success at a large-scale much more difficult, and does not address the underlying cumulative (aggregate cycle dependent) degradation process (i.e., short cell life, aka deactivation) for a conventional CDI cell shown in FIG. 4.

SUMMARY OF THE INVENTION

The technical problem to be solved is to provide a capacitive, aka electrostatic, deionization apparatus and method that solves the problem of short lifetime of conventional capacitive deionization (CDI) and of membrane capacitive deionization (MCDI) devices and methods. The solution disclosed herein (i) properly characterizes previously misunderstood cumulative relocation of electrode $E_{PZC}$s and (ii) electrode surface modifications that provide very long lifetime capacitive deionization devices and methods. Unlike prior art devices, the electrode surfaces of the "inverted capacitive deionization" ("i-CDI") devices disclosed herein are restored after each desorption to minimum ion conditions (i.e., essentially as adsorptive as at the first cycle of use), thereby providing capacitive deionization cells of vastly improved separation lifetime. Moreover, the discharging phase of the disclosed method can generate electricity by discharge of capacitance in i-CDI cells. The results obtained from long-term CDI tests demonstrate the importance for obtaining targeted and stable surface chemistry in the construction of an electrostatic-based separation cell.

The inventors herein disclose, for the first time, among other embodiments, an electrostatic separation process (aka capacitive deionization process) that utilizes pretreated, oxidized carbon anodes in the construction of a stable salt separation process, thereby mitigating the degradation and short cell lifetime issues seen in previous CDI and MCDI devices and methods. The invention disclosed herein utilizes improvements in "electrode surface charge" technology, specifically positioning (aka "shifting") the "potential of zero charge" ($E_{PZC}$), in assessing and improving the capacity, charge efficiency, and cell life of capacitive deionization cells and capacitive-based ion separation processes. The invention disclosed herein provides a cell with salt separation efficiency for substantially longer time periods than that seen for prior CDI and MCDI cells. The inventors' research has focused on (i) electrode surface modification chemistry to improve the charge storage capacity and charge efficiency of electrodes for ionic separation and water purification, and (ii) how, and how much, to shift the $E_{PZC}$ of anodes and cathodes. There has been no research, other than the inventors' publications, on modifying electrode surface charge as a means of improving capacitive deionization technology.

A first embodiment of the invention comprises a structure comprising at least one inlet, at least one outlet, at least one anode, at least one cathode, a switch operating to apply a short circuit or a user selectable DC constant voltage or constant current to at least one anode and to at least one cathode, and with an ionic solution admitted through the inlet and discharged through the outlet, which ionic solution is deionized by contact with at least one anode and at least one cathode, wherein the location of the $E_{PZC}$ of at least one anode has been shifted by modification of the anode surface to an increased $E_{PZC}$. The modification of the anode results from a treatment selected from the group consisting of oxidation by exposure to acid, covalent attachment of functional groups that are negatively charged when in contact with the ionic solution and without voltage applied to the anode, covalent attachment of silica functional groups to an anode, attachment of sulfonic acid groups, and attachment of any surface functional group that can result in negative zeta potentials in ionic solutions.

A second embodiment of the invention comprises a structure comprising at least one inlet, at least one outlet, at least one anode, at least one cathode, a switch operating to apply a short circuit or a user selectable DC constant voltage or constant current to at least one anode and to at least one cathode, and with an ionic solution admitted through the inlet and discharged through the outlet, which ionic solution is deionized by contact with at least one anode and at least one cathode, wherein the location of the $E_{PZC}$ of at least one cathode has been shifted by modification of the cathode surface to a decreased $E_{PZC}$. The modification of the cathode results from a treatment selected from the group consisting of reduction by exposure to reducing treatments by $N_2$, Ar, and $H_2$, covalent attachment of functional groups are positively charged when in contact with the solution and without voltage applied to the cathode, covalent attachment of amine functional groups to a cathode, reduced carbon surfaces including carbon basal planes, attachment of alumina surface species, and attachment of any surface functional group that can result in positive zeta potentials in ionic solutions.

A third embodiment of the invention comprises a structure comprising at least one inlet, at least one outlet, at least one anode, at least one cathode, a switch operating to apply a short circuit or a user selectable DC constant voltage or constant current supply to at least one anode and to at least one cathode, and with an ionic solution admitted through the inlet and discharged through the outlet, which ionic solution is deionized by contact with the at least one anode and at least one cathode, wherein the location of the $E_{PZC}$ of at least one anode has been shifted by modification of the anode surface to an increased $E_{PZC}$, and wherein the location of the $E_{PZC}$ of at least one cathode has been shifted by modification of the cathode surface to a decreased $E_{PZC}$. The modification of the anode results from a treatment selected from the group consisting of oxidation by exposure to acid, covalent attachment of functional groups that are negatively charged when in contact with the ionic solution and without voltage applied to the anode, covalent attachment of silica functional groups to an anode, attachment of sulfonic acid groups to an anode, and oxidation treatments from heating in an $O_2$ environment or electrochemically, wherein the modification of the cathode results from a treatment selected from the group consisting of reduction by exposure to reducing treatments by $N_2$, Ar, and $H_2$, covalent attachment of functional groups are positively charged when in contact with the solution and without voltage applied to the cathode, covalent attachment of amine functional groups to a cathode, reduced carbon surfaces including carbon basal planes, and materials possessing positive zeta potentials in ionic solutions.

In all embodiments, anodes, cathodes, and ionic solution are contained in a structure with an inlet through which the solution (input stream) is admitted and permitted to contact the anode(s) and cathode(s), penetrations of electrical conductors through the structure to permit operation of a short circuit switch connected to the anode(s) and cathode(s) or application of user selectable voltage to the anode(s) and cathode(s), and an outlet in the structure through which deionized solution (output stream) or solution with desorbed ions (waste stream) is discharged from the structure. The structure is typically closed except for the inlet, outlet, and penetrations of electrical conductors to effect short-circuiting of, or application of voltage to, the anode(s) and cathode(s). The structure and its contents are called a deionization cell. In alternate embodiments, the switch and an internal power supply can be wirelessly controlled to avoid penetration of the structure by electrical conductors.

The degree of purification (deionization) of an input stream is controlled primarily by the total electrode surface area in a cell to which a given volume of input stream is exposed, the duration of exposure for adsorption of ions before desorption, the voltage (potentials) or current modulated in the system, and the working voltage window (described below). Controlling the degree of purification (deionization) through modulation of the current supplied or drawn from the deionization cell, or through modulation of voltage supplied or drawn from the deionization cell, enables fine adjustment of deionization.

Embodiments of the invention can be used to purify power plant wastewater, power plant cooling water, laundry wastewater, water to be purified for human consumption, water to be purified for agriculture, water to be purified for horticulture, water to be purified for use in food, water to be softened, sea water to be purified for human consumption, water to be purified for laboratory use, brackish water to be purified for human consumption or agriculture use, and water to be purified for medical use.

BRIEF DESCRIPTION OF THE DRAWINGS

FIG. 25A shows adsorption while potential is applied to the anode and cathode. FIG. 25B show desorption when the anode and cathode are at a potential of 0 V.

DETAILED DESCRIPTION OF THE PREFERRED EMBODIMENTS

Figure 6:
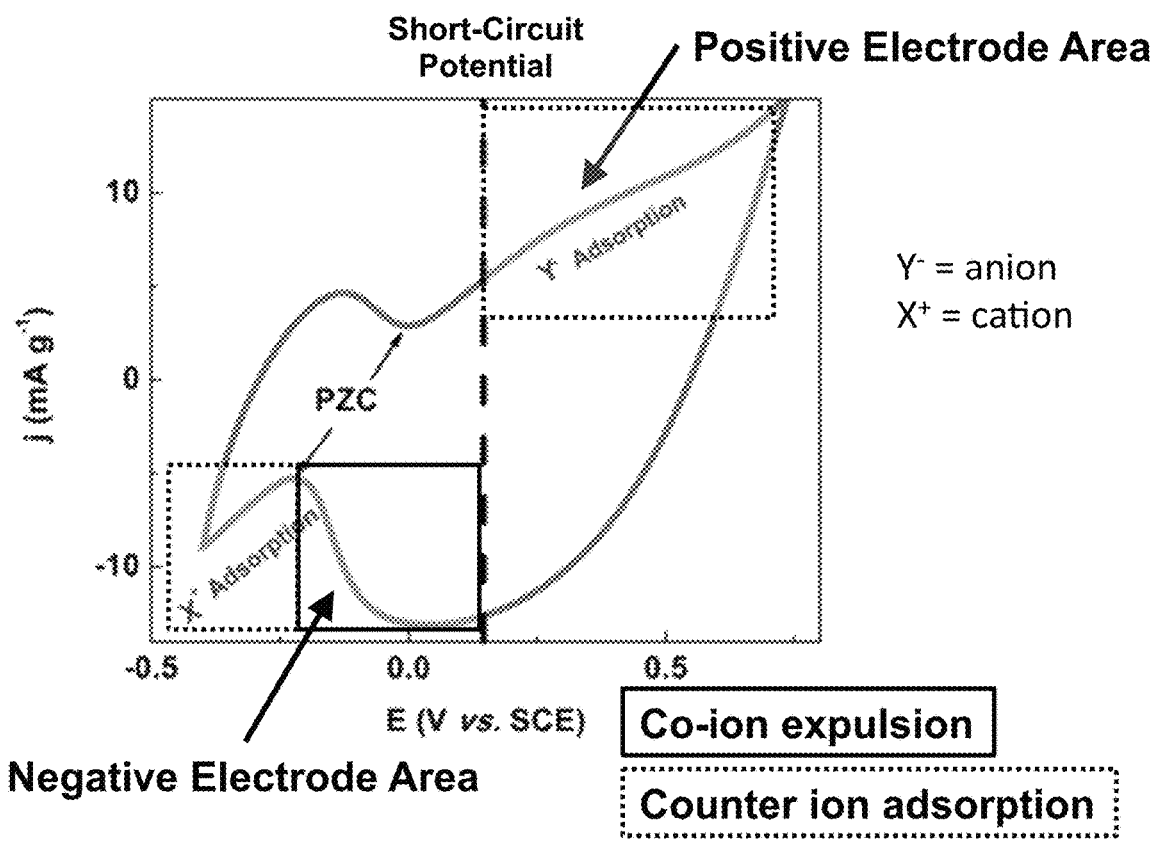
FIG. 6. Cyclic voltammogram (CV) of a pristine carbon xerogel electrode in $N_2$ deaerated 4.3 mM NaCl solution at 1 mV/s.

Shown in FIG. 6 is a cyclic voltammogram (CV) of a pristine carbon xerogel electrode in $N_2$ deaerated 4.3 mM NaCl solution with a scan rate of 1 mV/s. CVs differ from linear sweep voltammetry in that after the set potential is reached in a CV experiment, the working electrode's potential is ramped in the opposite direction to return to the initial potential. The current at the working electrode is plotted versus the applied voltage (i.e., the working electrode's potential) to give the cyclic voltammogram trace. The CV trace is typically a hysteresis, even for perfectly reversible mechanisms. Even reversible couples contain polarization overpotential and thus display a hysteresis trace when potential is ramped up from negative to positive and then ramped down from positive to negative, passing through an initial potential. This overpotential emerges from a combination of analyte (e.g., ion) diffusion rates and the intrinsic activation barrier of transferring electrons from the electrode to an analyte. Contrary to most capacitance curves seen for supercapacitors, which are mostly box-like in their appearance, CVs in more dilute electrolytes have considerably more "features". The inventors were the first to realize these features, particularly the relationship of potential of zero charge and desorption, could be exploited to improve capacitive deionization. A peak and a trough noted by "PZC" (denoted as "$E_{PZC}$" herein) are shown in FIG. 6. The peak and the trough denote the locations of the potential of zero charge, $E_{PZC}$, where an electrode has a minimum in charge storage or capacitance. If a potential is applied to the electrode to reach this $E_{PZC}$ region, the electrode will have a minimum in ion adsorption. In FIG. 6, to the right of short circuit potential, anion adsorption is promoted on the positive electrode, while to the left of the PZC on the negative electrode, cation adsorption is promoted. Therefore, in a capacitive deionization cell, where ion removal is the goal, the location of the $E_{PZC}$ is crucially important to efficient adsorption of ions; it was not previously recognized that the location of the $E_{PZC}$ is also crucial to desorption of ions.

Figure 1:
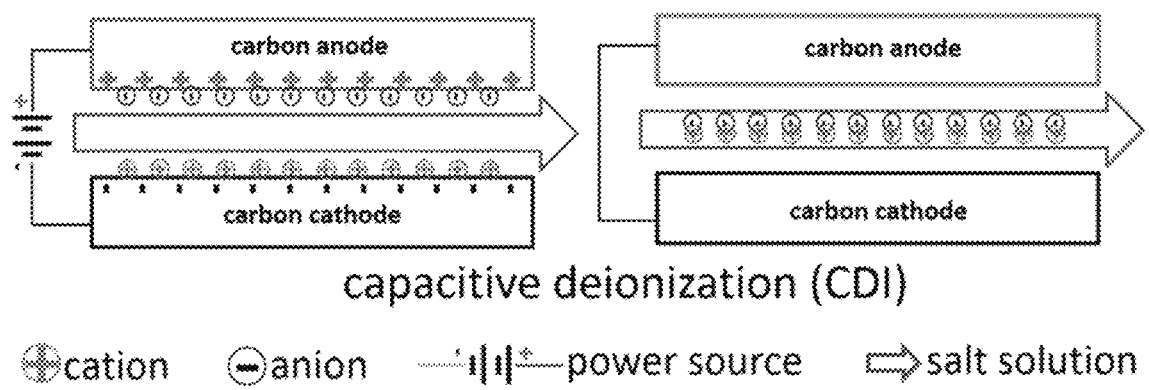
FIG. 1. Capacitive deionization (CDI) process where salt is adsorbed/removed under the influence of an applied potential (supplied here by a power source) and desorbed when the potential is reduced, short-circuited, removed, or reversed. The cell on the right side of FIG. 1 shows a short circuit of the anode and cathode, resulting is desorption of ions from the electrodes.
Figure 2:
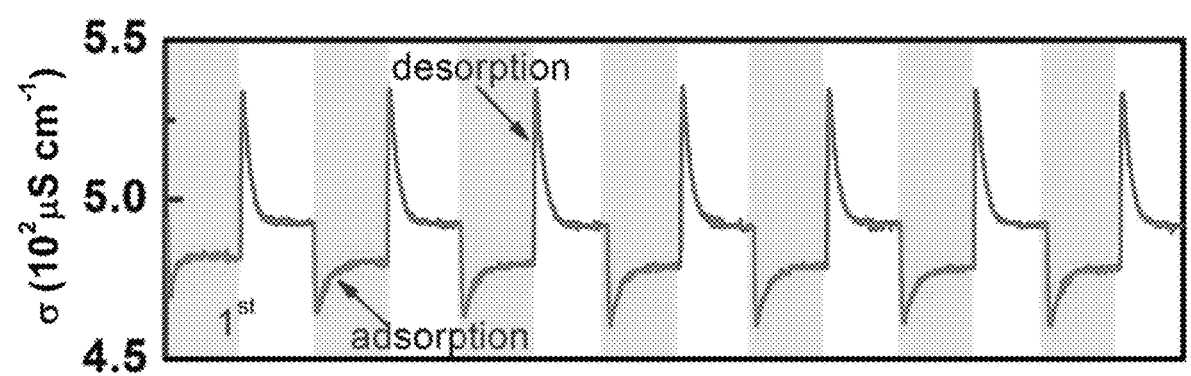
FIG. 2. Adsorption (shaded) and desorption (unshaded) for a CDI cell cycled at 1.2/0 V for 7 cycles. Fluctuating signal indicated repeated adsorption (shaded region, 1.2 V) and desorption (non-shaded region, 0 V) events as the potential was applied to the electrodes and then short-circuited.
Figure 3:
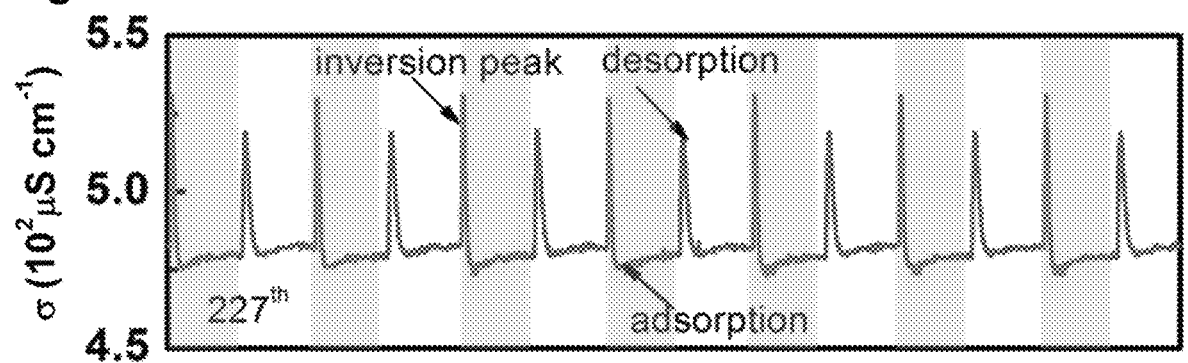
FIG. 3. Repeated cycling of the CDI cell shown in FIG. 2 after 227 cycles at 1.2/0 V. Minimal conductivity differences are now seen between the adsorption and desorption steps.
Figure 4:
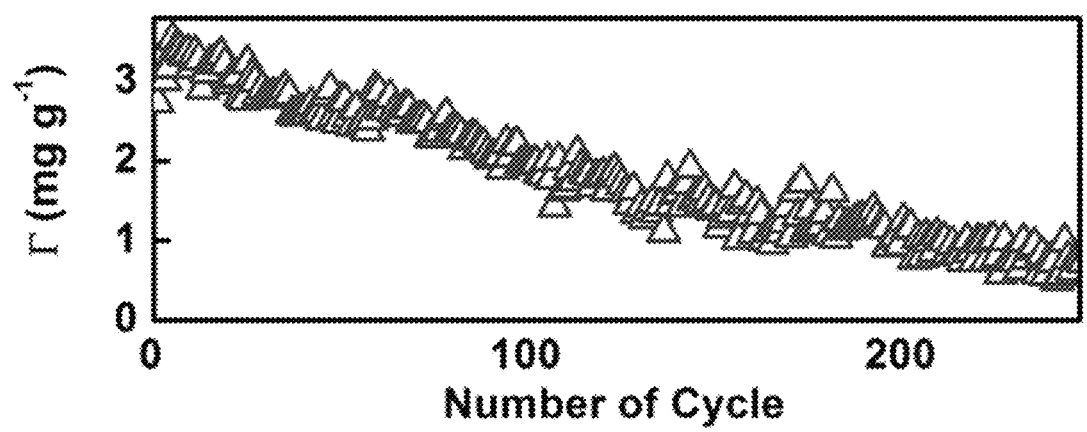
FIG. 4. Salt adsorption capacity, $\Gamma$, for a CDI cell cycled at 1.2/0 V.
Figure 5:
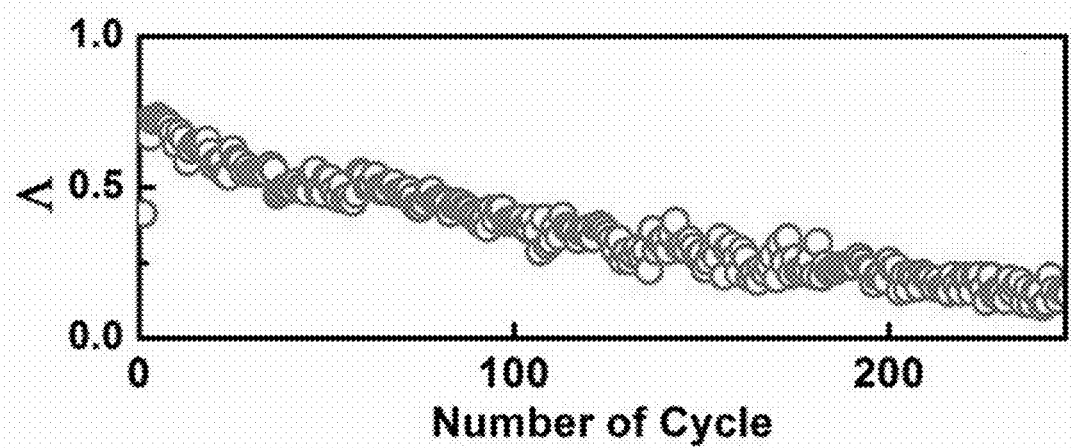
FIG. 5. Charge efficiency, $\Lambda$, for a CDI cell cycled at 1.2/0 V.
Figure 7:
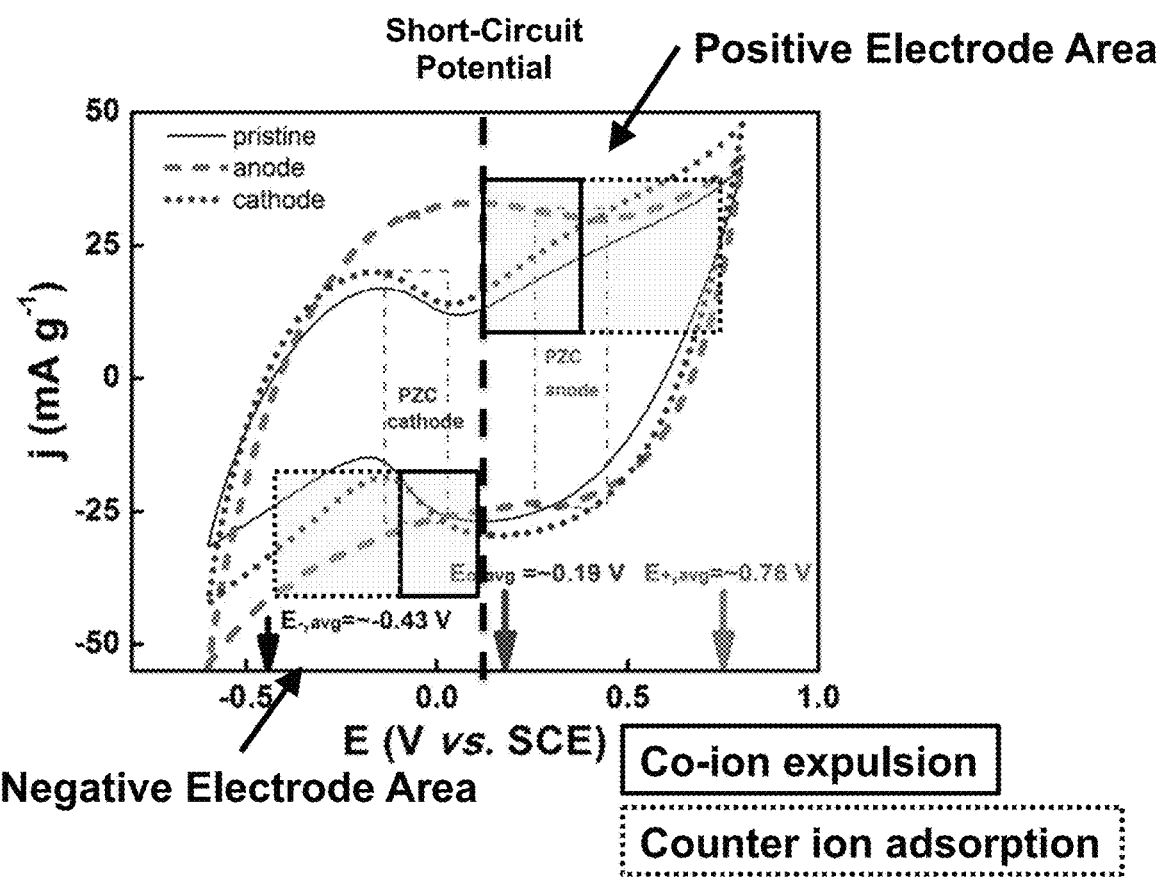
FIG. 7. Cyclic voltammograms (CVs) of a pristine carbon xerogel electrode as well as carbon xerogel electrodes used as positive (anode) and negative (cathode) electrodes in a CDI cell. These tests were carried out in $N_2$ deaerated 4.3 mM NaCl solution at 1 mV/s.
Figure 8:
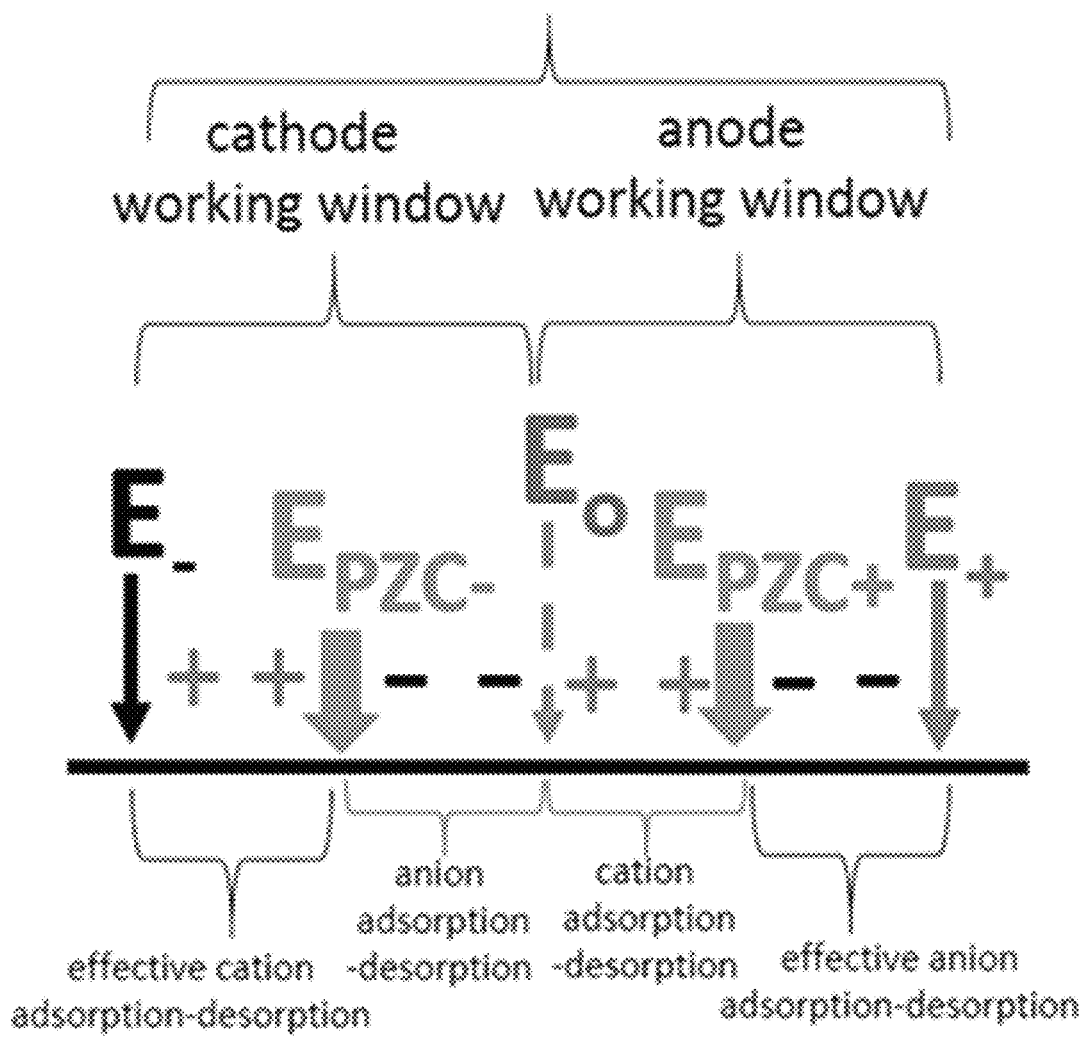
FIG. 8. Potential distributions for the used electrodes according to FIG. 7. The $E_{PZC}$ at the anode ($E_{PZC+}$) and the $E_{PZC}$ at the cathode ($E_{PZC-}$) shown in the graphs have been averaged based upon the anodic and cathodic $E_{PZC}$s in the voltammogram. $E_+$ and $E_-$ are the potentials applied to the anode and cathode, respectively.

Also shown in FIG. 6 is the location of the short-circuit potential for a CDI cell. This location is the potential to which a capacitive deionization cell will return when the cell is discharged at 0 V (anodes are short-circuited to cathodes). In a CDI cell in which the power source is a conventional DC power supply or a battery, the positive terminal is connected to the anode, and the negative terminal is connected to the cathode. When a potential is applied to the CDI cell, the potential at the anode (positive electrode) will become more positive, while the potential at the cathode (negative electrode) will become more negative. For the anode, when a positive potential is applied to the anode, the potential will increase from the location at the short-circuit potential to somewhere in the region highlighted by a dotted gray box region on the right. Since these potentials are all more positive than the $E_{PZC}$, only anion adsorption will be promoted. At the cathode, the opposite scenario will unfold. When a negative potential is applied to this electrode, the potential will decrease from the location at the short-circuit potential to somewhere in the region highlighted by either a dotted gray box or a solid gray box in the Figures. Since the $E_{PZC}$ is located at a more negative potential than the short-circuit potential in this cell, co-ions must be expelled from the carbon surface before counter-ion adsorption can take place. This co-ion expulsion process at the cathode (i.e., anions attracted to the positive cathode potential when anode and cathode are short-circuited) results in an inefficiency in the separation process when pristine and untreated carbon electrodes are used. However, with most standard potentials being in excess of 1.0 V, there is net salt removal in a conventional CDI process. One of the previously unsolved technical problems was why CDI separation fails over a short period of time (25-100 hours of operation, assuming 30 minute cycles) as depicted by the results in FIG. 4. This question can now be answered by looking at a cyclic voltammogram of a CDI cell. Shown in FIG. 7 are overlaid CVs of pristine and used carbon xerogel electrodes. The used carbon xerogel electrodes come from the positive (anode) and negative (cathode) electrodes from the CDI experiments depicted in FIG. 4. Immediately evident is that the CV of the negative electrode (i.e., the cathode, to which a negative charging potential is applied) looks remarkably similar to that of the pristine electrode, indicating that very little has changed on the surface of that electrode. Also apparent is that the $E_{PZC}$ of the negative electrode is located at a similar location to that of the pristine electrode. However, the situation at the positive electrode (anode) is dramatically different. The $E_{PZC}$ has relocated considerably in the positive direction, indicating a permanent change in chemical composition of the anode surface. Using similar arguments to FIG. 6, this relocation of the $E_{PZC}$ at the positive electrode now results in an added inefficiency of the CDI process. When charging potentials are applied at the positive and negative electrodes of a used CDI cell after a short-circuit, both electrodes will expel co-ions as well as adsorbing counter-ions. This mixed adsorption/desorption process results in a decreased net removal of ions from the input stream, thereby decreasing both the salt adsorption capacity and charge efficiency. The "j" noted in both FIG. 5 and FIG. 7 is the current density in mA/g of carbon electrode. In these figures, $E_+$ is the potential applied to the anode, $E_-$ is the potential applied to the cathode, and $E_o$ is the potential of the CDI cell at short-circuit. The $E_{PZC}$ relocation during CDI operation provides a key insight into explaining the loss in performance found during operation at 1.2/0 V. Voltages separated by a forward slash indicate a charging potential to the left of the slash, and a discharging potential to the right of the slash. 1.2/0 V charging and discharging potentials produced the distribution shown in FIG. 8 and in FIG. 7, and reflect the $E_{PZC}$s in a used CDI cell. As mentioned, during cell operation at 1.2/0 V, degradation in the ion (specifically, $Na^+$ and $Cl^-$) adsorption capacity was observed due to cumulative inefficiencies in adsorption/desorption at both electrodes. The inefficiencies are best explained as two driving forces that conflict, i.e., one contributes to anion desorption, and the other toward cation desorption. Since $\eta^*_-$, the driving force for anion desorption (i.e., $\eta^*_-=E_o-E_{PZC-}$, $E_o$ being the short-circuit potential of a CDI cell), already existed in the potential distribution associated with the pristine electrode (co-ion expulsion in FIG. 6), and this driving force was maintained even after long-term operation at 1.2/0 V (FIG. 7), there remained an inefficiency at the cathode; however, $\eta^*_+$, the formation of the driving force for cation desorption (i.e., $\eta^*_+=E_{PZC+}-E_o$), and the underlying cause of CDI cell degradation, is related to the relocation of the $E_{PZC}$ for the anode across the $E_o$ potential (i.e., the $E_{PZC}$ for a pristine anode is slightly negative, but the $E_{PZC}$ for a used anode is very positive). This conclusion is clearly illustrated in FIG. 8 based upon our potential distribution and cyclic voltammetry studies.

Figure 9A:
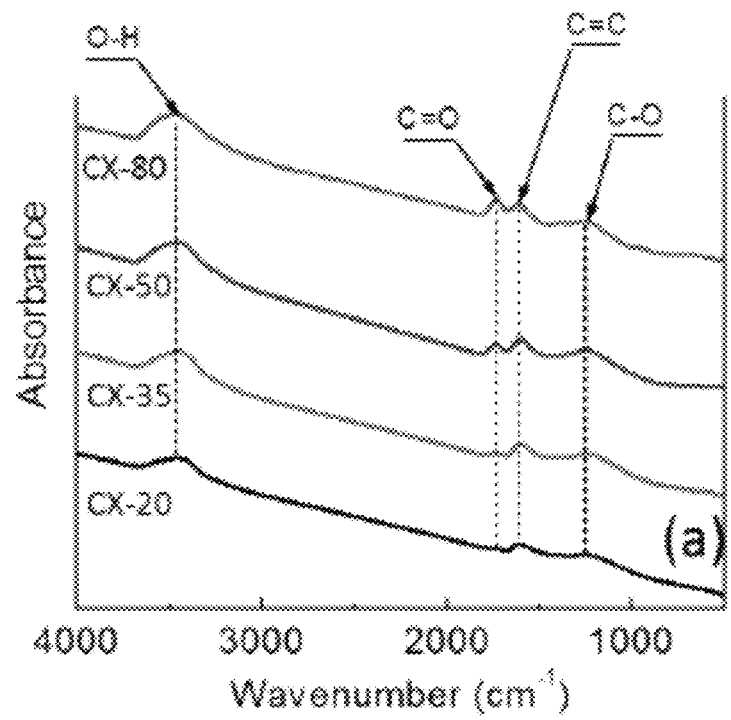
FIGS. 9A and 9B show FTIR (FIG. 9A) and surface acidity analysis (FIG. 9B) of carbon xerogel (CX) samples with oxidation by nitric acid
Figure 9B:
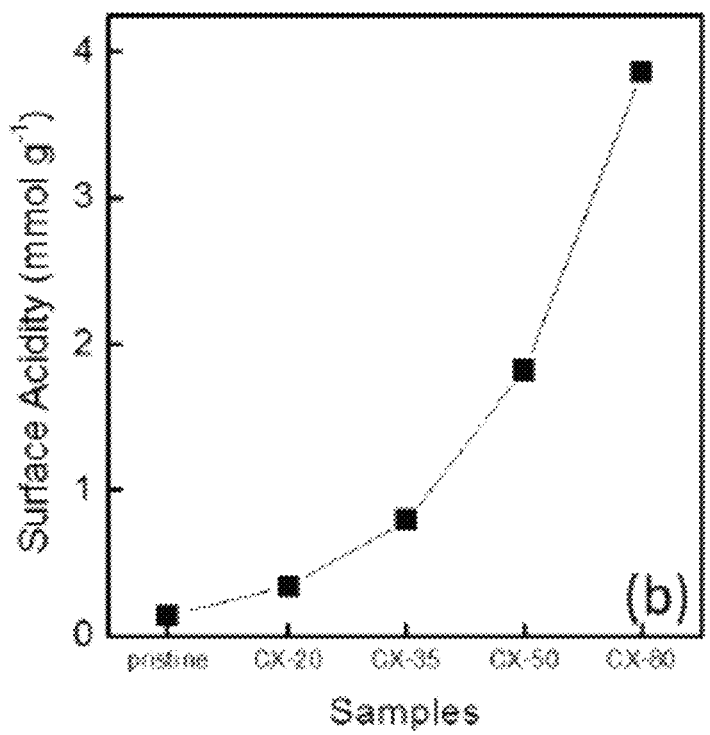
Figure 10A:
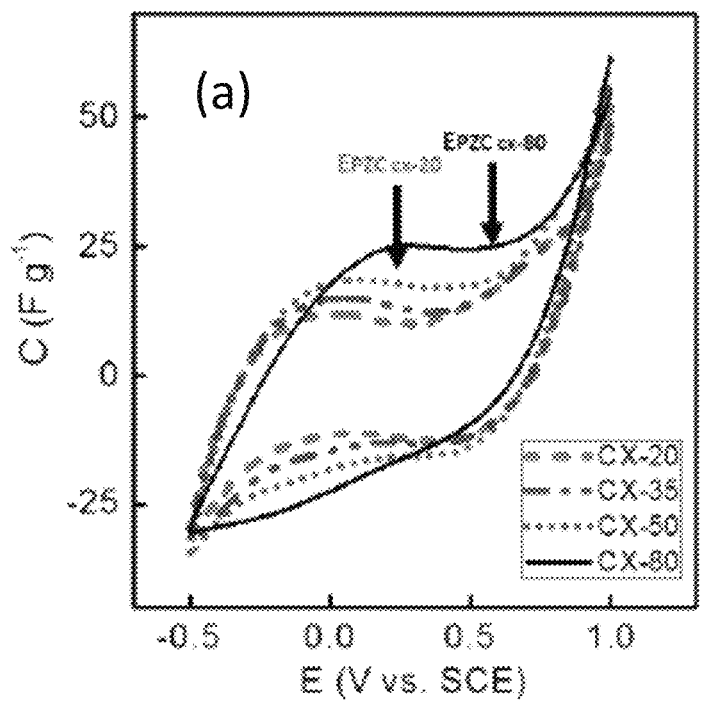
FIGS. 10A and 10B show CVs of carbon xerogel (FIG. 10A) and of SC electrodes (FIG. 10B) demonstrating positioning of the $E_{PZC}$ at more positive potentials through nitric acid treatments
Figure 10B:
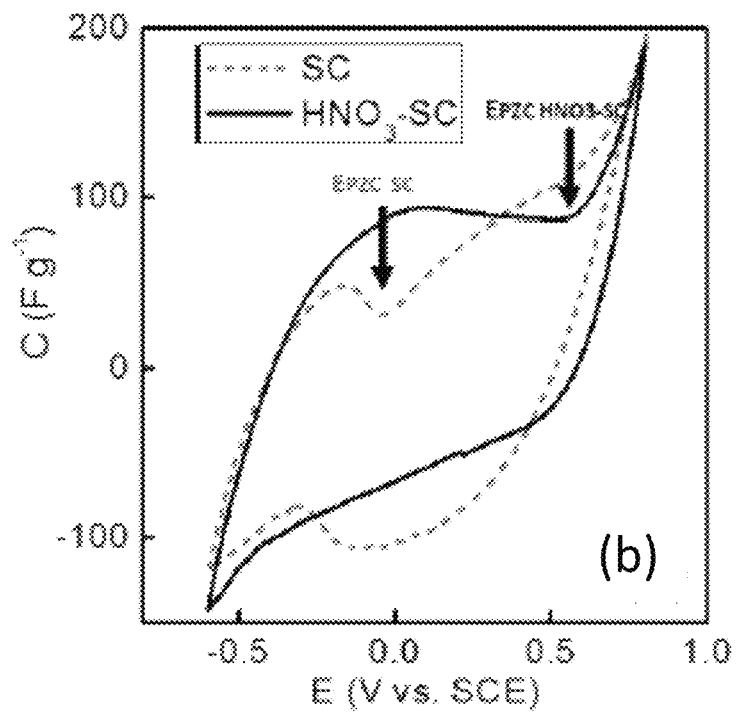

In assessing the reason behind this relocation of the $E_{PZC}$, especially relocation of the anode $E_{PZC}$, various techniques can be used. The CVs used in FIG. 6 and FIG. 7 are quite sensitive methods for detecting surface changes, but this method cannot conclusively identify the particular surface species responsible for this shift in the $E_{PZC}$ in the CV tests carried out here. Therefore, alternative surface analytic methods were employed to analyze the relocation of the $E_{PZC}$s, including Fourier Transform Infrared Spectroscopy (FTIR) and a surface acidity analysis. Shown in FIGS. 9A and 9B are the FTIR and surface acidity analyses for carbon xerogel electrodes treated with nitric acid to oxidize the carbon surface. Clearly evident is the increase in surface oxide groups in the FTIR spectra and surface acidity of the carbon samples after the nitric acid treatment. In FIGS. 10A and B, CVs are shown for both carbon xerogel and Spectracarb (SC) electrodes, which demonstrate positive relocation of the $E_{PZC}$ after oxidation in nitric acid. These results demonstrate that the chemical/physical reason behind the loss of separation performance in a conventional CDI cell is primarily due to oxidation of the carbon anode (positive electrode). Ultimately, to obtain a stable separation in a CDI cell, shifting of the $E_{PZC}$s must be controlled at both the anode and the cathode, with oxidation being a primary concern for the anode.

Figure 11A:
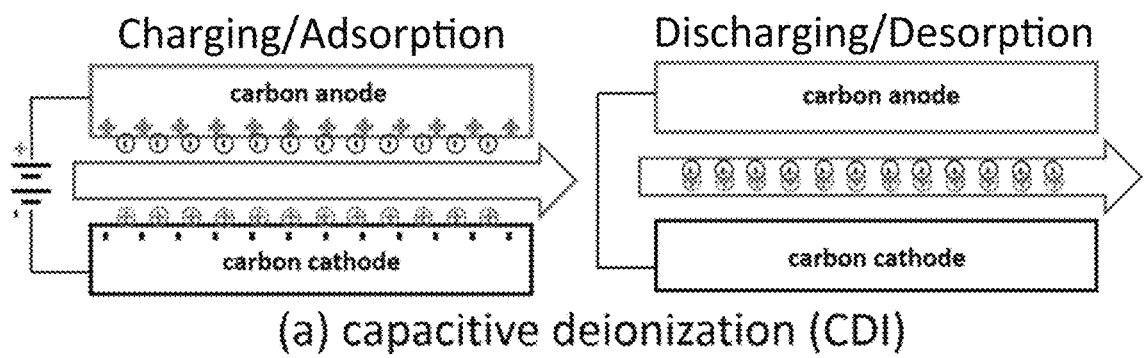
FIGS. 11A and 11B show operation of an a conventional CDI cell (FIG. 11A) compared to an inverted capacitive deionization (i-CDI) cell (FIG. 11B) where adsorption of ions takes place at a short circuit potential and desorption takes place with an applied potential.
Figure 11B:
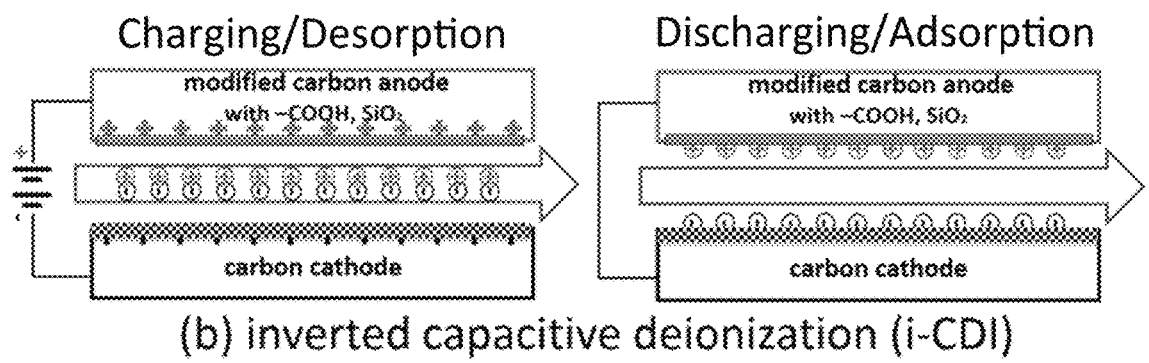

FIGS. 11A and 11B compare conventional and inverted capacitive deionization processes. In conventional CDI, as described above, salt (or other type of ion) is adsorbed onto typically carbon electrodes under the influence of an applied potential and desorbed when that potential is removed, short-circuited, reversed, or reduced. In the inverted capacitive deionization ("i-CDI") device and method disclosed herein the electrical charging pattern is reversed: salt is desorbed under an applied potential (where the applied potential is used to reach the $E_{PZC}$s at the anode and cathode) and adsorbed when the potential is removed, short-circuited, reversed, or reduced. This operation is made possible by the use of surface charged (i.e., surface modified) electrodes at both the anode (positive electrode) and the cathode (negative electrode): as a result of chemically modified electrode surfaces, anions are preferentially adsorbed at the cathode through the use of positive surface charge enhanced electrodes and cations are preferentially adsorbed at the anode through the use of negative surface charge enhanced electrodes. In one embodiment, such as that shown in FIG. 11B, the anode can be composed of oxidized or silica-treated carbon electrodes while the cathode can be composed of pristine or amine-treated carbon electrodes. Other electrode surface modification chemistries can be used to shift or position the $E_{PZC}$s of anodes and cathodes, but the surface modification chemistries disclosed herein are some of the most economical and predictable methods.

Due to the inverted operational scheme depicted for i-CDI in FIG. 11B, it is important to define the working voltage window, aka useable voltage range, for i-CDI cells. The working voltage window for an i-CDI process is shown by the difference in the $E_{PZC}$s at the anode and cathode. This difference in $E_{PZC}$ location can be used for the adsorption of anions and cations from solution when the potential required to attract ions is far from the $E_{PZC}$s at the anode and cathode of untreated electrodes. The larger the internal working voltage window is, the larger driving force is available for adsorption/desorption of ions, which enables smaller commercial device sizes as a result of higher salt adsorption capacities at each electrode. The size of the working voltage window effectively determines the maximum salt adsorption capacity ($\Gamma$) of the carbon electrodes.

Figure 12:
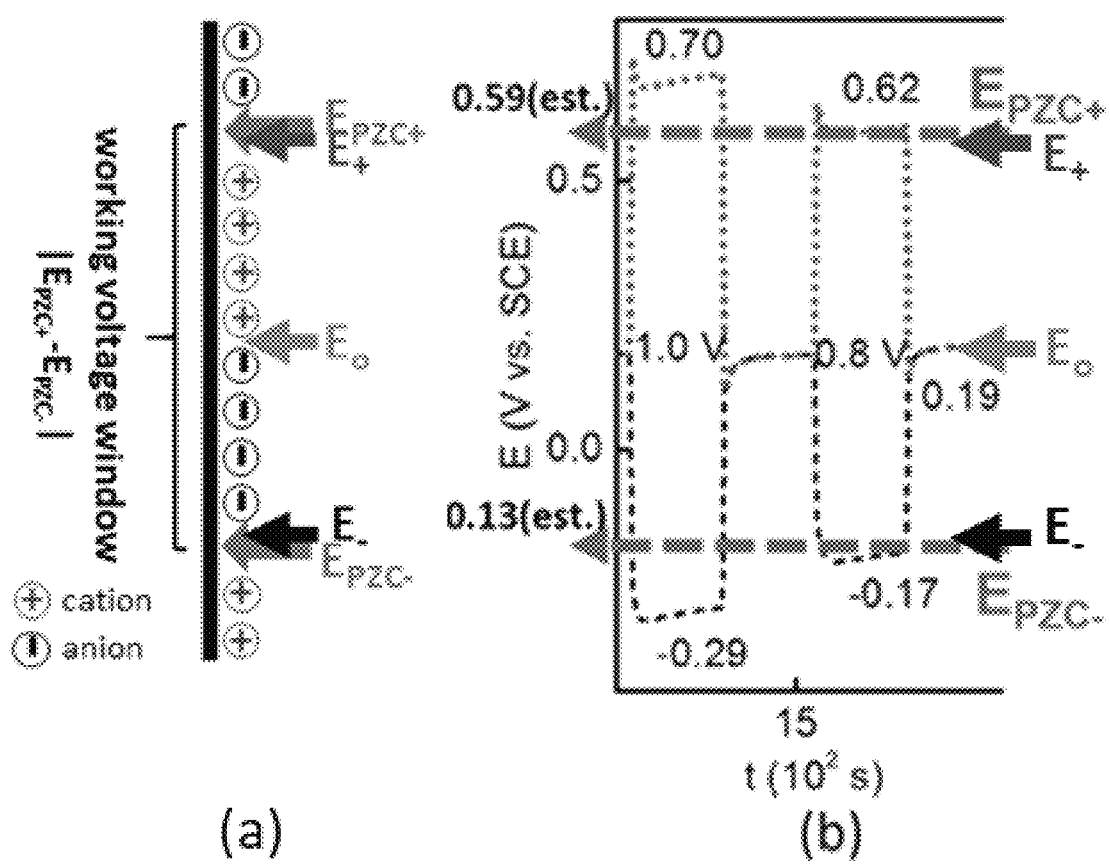
FIG. 12. On the left, when the $E_{PZC}$s for both electrodes are dissimilarly located with respect to the short-circuit voltage ($E_o$), the potential window between the $E_{PZC}$s at the anode and cathode can be used for desalination, but the adsorption-desorption behavior will be inverted. On the right, potentials distributed at the anode ($E_+$) and cathode ($E_-$) at a total cell potential of 0.8 and 1 V in 4.3 mM deaerated NaCl solution when a Si-CX anode and pristine CX cathode were used in a four-electrode cell.

Shown in FIG. 12 is the working voltage window for an i-CDI cell composed of silica-treated carbon xerogel anodes and pristine carbon xerogel cathodes. For this embodiment, the working voltage window is approximately 0.8 V as the $E_{PZC}$ at the anode is ~0.62 V and the $E_{PZC}$ at the cathode is ~−0.17 V (0.62−(−0.17)=0.79 V). On the right in FIG. 12 are distributed electrode potentials (as measured by a 4-electrode study that shows when ~0.8 V is applied to this i-CDI cell, $E_+$ and $E_-$ at the anode and cathode, respectively) that match the locations of their respective $E_{PZC}$s, and thereby make maximum use of the working voltage available in this cell. When the cell is short-circuited ($E_o$), ions are adsorbed in an i-CDI cell as the potential at each electrode is far from their respective $E_{PZC}$s. While this exemplary cell shows a working voltage window of 0.8 V, the working voltage window can be further expanded for inverted adsorption/desorption performance by creating (by surface modification) electrode materials at the anode that have more positive $E_{PZC}$s and/or electrode materials at the cathode that have more negative $E_{PZC}$s. Shifting or positioning of the $E_{PZC}$ in the negative direction to increase the working voltage window of this process will be presented below. A working voltage window as small as 0.4 V is operable to deionize input streams; however, as discussed below, the greater the working voltage window, the greater the adsorption capacity of an embodiment of the invention disclosed herein.

Figure 13A:
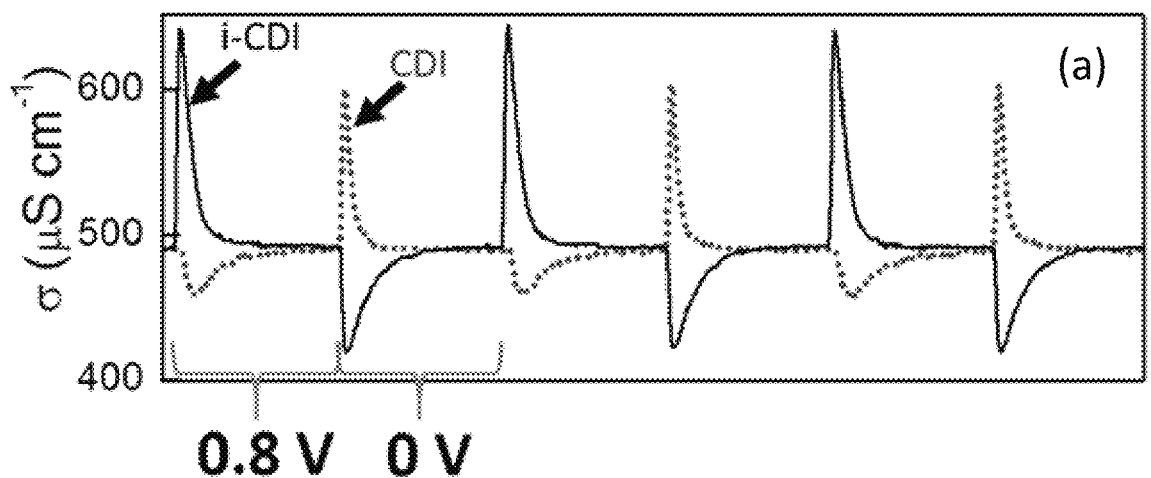
FIGS. 13A and 13B show conductivity (a) (FIG. 13A) and current density (j) (FIG. 13B) for initial cycling ($3^{rd}$-$5^{th}$) for i-CDI and CDI systems at 0.8/0 V in 31 L of 4.3 mM deaerated NaCl solution at 75 mL min$^{-1}$.
Figure 13B:
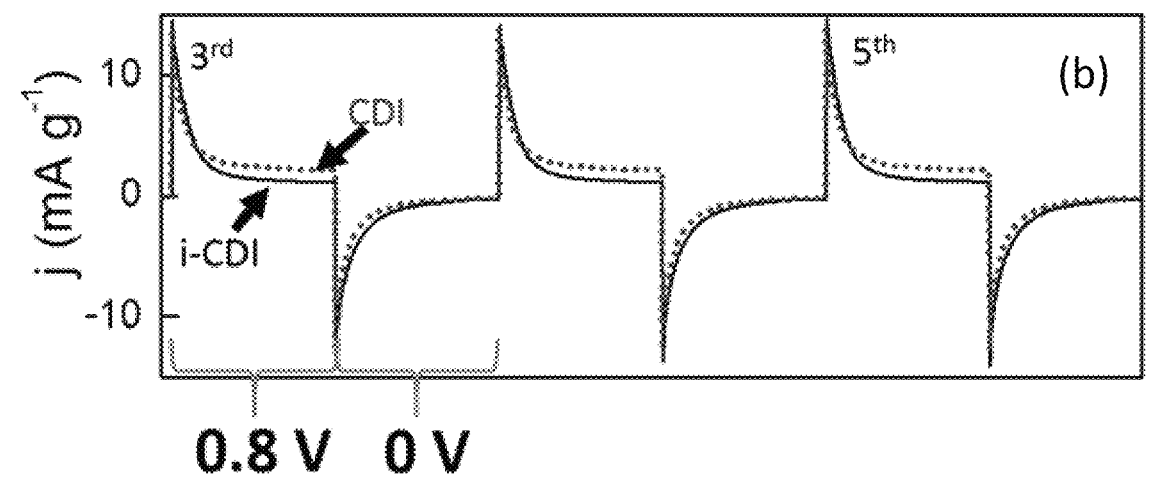
Figure 14A:
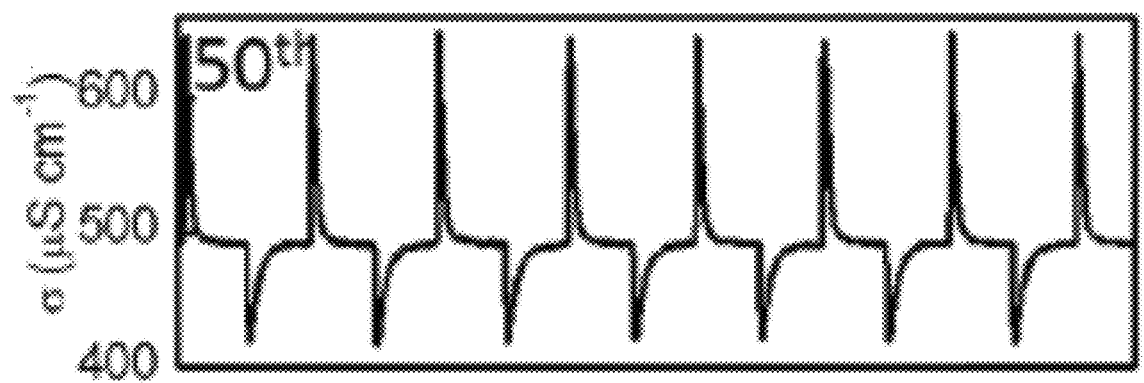
FIGS. 14A and 14B show selected profiles of the conductivity (s) at the 50-57$^{th}$ cycles for i-CDI (FIG. 14A) and CDI systems (FIG. 14B) at 0.8/0 V in 31 L of 4.3 mM deaerated NaCl solution at 75 mL min$^{-1}$.
Figure 14B:
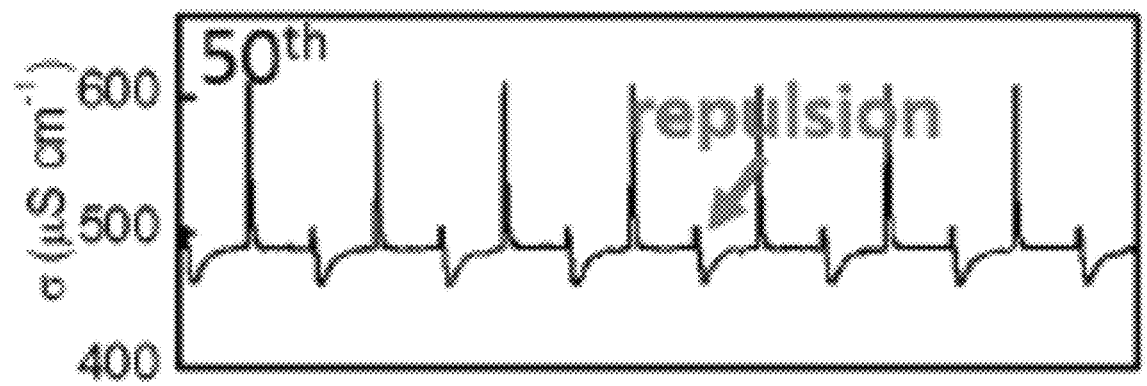
Figure 15A:
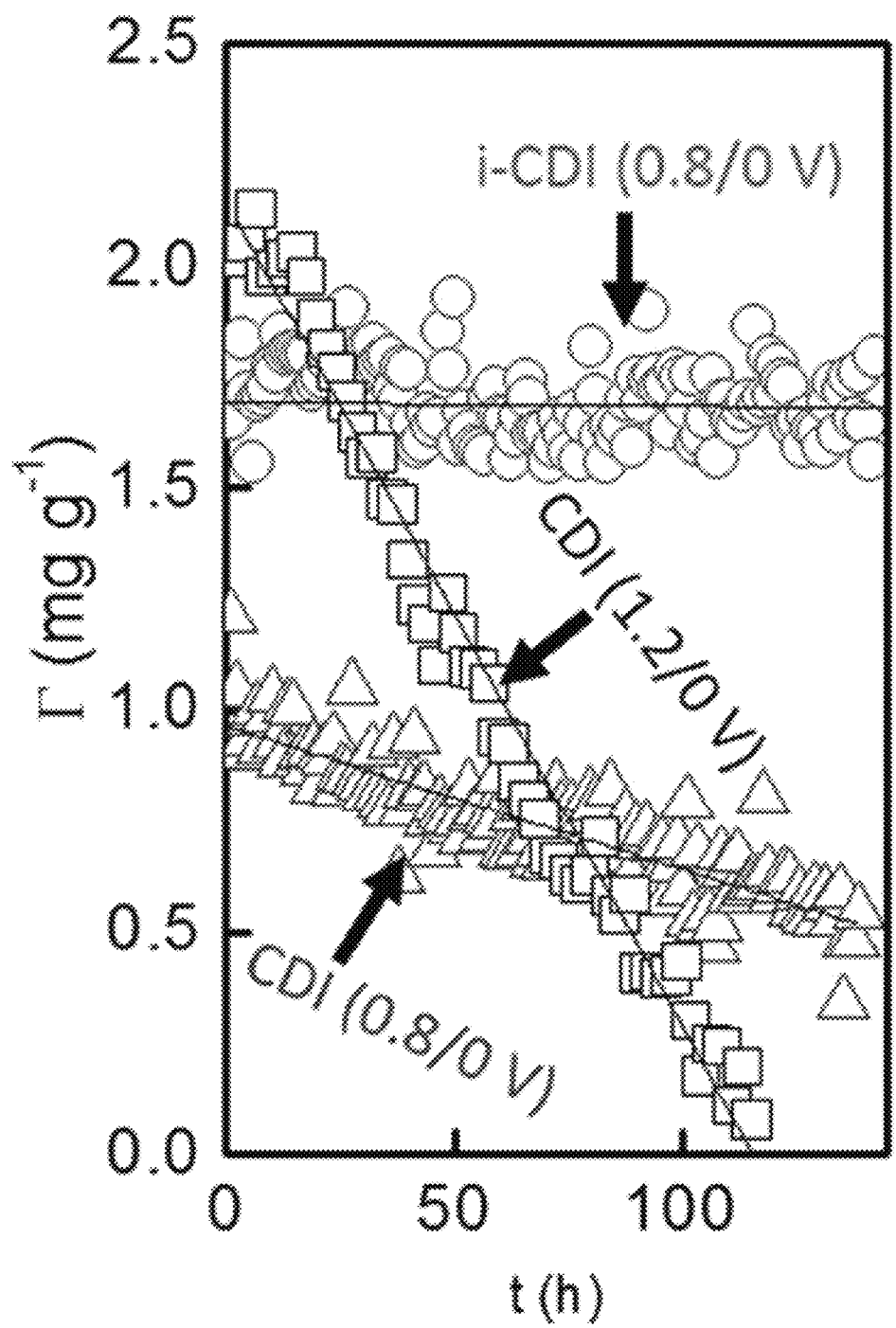
FIGS. 15A, 15B, and 15C show salt adsorption capacity (F) (FIG. 15A), charge passed (Q) (FIG. 15B), and charge efficiency (A) (FIG. 15C) for the discharging step for i-CDI and CDI systems discharging at 0 V. In addition, data for the CDI system used at 1.2/0 V was added into the plots for comparison.
Figure 15B:
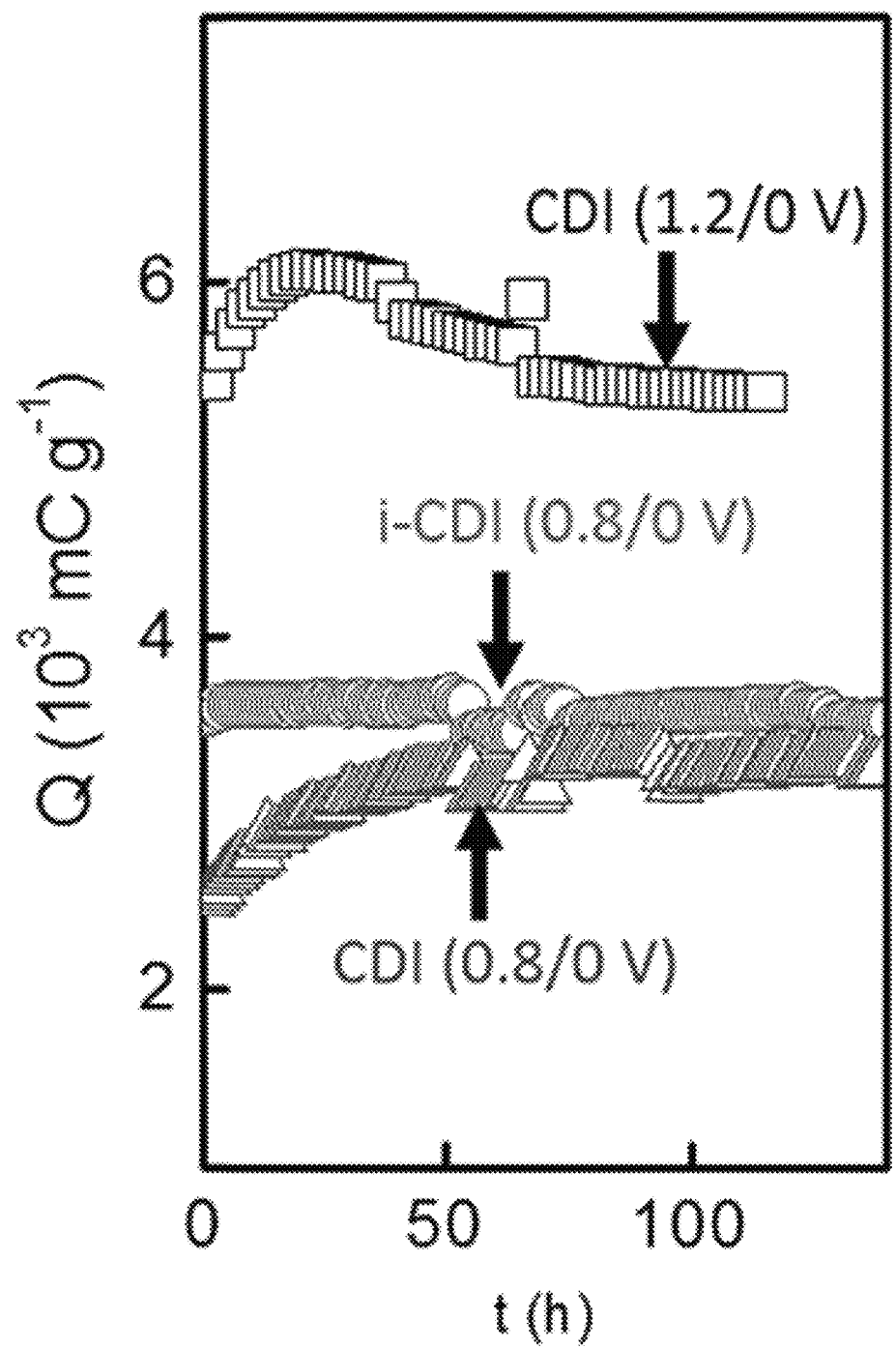
Figure 15C:
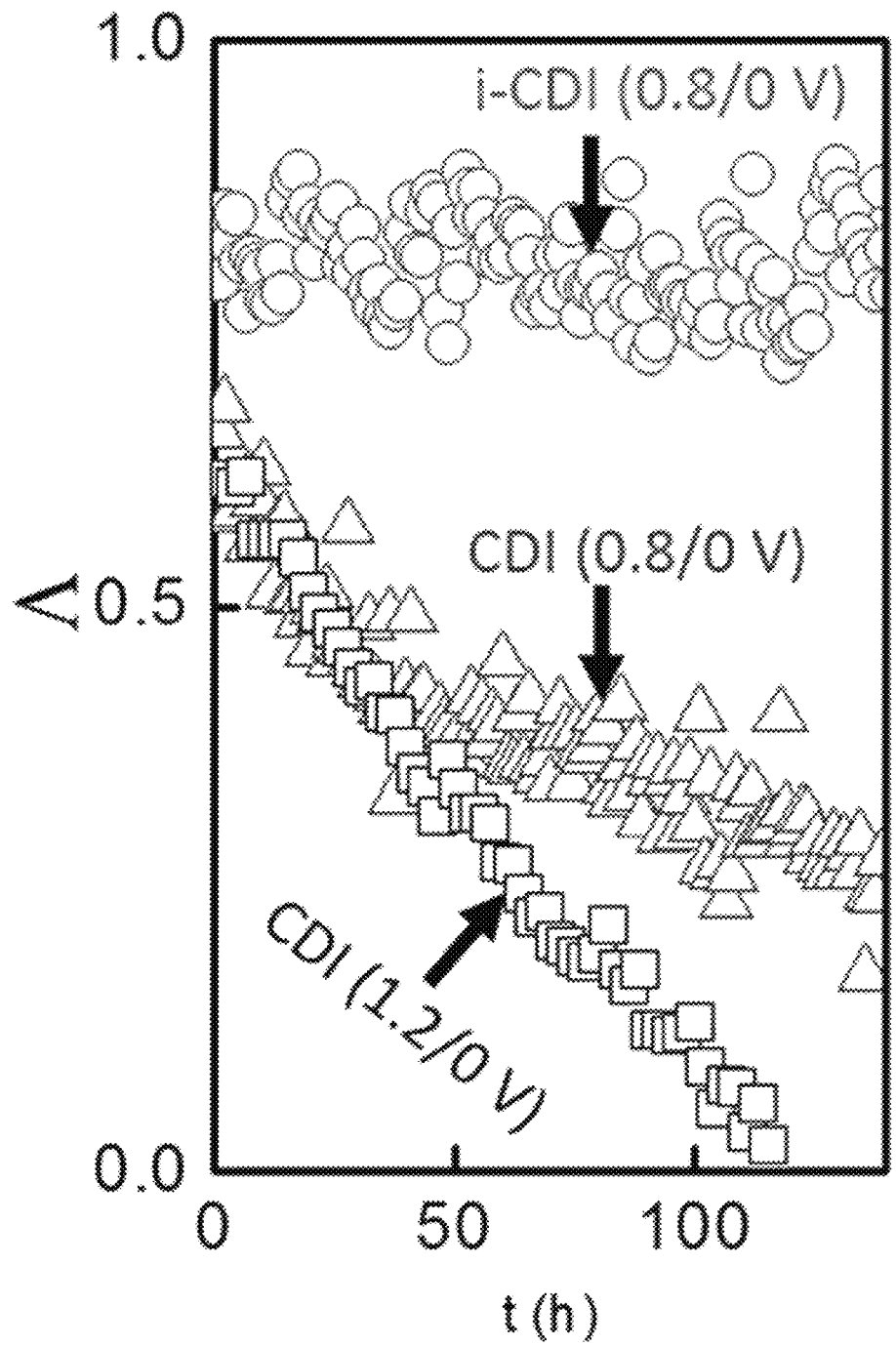
Figure 16A:
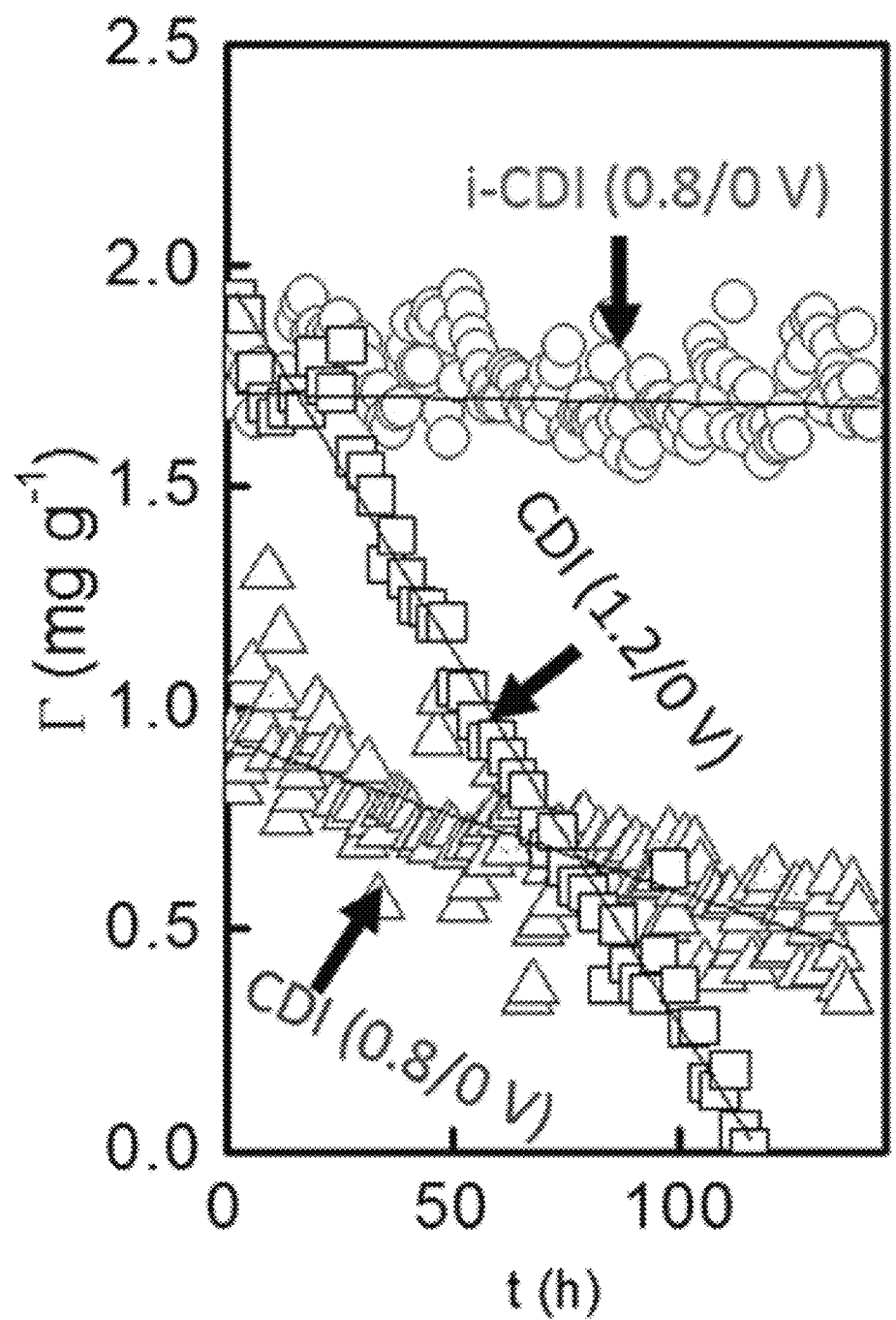
FIGS. 16A, 16B, and 16C show salt adsorption capacity (F) (FIG. 16A), charge passed (Q) (FIG. 16B), and charge efficiency (A) (FIG. 16C) for the discharging step for i-CDI and CDI systems charging at 0.8 V. In addition, data for the CDI system used at 1.2/0 V was added into the plots for comparison.
Figure 16B:
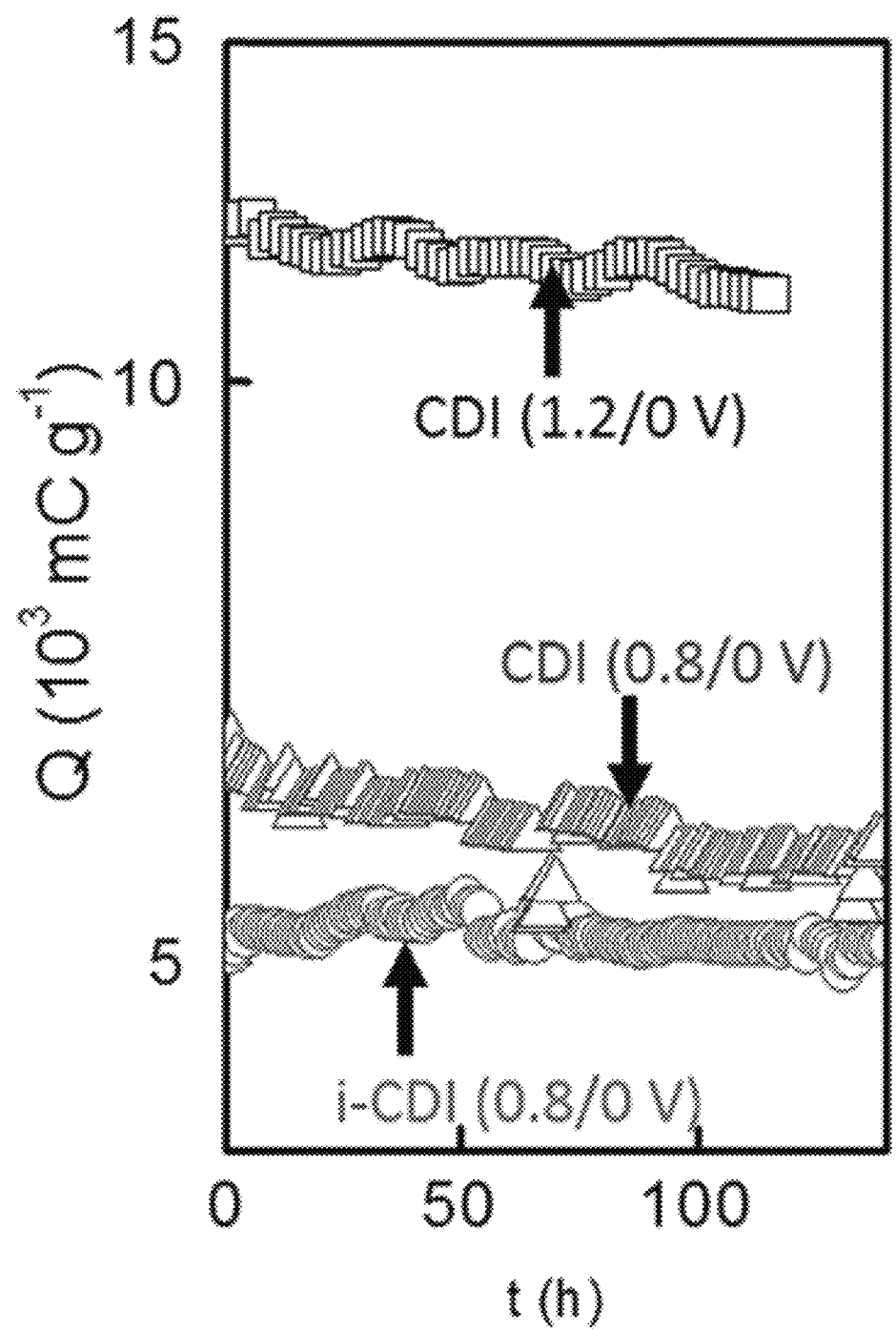
Figure 16C:
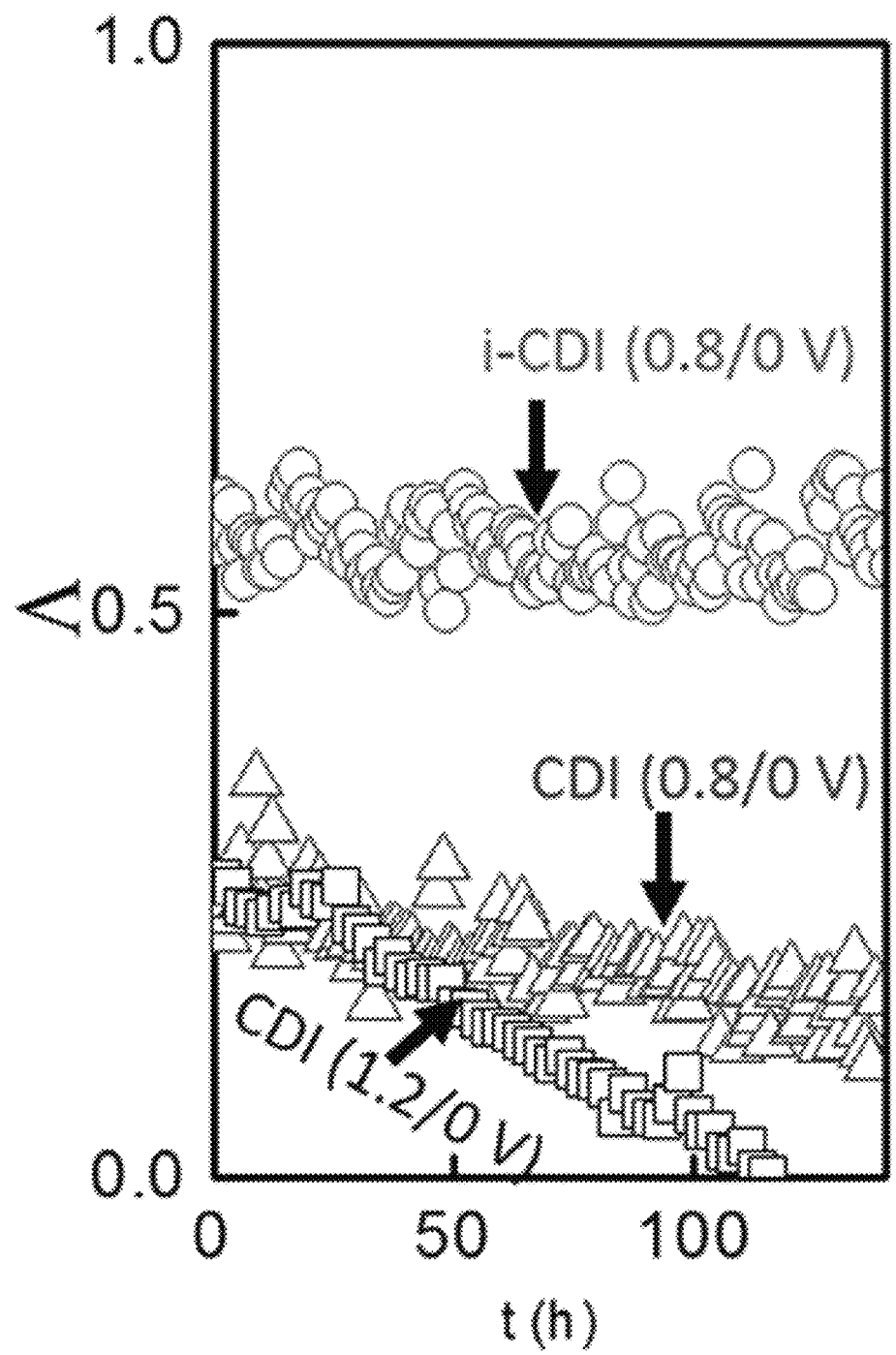

To demonstrate i-CDI operation, a cell was constructed with silica-modified anodes and pristine carbon cathodes. An identical cell with pristine carbon electrodes at both the anode and cathode was constructed for comparison. Shown in FIGS. 13A and 13B are the current and conductivity responses for i-CDI and CDI cells operated at 0.8/0 V for charging/discharging of the cell. Immediately evident in FIG. 13 is the inverted conductivity (adsorption/desorption) performance of the i-CDI cell when compared to the conventional CDI when both are exposed to the same molarity of a salt-laden input stream. In an i-CDI cell, salt is desorbed (increase in conductivity) under an applied potential of 0.8 V and adsorbed (decrease in conductivity) when the cell is short-circuited or discharged. In addition, there is less charge passed ("Q") in i-CDI at 0.8 V than in the conventional CDI case, leading to an overall higher charge efficiency (A). A lower Q means that a cell is more efficient, i.e., electron "use" is lower per mole of ions removed from the input stream. Shown in FIGS. 14A, 14B, FIGS. 15A, 15B, 15C, 16A, 16B, and FIG. 16C are selected performance characteristics versus hours of operation for the i-CDI (FIG. 14A and as denoted in FIGS. 15 and 16) and CDI cells (FIG. 14B and as denoted in FIGS. 15 and 16) operated at 0.8/0 V for charging/discharging, and a CDI cell operated at 1.2/0 V, with the same adsorption and desorption minutes per cycle.

Figure 17:
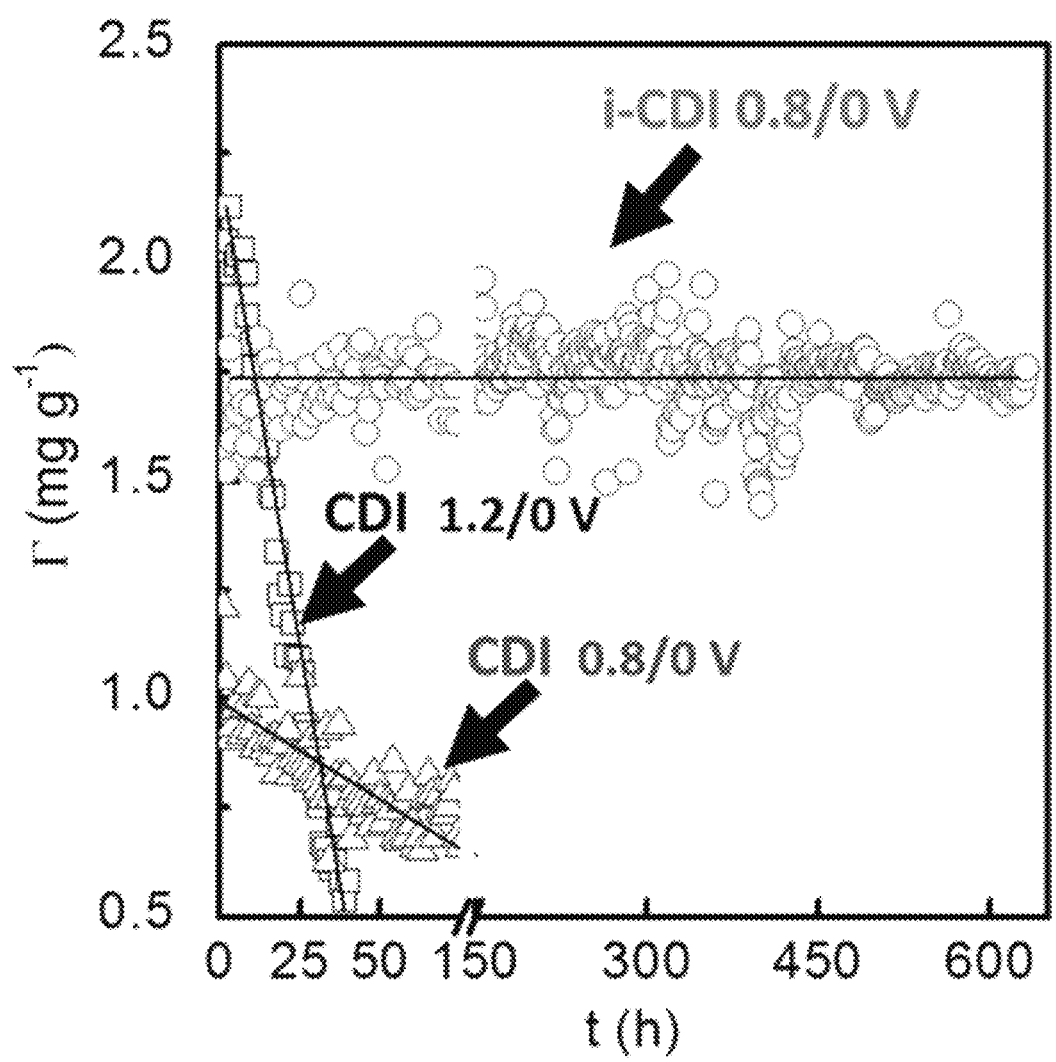
FIG. 17. Enhanced stability by the i-CDI system employed with a CX cathode and a Si-CX anode. This test was performed at 0.8/0 V in 31 L of 4.3 mM deaerated NaCl solution. Comparisons in performance to standard CDI operation under similar conditions with pristine CX electrodes are shown. In this plot, regression lines have been added.

To examine the long-term stability of the i-CDI process, an i-CDI cell was operated for 600 hours, with electrical potential cycling between charging (0.8 V) and discharging (0 V). Shown in FIG. 17 is the cycling stability of the i-CDI process as compared to CDI cells operated at 1.2/0 V and 0.8/0 V for charging/discharging. The i-CDI process shows an improved lifetime of ≥500% under the conditions tested here, demonstrating the stability of this process when dissimilar surface-charge enhanced electrodes are used, e.g., a purposefully oxidized anode (positive electrode) that dramatically mitigates prior performance degradation inherent in conventional CDI.

Expansion of the i-CDI Working Voltage Window

In order to increase the versatility of the i-CDI process, higher salt adsorption capacities (Γ) can be obtained through expansion of the working voltage window beyond 0.8 V. This expansion can be accomplished by either increasing in the positive direction the $E_{PZC}$ at the anode (positive electrode) and/or decreasing in the negative direction the $E_{PZC}$ at the cathode (negative electrode). These directional movements are purposely performed through the carbon treatments disclosed herein with extent of treatment correlating to proper positioning of an $E_{PZC}$. Oxidation of a carbon surface will aid in positively shifting an $E_{PZC}$, reduction of a carbon surface (decreasing the number of oxide groups) will aid in negatively shifting an $E_{PZC}$. The data shown in FIG. 10A demonstrates that increased oxidation of a carbon surface through nitric acid treatments at higher temperatures will stepwise positively shift the $E_{PZC}$. Reduction treatments will likewise cause a similar effect in the negative direction. In addition to these simple oxidation/reduction treatments, surface coatings will also play a critical role in the surface charge of the electrode and resulting position of its $E_{PZC}$, which will define the working voltage window in an i-CDI process.

Figure 18A:
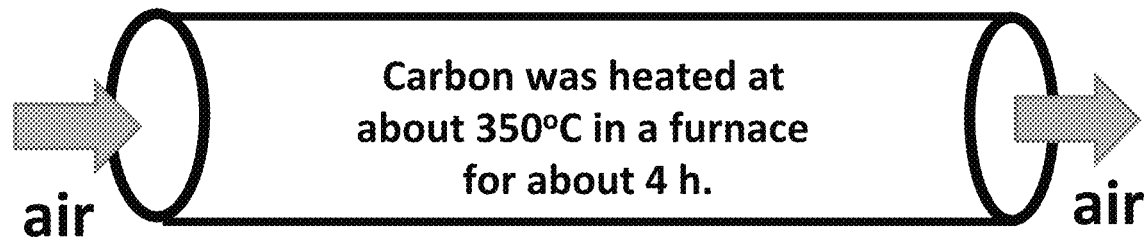
FIGS. 18A, 18B, and 18C show heat treatment in air/oxygen (FIG. 18A), acid treatments to oxidize the carbon surface (FIG. 18B), and a silica coating method with TEOS (FIG. 18C), which all lead to carbon electrodes with positively shifted $E_{PZC}$ s (negative surface charges).
Figure 18B:
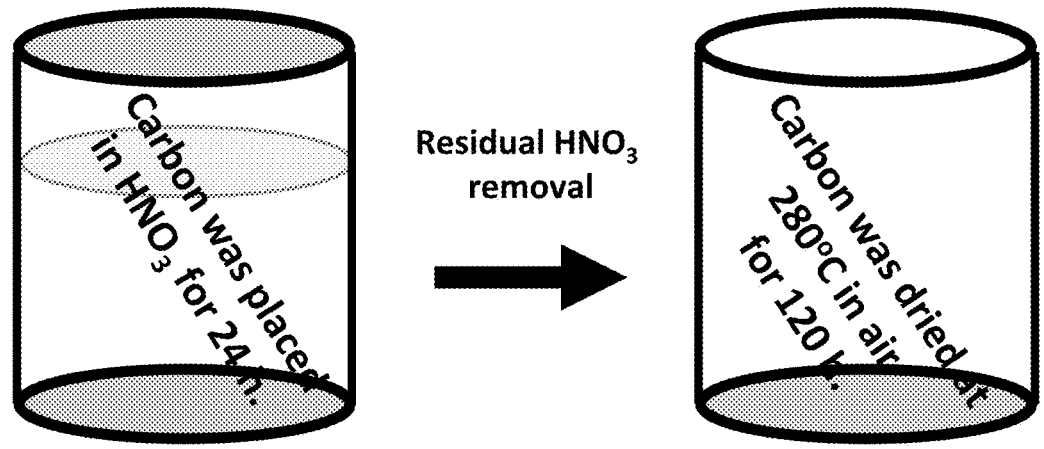
Figure 18C:
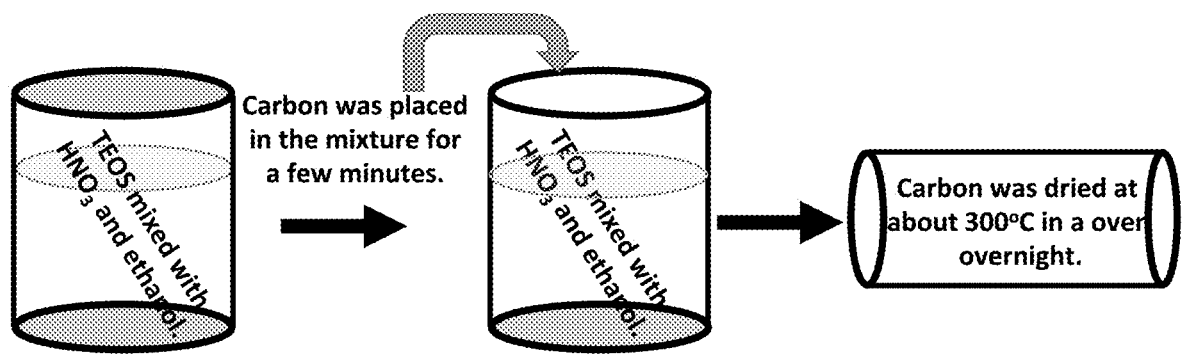
Figure 19A:
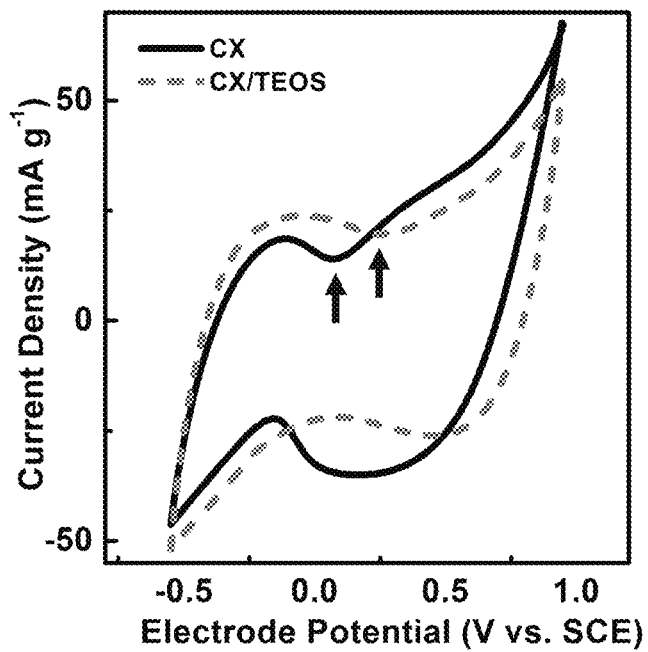
FIGS. 19A and 19B show tetraethyl orthosilicate (TEOS) treatment of carbon xerogel (CX) electrodes to yield silica groups on carbon xerogel electrodes (CX/TEOS) to positively shift the $E_{PZC}$ (FIG. 19A) and nitric acid treatment of commercially available Spectracarb (SC) to yield nitrate groups on carbon xerogel electrodes (SC/HNO$_3$) to positively shift the $E_{PZC}$ (FIG. 19B).
Figure 19B:
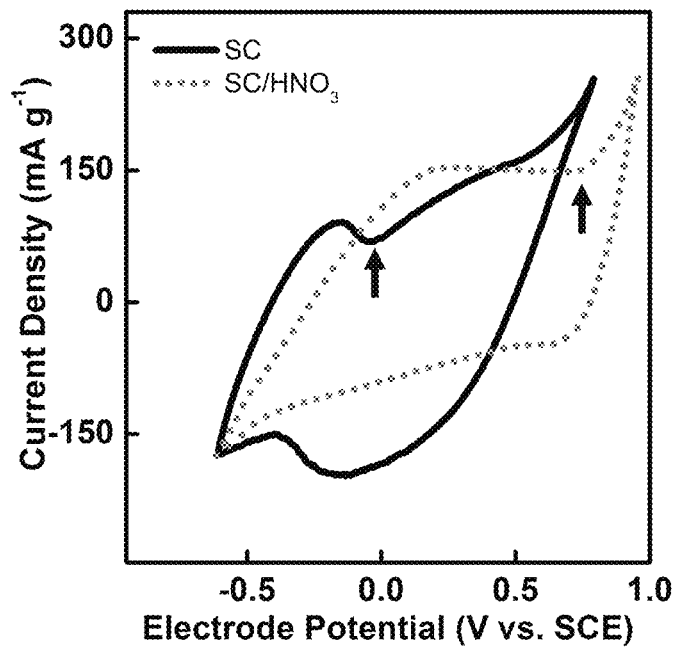

To demonstrate the effect of surface groups on the $E_{PZC}$ location, both nitric acid and silica surface coatings were used in the inventors' experiments. Shown in FIGS. 18A to 18C are three treatment methods (FIG. 18A (heat treatment), FIG. 18B (acid treatment), and FIG. 18C (coating with a silica film)) to positively shift the location of $E_{PZC}$. Other methods known in the art of electrode chemistry exist to accomplish similar shifts, including any treatments that yield negatively charged functional groups on an electrode surface, such as the ones shown here for adding surface oxide and silica groups. Shown in FIGS. 19A and 19B are tetraethyl orthosilicate (TEOS) and acid treatment methods to positively shift the $E_{PZC}$ of two carbon electrodes: mesoporous carbon xerogel (CX) and microporous Spectracarb (SC).

Figure 20:
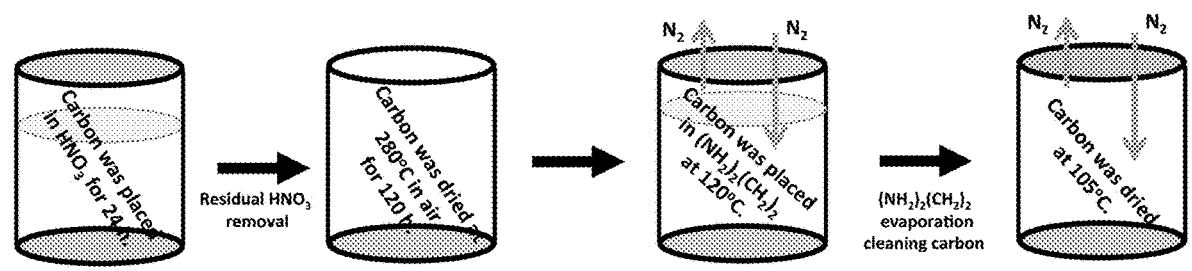
FIG. 20. Amine functionalization of a carbon surface using ethylenediamine treatment of Spectracarb electrodes.

Shown in FIG. 20 is an example of a treatment process used to functionalize carbon electrodes with amine surface groups using ethylenediamine. This treatment process results in —NH$_3^+$ surface groups, a positively shifted pH$_{PZC}$, and a negatively shifted $E_{PZC}$ (as shown in FIG. 21C). When these amine-functionalized cathode carbon electrodes (P-SC) are combined with anode carbon electrodes with positively shifted $E_{PZC}$s (by oxidation treatments or surface functional groups, i.e., N-CX or N-SC), the working voltage window of the i-CDI process can be expanded beyond the 0.8 V shown in FIG. 12. The original working voltage window for the i-CDI process was ~0.8 V when using oxidized/silica treated carbon anodes and pristine carbon cathodes.

Figure 21A:
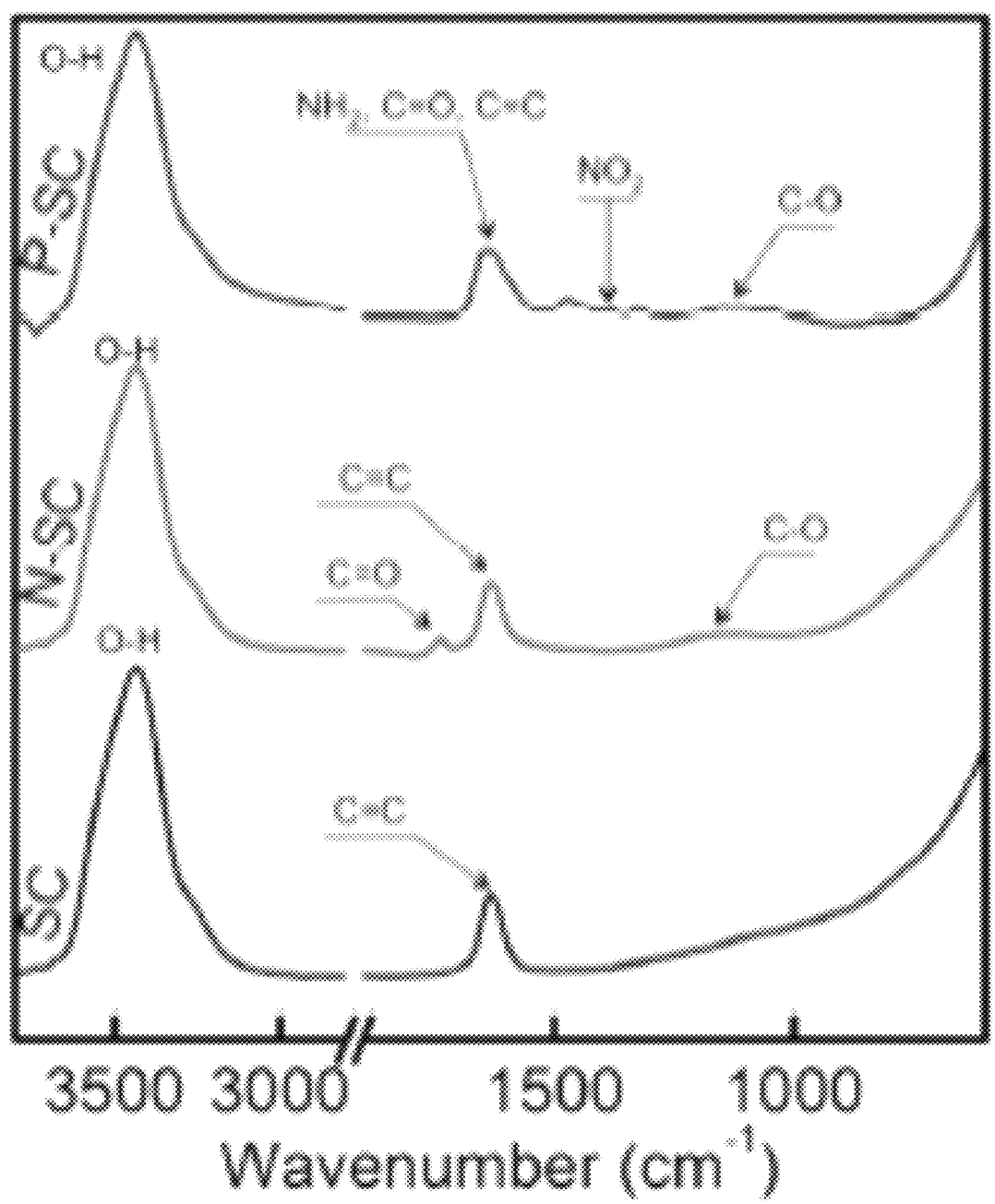
FIGS. 21A, 21B, and 21C show chemical characterizations of the pristine and treated SC. Fourier-transform infrared (FTIR) spectra of the samples are displayed in FIG. 21A. These samples were further tested using 4.3 mM NaCl solutions with different pH values to estimate point of zero charge (pH$_{PZC}$) values, and shown in FIG. 21B. Cyclic voltammograms of the electrodes were carried out at 0.5 mV s$^{-1}$ in 4.3 mM deaerated NaCl solution and shown in FIG. 21C. The capacitance was calculated via the current density divided by the voltage scan rate. The pH$_{PZC}$ and potential of zero charge ($E_{PZC}$) values are highlighted by arrows in FIGS. 21B and 21C.
Figure 21B:
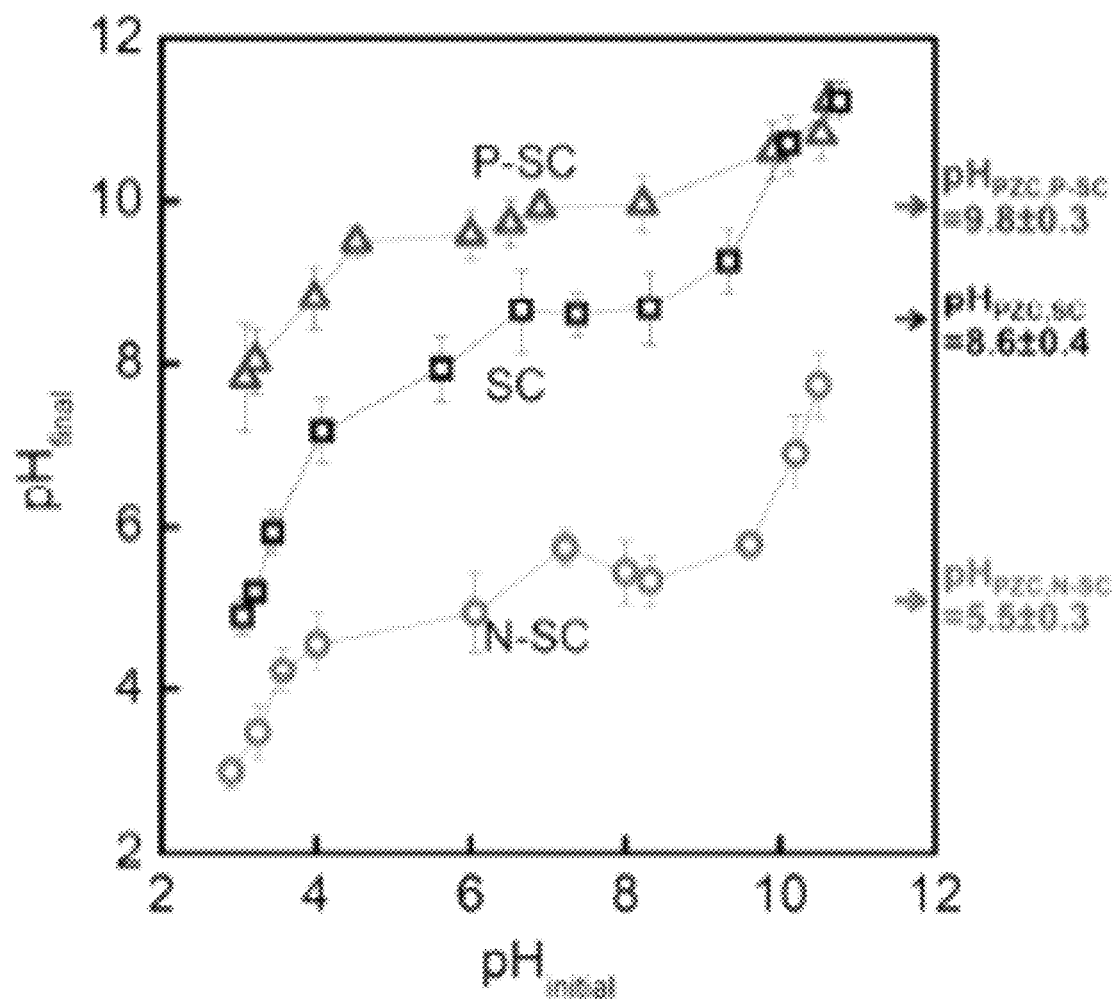
Figure 21C:
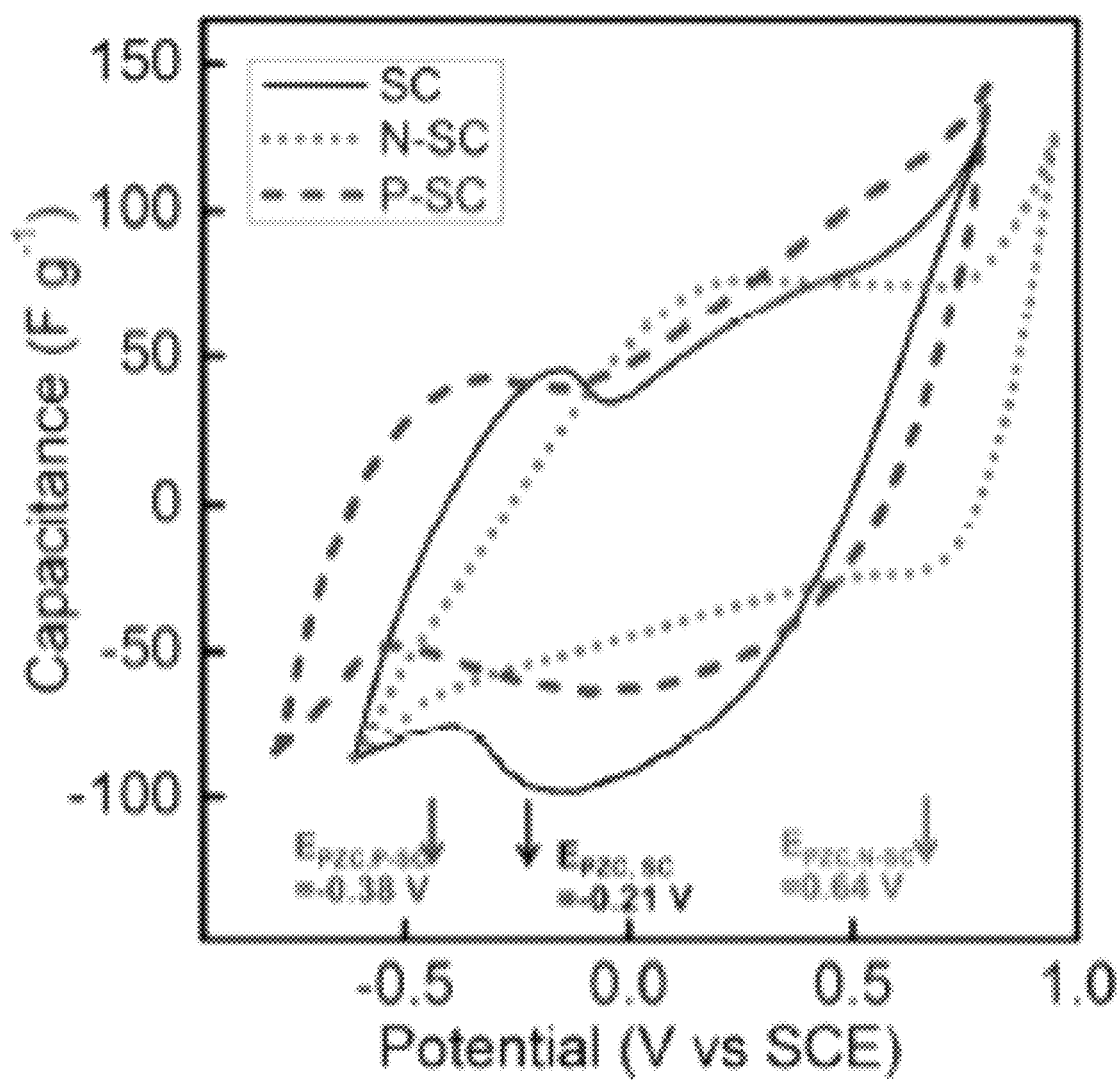
Figure 22A:
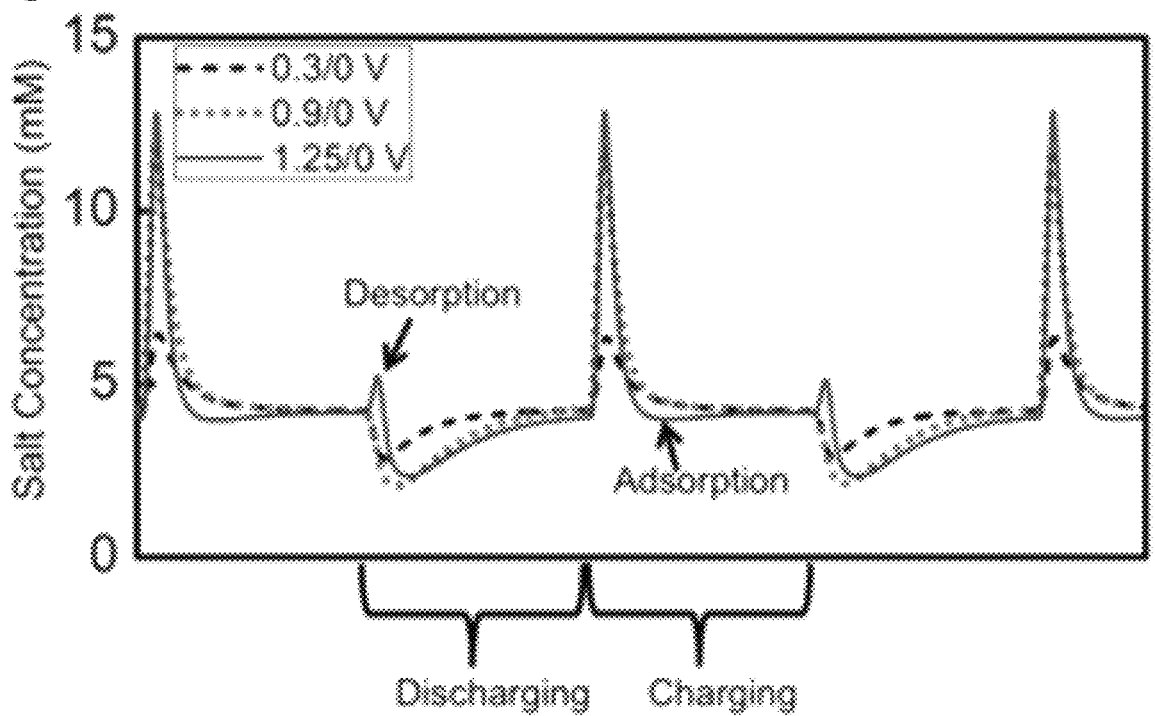
FIGS. 22A and 22B show selected cycles when an i-CDI cell was configured with 16 sheets of P-SC cathodes and 16 sheets of N-SC anodes by concentration (FIG. 22A) and by current density (FIG. 22B). These tests were performed at different charging voltages for salt desorption and a short-circuit voltage for salt adsorption (X/0 V, where X=0.15-1.25) in ~31 L of ~4.3 mM deaerated NaCl solution at 20 mL min$^{-1}$. Each charging and discharging half-cycle took 4000 s.
Figure 22B:
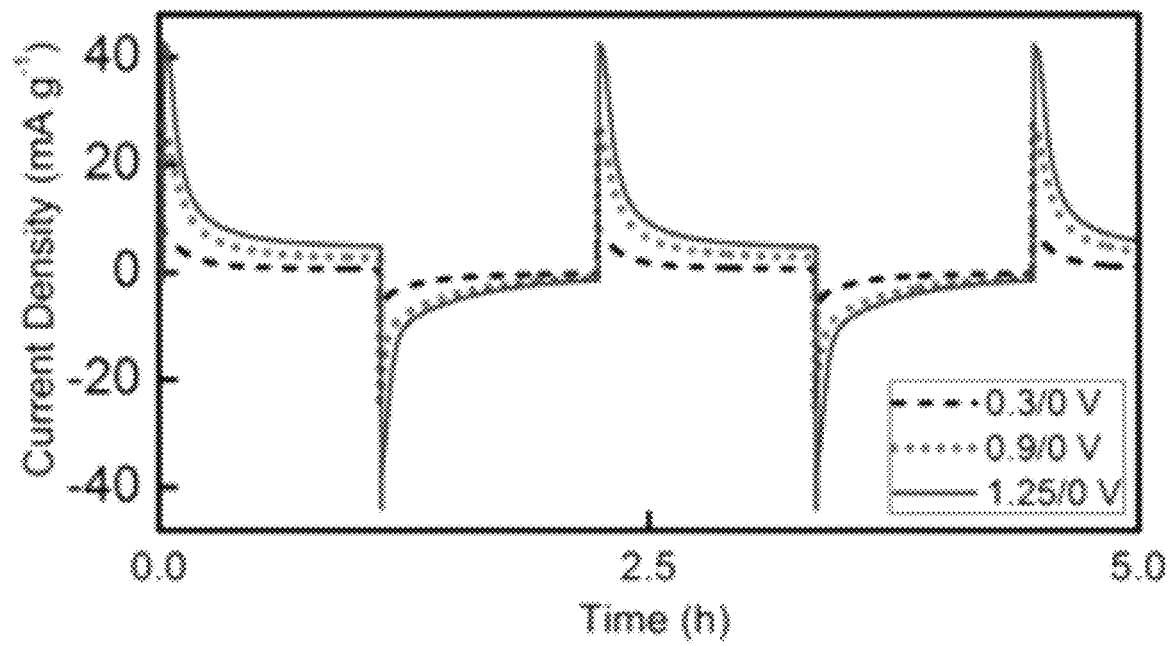
Figure 23A:
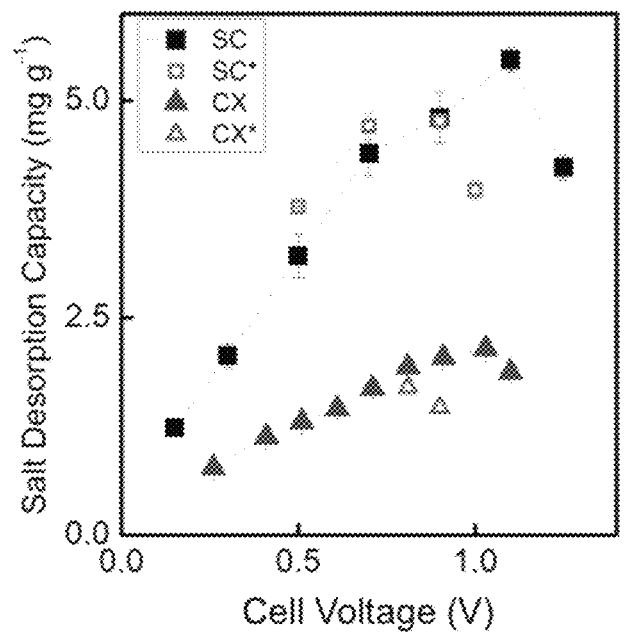
FIGS. 23A and 23B show performance evaluations of the charging step for salt desorption (FIG. 23A) and the short-circuit for salt adsorption for i-CDI cells configured with surface charge enhanced SC and CX electrodes (FIG. 23B). CX* and SC* designate i-CDI cells configured with pristine cathodes instead of P-CX and P-SC cathodes.
Figure 23B:
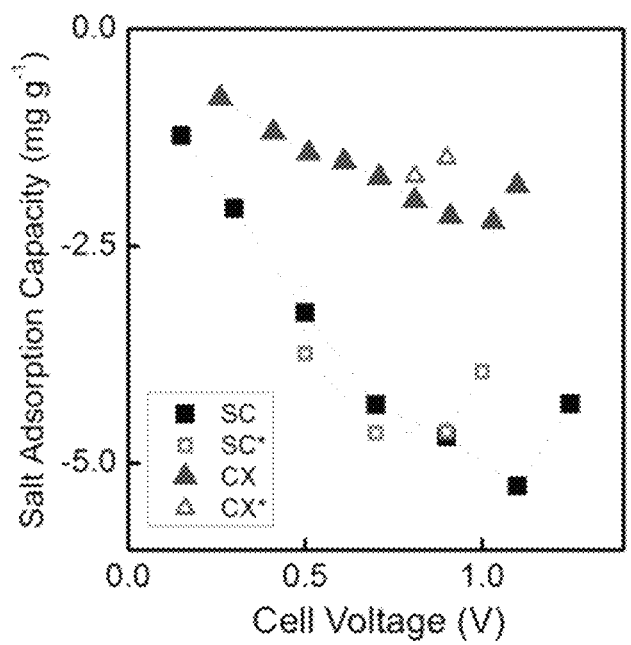
Figure 24A:
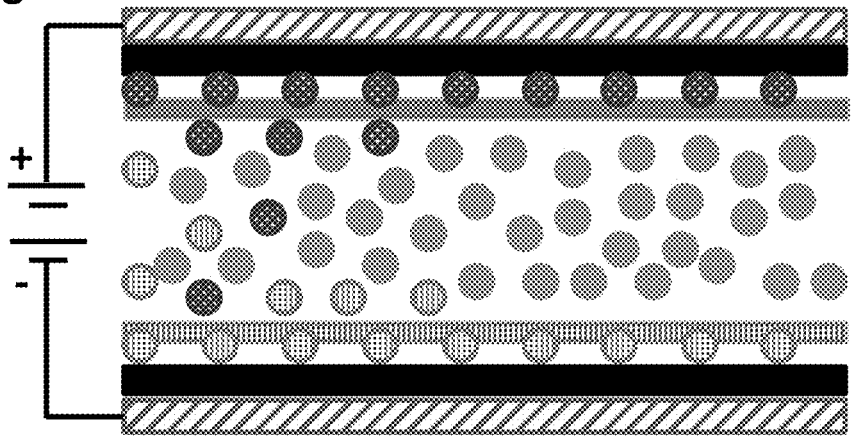
FIGS. 24A and 24B show a membrane capacitive deionization (MCDI) process in which salt is adsorbed/removed under the influence of an applied potential (supplied here by a power source) (FIG. 24A) and desorbed when the potential is reduced, short-circuited, removed, or reversed where anion exchange membranes are placed over the anode electrodes and cation exchange membranes are placed over the cathode electrodes (FIG. 24B).
Figure 24B:
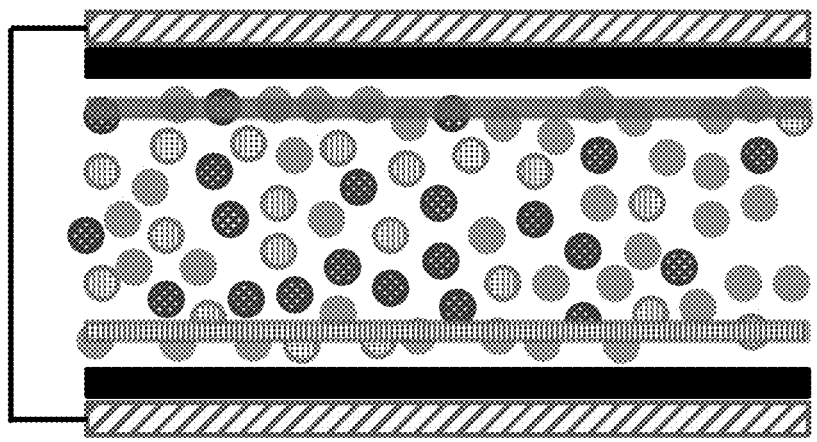
Figure 25A:
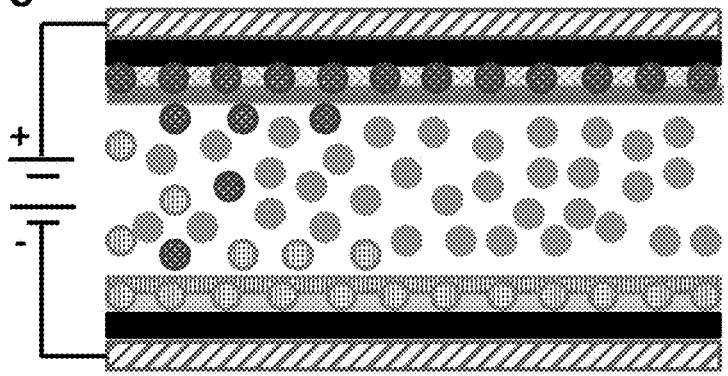
FIGS. 25A and 25B) show asymmetric membrane capacitive deionization (aMCDI) with positive surface charge enhanced anodes and negative surface charge enhanced cathodes.
Figure 25B:
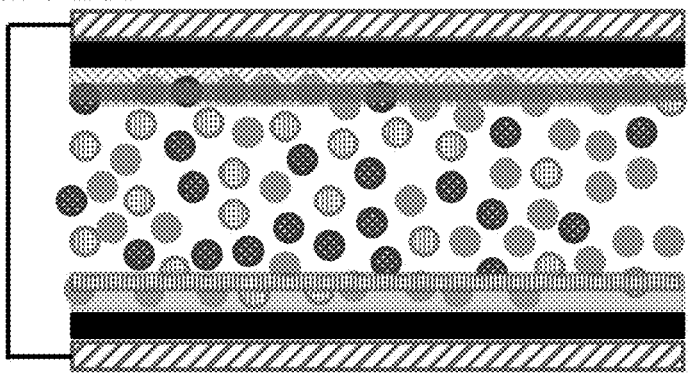

The inventors have confirmed shifting of the anode $E_{PZC}$ in the positive direction in both conventional CDI experiments shown in FIG. 7, as well as the i-CDI process shown in FIG. 12, with electrodes noted as N-CX and N-SC in FIGS. 21A-21C for negatively surface charged electrodes. An analogous method to shift the cathode $E_{PZC}$ in the negative direction, increasing the working voltage window in an i-CDI process, uses amine treatments with ethylenediamine to create amine functional groups on the carbon surface, which will be positively charged in an aqueous solution yielding a negatively shifted $E_{PZC}$ (denoted as P-CX and P-SC in FIGS. 21A-21C). As shown in FIGS. 22A-22B and 23A-23B, when the pristine cathode is replaced by amine-functionalized carbon (P-CX or P-SC), the working voltage is increased to ≥1.0 V. The data shown here is for amine treated carbon cathodes, but any surface groups that can negatively shift $E_{PZC}$ (by creating positive surface charges) will result in the enhanced voltage window for an i-CDI process.

For carbon-based electrostatic separations, the role of the $E_{PZC}$ of the carbon electrode, or any electrode, is fundamental to a successful separation (adsorption of ions from an input stream). In the examples shown so far, cumulative carbon oxidation of CDI cells has been shown to result in a positively shifted $E_{PZC}$, which results in a diminished capacity for salt removal for conventional CDI. When the $E_{PZC}$ for the carbon anode is purposefully shifted in the positive direction, either through oxidation or other surface functional groups (such as silica groups), this electrode can be paired with a cathode possessing a negatively shifted $E_{PZC}$ (created through reduction or other surface functional groups, such as amine groups) to produce an inverted capacitive deionization cell in which separation performance does not degrade with cumulative adsorption/desorption cycles compared to conventional CDI cells. Next, the effect of $E_{PZC}$ on more complicated capacitive deionization systems will be shown, further demonstrating the importance of this parameter in electrostatic separation and improvements enabled by the disclosed invention.

For comparison to CDI, if an i-CDI cell were implemented with a separation lifetime of 365 days (compared to 10 days for conventional CDI shown previously), and the initial and replacement costs were $5000 for the unit, this would amount to a 2-year cost of $10,000 since the unit would need to be replaced every year, an obvious improvement over conventional CDI, which had an estimated 2-year cost of $365,000 value.

Asymmetric Membrane Capacitive Deionization

Membrane capacitive deionization (MCDI), as shown in FIGS. 24A-24B and 25A-25B, is a modification of traditional CDI that somewhat mitigates the diminishing salt adsorption capacity and charge efficiency seen with the use of conventional CDI cells. With respect to application of voltage to cell electrodes from an external power supply, operation of an MCDI cell is the same as operation of a CDI cell. The structural difference between CDI and MCDI cells is the addition of ion exchange membranes that are coaxial or coplanar with the anode(s) and cathode(s) in a cell. A membrane surrounds an anode or cathode and forms a semipermeable barrier between the input stream and an electrode. Both CDI and MCDI electrostatically concentrate (by adsorption) charged salt content (and other ions) from a solution onto the electrostatically attractive surfaces of porous carbon electrodes. A traditional CDI cell is formed with porous cathodes and anodes, usually carbonaceous material, separated by a volume of input stream, as described above. In MCDI, complementary anion-attracting and cation-attracting membranes are attached to the anode and cathode, respectively; the membranes form a barrier between each electrode and the solution space. The net effect is an increase in electrosorption capacity due to the enhanced selectivity of adsorption offered by each ion-selective membrane. This increase is accomplished by each membrane's ability to (i) restrict co-ion transport from the carbon electrodes to the input stream and (ii) balancing co-ions which are expelled from the carbon surface with additional counter-ions from the input stream via their access through the ion-selective membrane. Related art in MCDI technology includes (i) flow electrode MCDI (EPPAT 2857442 assigned to Korea Institute of Energy Research), (ii) potential reversal for cell regeneration (USPAT 8685255 assigned to Voltea), and (iii) preparation of anionic exchange membranes for the mitigation of co-ion repulsion (EPPAT 2641654 assigned to Voltea).

MCDI, as well as CDI, cells are customarily assembled using the same, pristine electrode material for both the cathode and anode electrode; electrodes in capacitive deionization cells must be highly conductive and porous enough to adsorb a significant quantity of ions. In an improvement over known CDI and MCDI art, the inventions disclosed herein for MCDI cells show (1) electrodes with targeted surface functional groups capable of hydrolyzing when exposed to an aqueous solution to become charged surface groups, and (2) leveraging these charged surface groups to effectively attract counter-ions. The inventors have discovered that charged surface groups shift the position of the potential of zero charge ($E_{PZC}$) (as shown in FIG. 9), despite a given membrane's ion-selective property, and that MCDI performance can still be affected by the $E_{PZC}$ because the solution is in direct contact with the electrode. The "$E_{PZC}$ shifting" process disclosed above can also be adapted to improve MCDI performance by identifying the location of the $E_{PZC}$s and synergistically combining shifted $E_{PZC}$s with the function of the membrane during the charge and discharge cycles of MCDI operation. These improved MCDI cells are called asymmetric membrane capacitive deionization ("aMCDI") cells, and the associated "$E_{PZC}$ shifting" processes are called aMCDI methods.

Figure 26A:
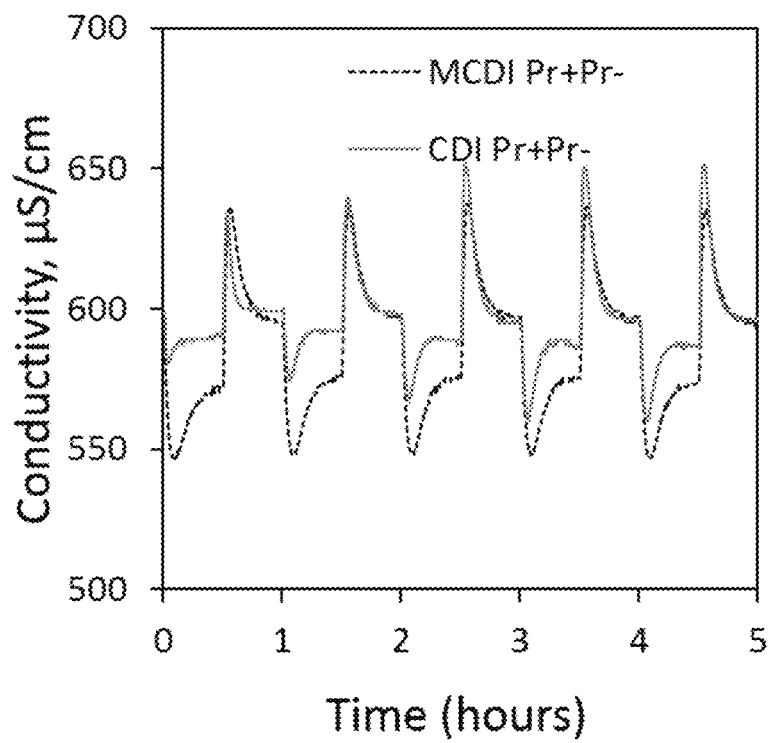
FIGS. 26A and 26B show a comparison of CDI and MCDI performance. Conductivity profiles (FIG. 26A) and zoomed-in conductivity profiles (FIG. 26B). Cycle operation at 1.2/0 V with recirculation of 600 ml of 5 mM NaCl solution in a batch mode setup formed with carbon xerogel electrodes.
Figure 26B:
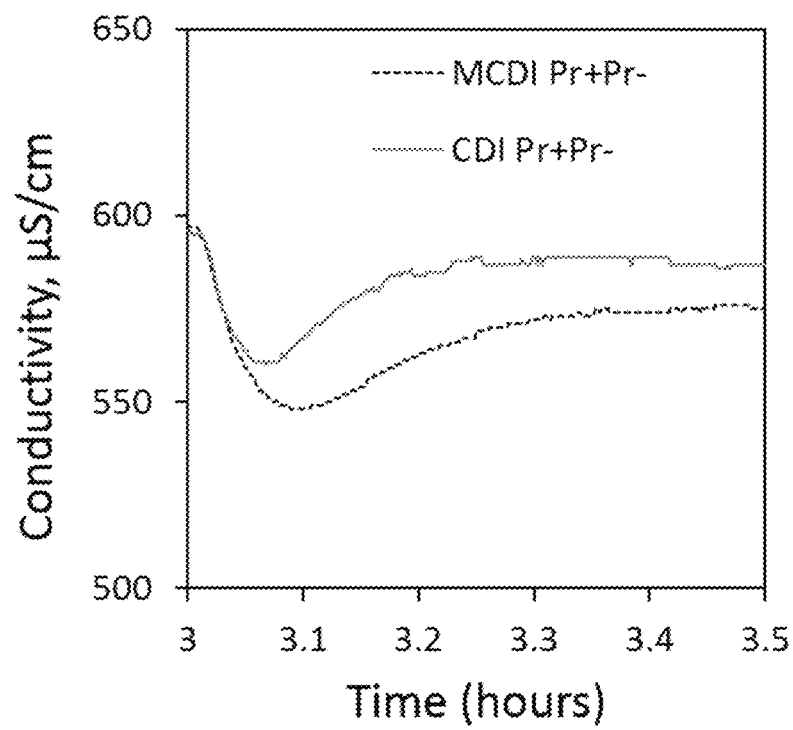
Figure 27A:
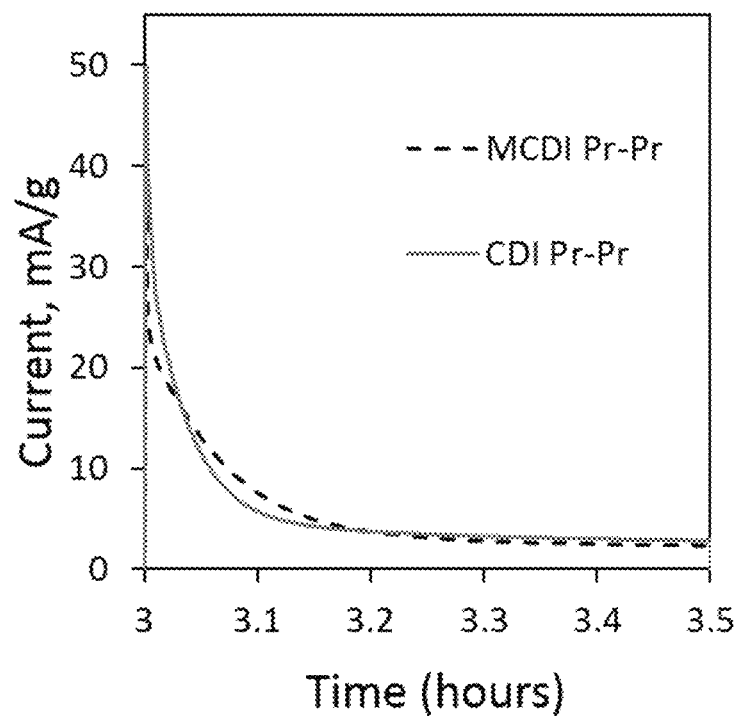
FIGS. 27A and 27B show a comparison of CDI and MCDI performance. Charging current (FIG. 27A) and electrosorption capacity over testing period (FIG. 27B). Cycle operation at 1.2/0 V with recirculation of 600 ml of 5 mM NaCl solution in a batch mode setup formed with carbon xerogel electrodes.
Figure 27B:
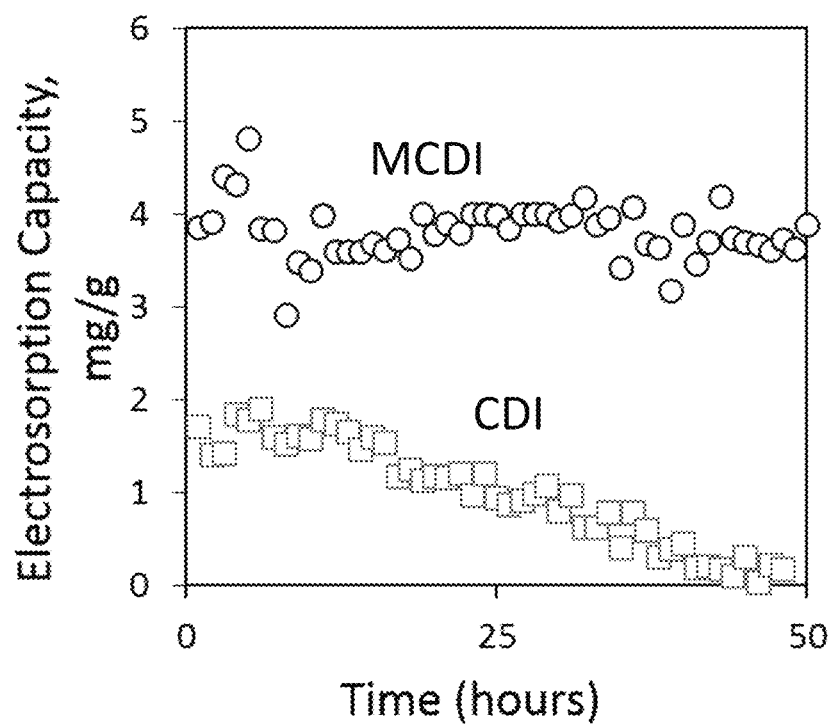
Figure 28A:
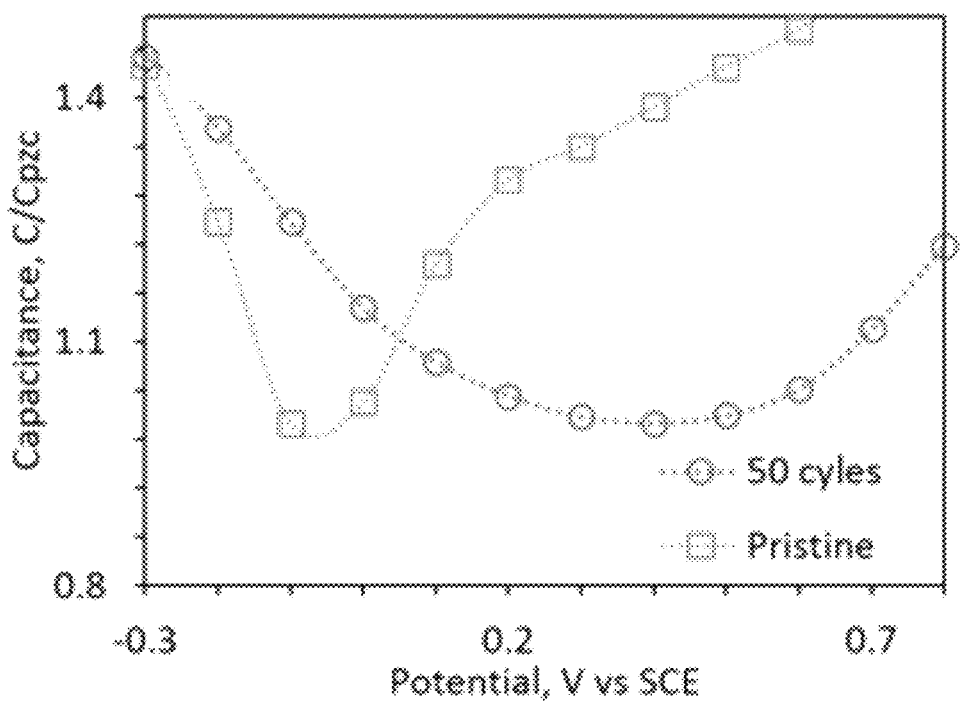
FIGS. 28A and 28B show post-measurement of potential of zero charge ($E_{PZC}$) of used CDI carbon xerogel (CX) electrodes at the anode (FIG. 28A) and at the cathode (FIG. 28B).
Figure 28B:
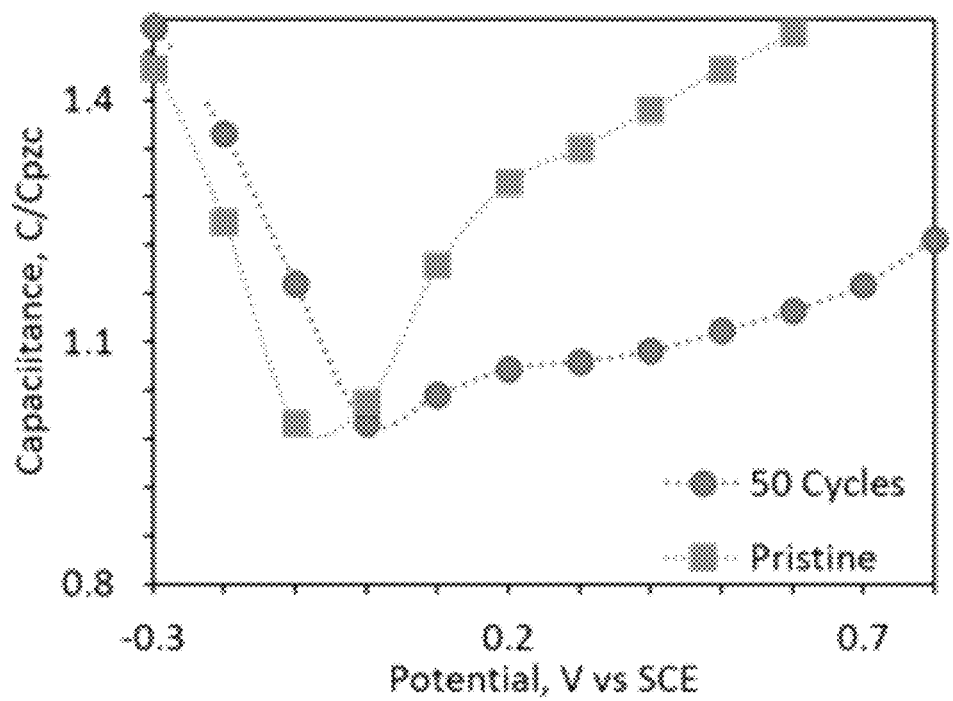
Figure 29A:
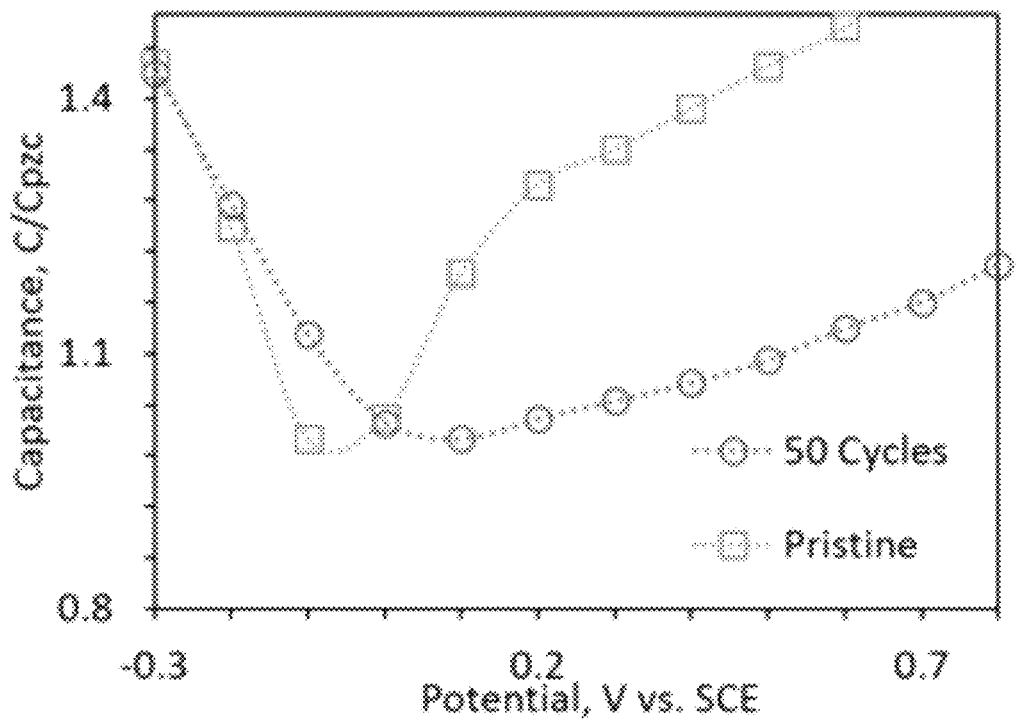
FIGS. 29A and 29B show post-measurement of potential of zero charge ($E_{PZC}$) of used MCDI carbon xerogel (CX) electrodes at the anode (FIG. 29A) and at the cathode (FIG. 29B). MCDI suppresses shifting of $E_{PZC}$.
Figure 29B:
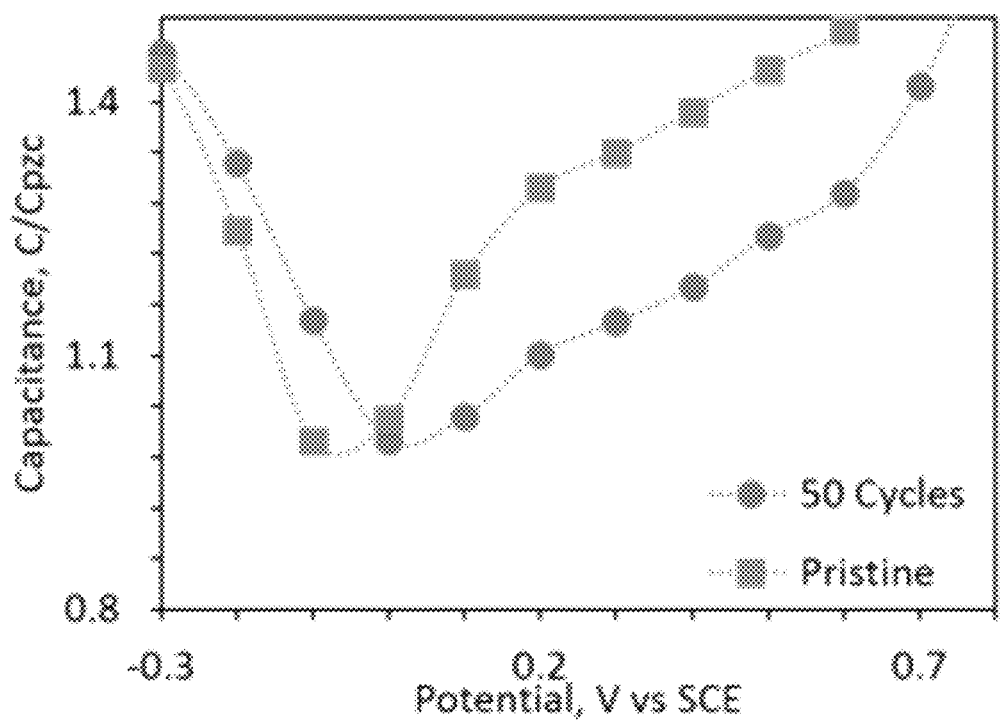

FIGS. 26A and 26B compare the performance over hours of use of traditional CDI and MCDI cells formed with carbon xerogel (CX) electrodes. CX electrodes possess a mesoporous structure with a nominal surface area of ~200 $m^2$/g. The electrodes are labeled as pristine as they do not undergo any treatment before the experiments shown here. MCDI obviously outperforms CDI, and shows a larger drop in conductivity. FIG. 27A shows that while CDI may initially have more electronic charge passed in the ohmic region, MCDI outpaces CDI in the capacitive region and can also lead to reduced charge leakage as evidenced by the lower final current values. Ultimately, when CDI and MCDI cells are continuously cycled, there is more charge passed in the CDI cell, albeit at a lower efficiency due to greater leakage current. Over the test period (FIG. 27B), MCDI shows better performance preservation compared to CDI (similar to the results shown in FIG. 4). Post operation $E_{PZC}$ analysis using impedance spectroscopy shows significant $E_{PZC}$ relocation for the CDI anode while the CDI cathode, MCDI anode, and MCDI cathode show fractional relocation, as shown in FIGS. 28A-28B and 29A-29B. This implies that the membrane in MCDI is capable of maintaining $E_{PZC}$ positions over cumulative cell cycles.

Figure 30A:
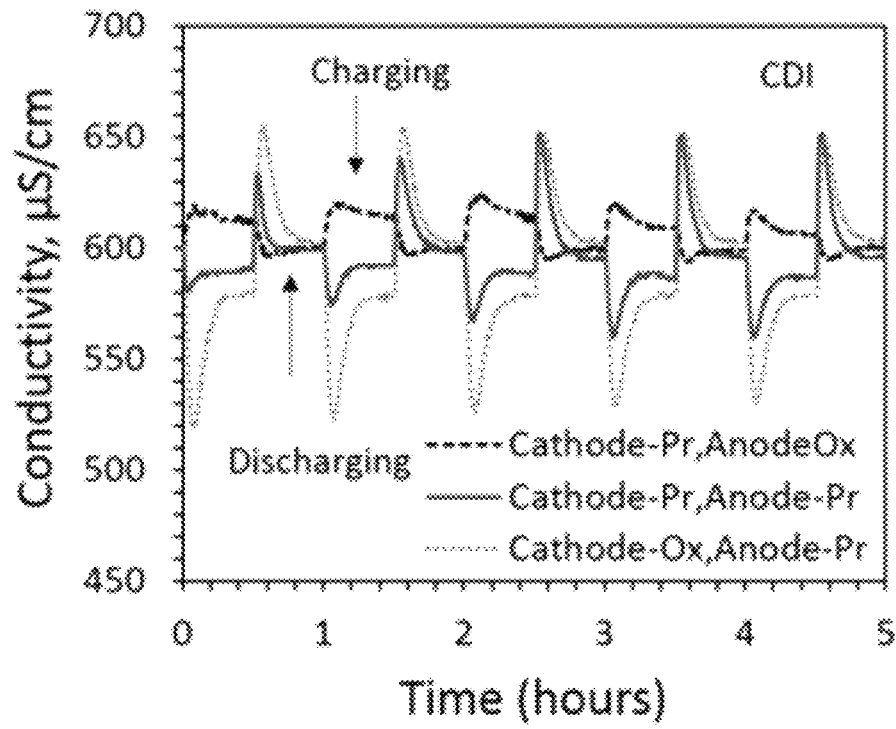
FIGS. 30A and 30B show performance of CDI (FIG. 30A) and MCDI (FIG. 30B) cells configured with combinations of pristine and oxidized CX electrodes. Cycle operation at 1.2/0 V with recirculation of 600 ml of 5 mM NaCl solution in a batch mode setup formed with carbon xerogel electrodes.
Figure 30B:
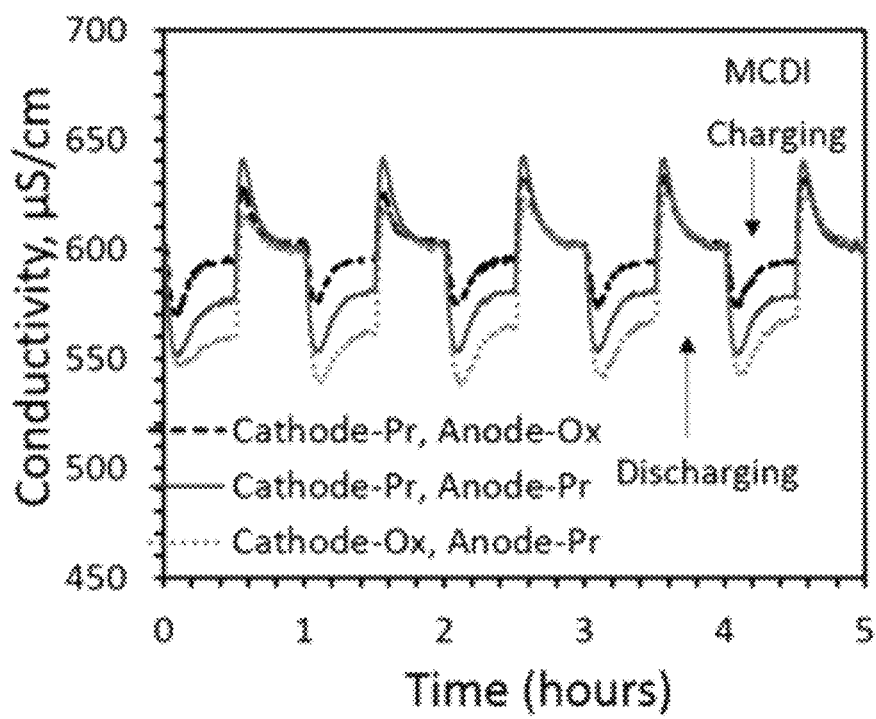
Figure 31A:
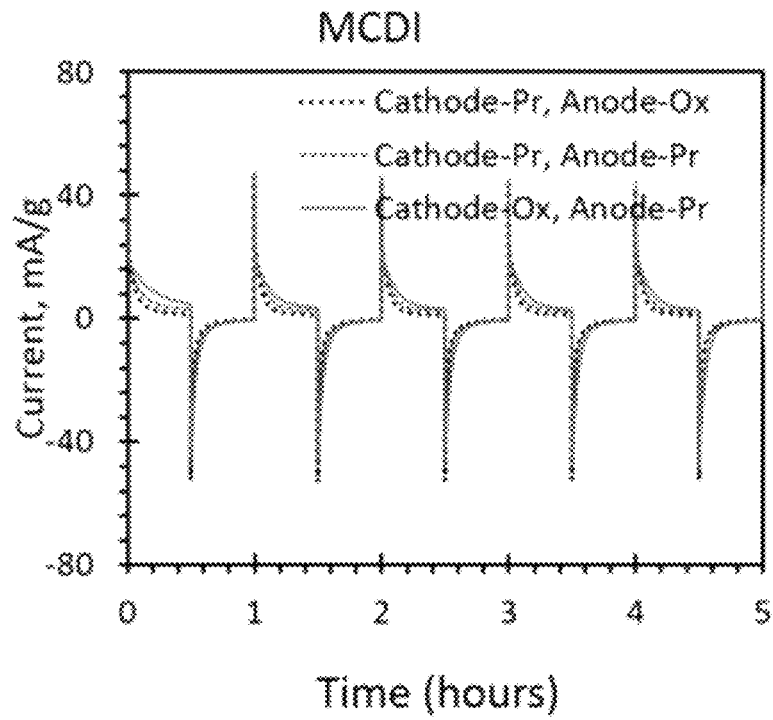
FIGS. 31A and 31B show electronic charge performance of MCDI cells configured combinations of pristine and oxidized CX electrodes (FIG. 31A) and zoomed-in current profile (FIG. 31B). Cycle operation at 1.2/0 V with recirculation of 600 ml of 5 mM NaCl solution in a batch mode setup formed with carbon xerogel electrodes.
Figure 31B:
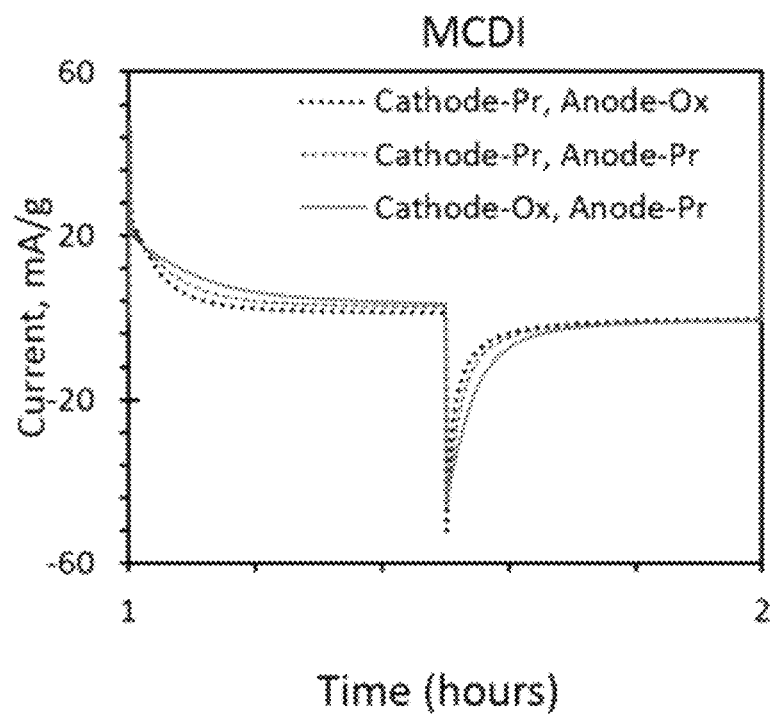
Figure 32A:
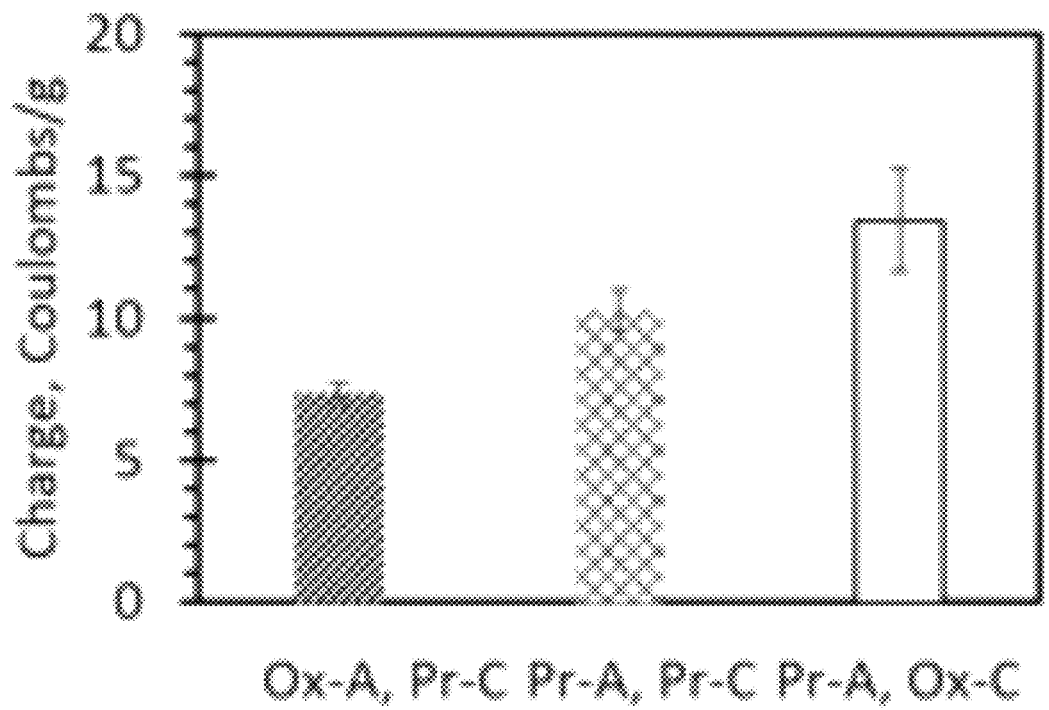
FIGS. 32A, 32B, and 32C show summaries of performance results for MCDI cells configured with combinations of pristine (Pr) and oxidized (Ox) electrodes used as anodes (legend "A") and cathodes (legend "C"), including charge passed (FIG. 32A), salt adsorption capacity (FIG. 32B), and charge efficiency (FIG. 32C).
Figure 32B:
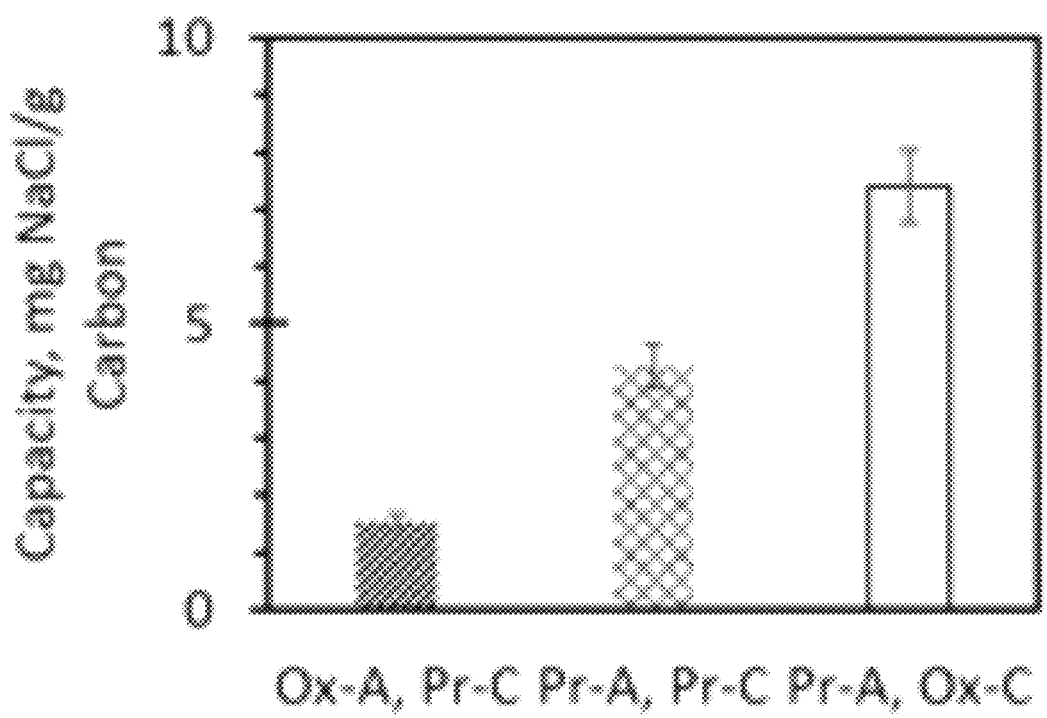
Figure 32C:
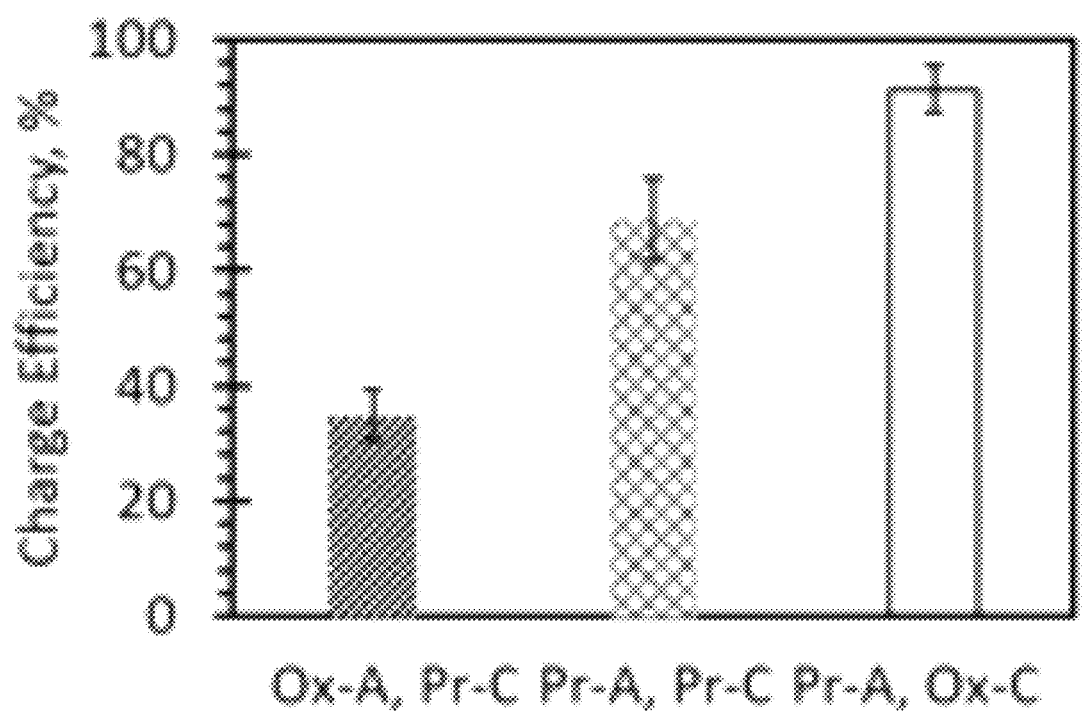

In a further demonstration of the impact of $E_{PZC}$ location on deionization, pristine and oxidized CX electrodes were paired to form CDI and MCDI cells. The $E_{PZC}$ s for the pristine and oxidized electrodes as identified by electrochemical impedance spectroscopy (EIS) were ~-0.1 V and +0.5 V vs. SCE electrode, respectively, implying that the pristine electrode would naturally adsorb anions whereas the oxidized electrode will naturally adsorb cations in the absence of an applied electronic charge and at short-circuit conditions. FIGS. 30A and 30B show that in contrast to the conventional configuration of using similar pristine electrodes at both the anode and cathode locations, when the CDI and MCDI cells were instead assembled with a pristine electrode at the anode and the oxidized electrode at the cathode, thereby maximizing the potential for counter-ion excesses within the working voltage windows, there was increased adsorption over their respective, pristine-pristine configurations. Conversely, assembling either the CDI or MCDI cell with a pristine cathode and an oxidized anode resulted in diminished or inverted performance. The current profiles for the MCDI cell configurations (FIGS. 31A and 31B) show increases in electronic charge passed in the order of: pristine anode-oxidized cathode, pristine anode-pristine cathode, and oxidized anode-pristine cathode. The pristine anode-oxidized cathode MCDI configuration is hereafter referred to as asymmetric MCDI (aMCDI), while its CDI counterpart is asymmetric CDI (aCDI). Bar charts summarizing MCDI results are shown in FIGS. 32A-32C, and indicate that when an aMCDI cell is assembled with a pristine electrode at the anode and an oxidized electrode at the cathode, there is as much as a 75% increase in salt adsorption capacity over the respective pristine-only MCDI configuration. Compared to a pristine-pristine CDI cell (~2.5 mg/g), this increase can be as much as 200% in salt adsorption capacity.

In FIGS. 30A-30B, FIGS. 31A-31B, and 32A-32C, when cells are assembled with a pristine anode and an oxidized cathode, the counter-ion excesses within the working voltage window were maximized, and this electrode configuration is considered suitable for an operational mode of charging at 1.2 V and discharging at 0 V. In contrast, when the cell was assembled with an oxidized anode and a pristine cathode, co-ion excesses are maximized within the working voltage window. This configuration is operationally unsuitable for capacitive deionization. In FIG. 30A, an inverted profile is observed for the oxidized anode and a pristine cathode CDI configuration such that the conductivity when discharging is larger than during charging. However, having the membrane in-place (FIG. 30B, MCDI configuration) can suppress the inverted profile observed with the CDI configuration of oxidized anode and pristine cathode. This example of aMCDI (pristine anode-oxidized cathode MCDI configuration) shows that shifting $E_{PZC}$ s in CDI and MCDI operation provides substantial additional benefits, e.g., significantly improved desalination performance, when appropriately configured.

$E_{PZC}$ Effect in MCDI with Zorflex® Carbon Electrodes

Figure 33A:
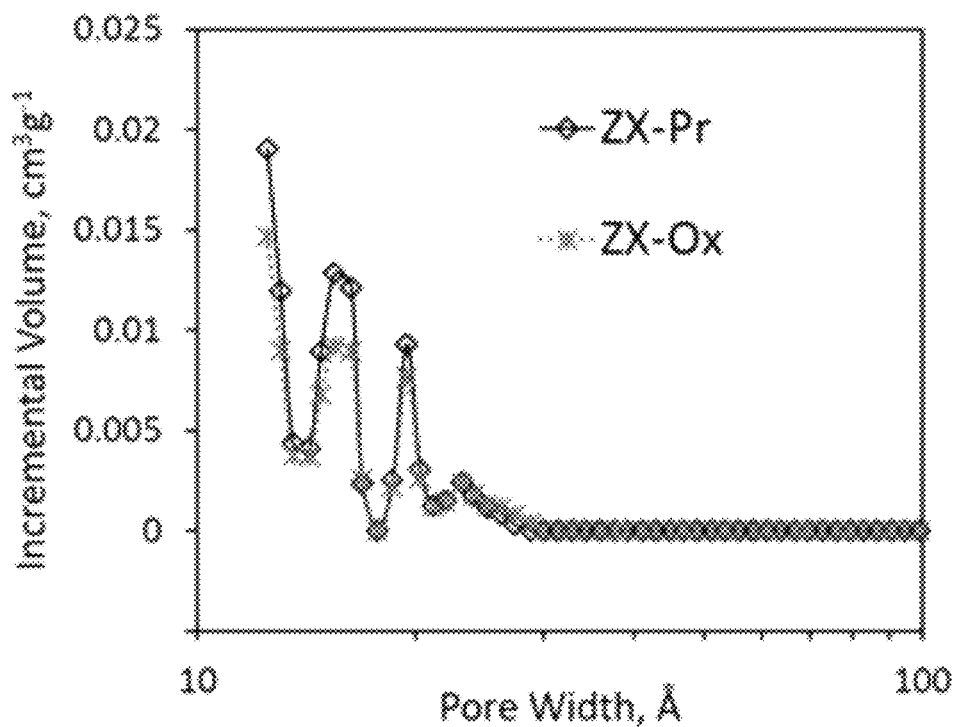
FIGS. 33A and 33B show pore distribution (FIG. 33A) and differential capacitance curves for $E_{PZC}$ location (FIG. 33B) of pristine (Pr) and oxidized (Ox) Zorflex® (ZX) electrodes.
Figure 33B:
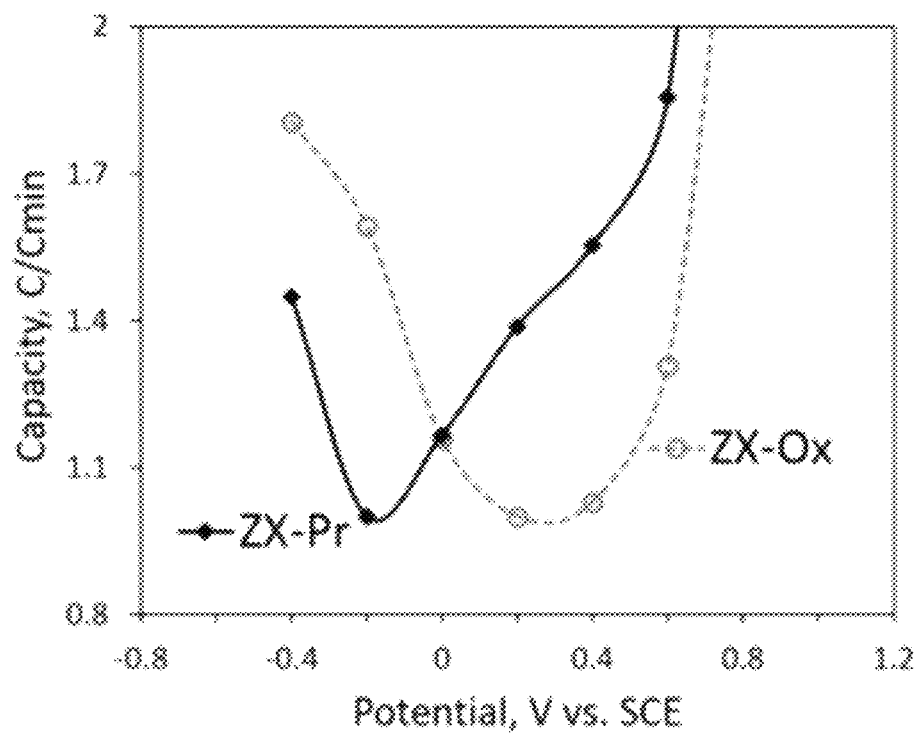
Figure 34A:
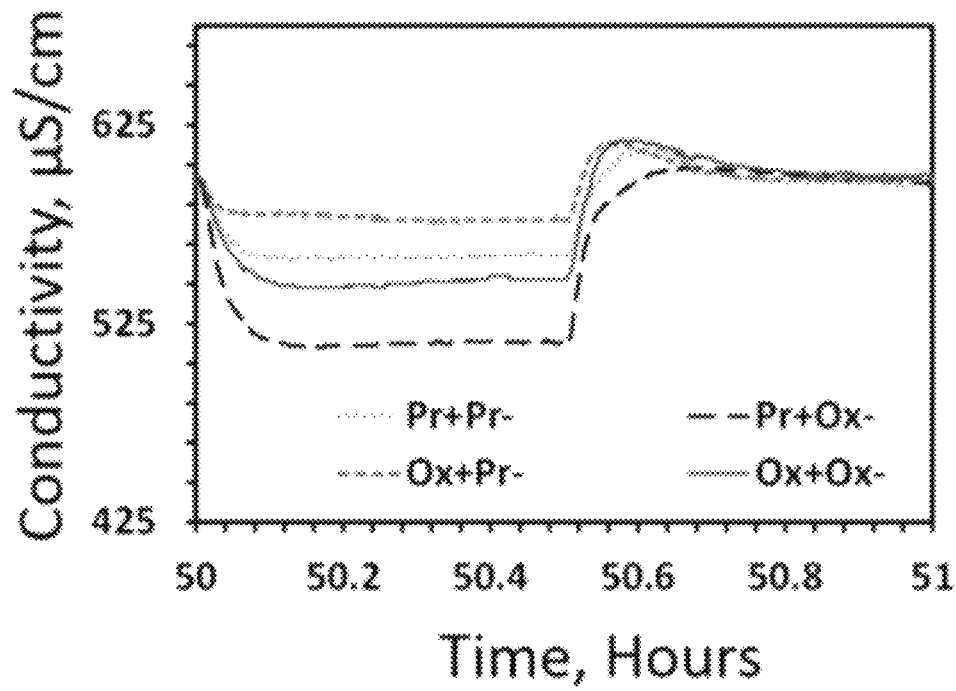
FIGS. 34A and 34B show conductivity (FIG. 34A) and current (FIG. 34B) profiles of MCDI cells formed with combinations of pristine (Pr) and oxidized (Ox) Zorflex® activated carbon as anodes (+) and cathodes (−). Cycle operation at 1.2/0 V with recirculation of 500 ml of 5 mM NaCl solution in a batch mode setup.
Figure 34B:
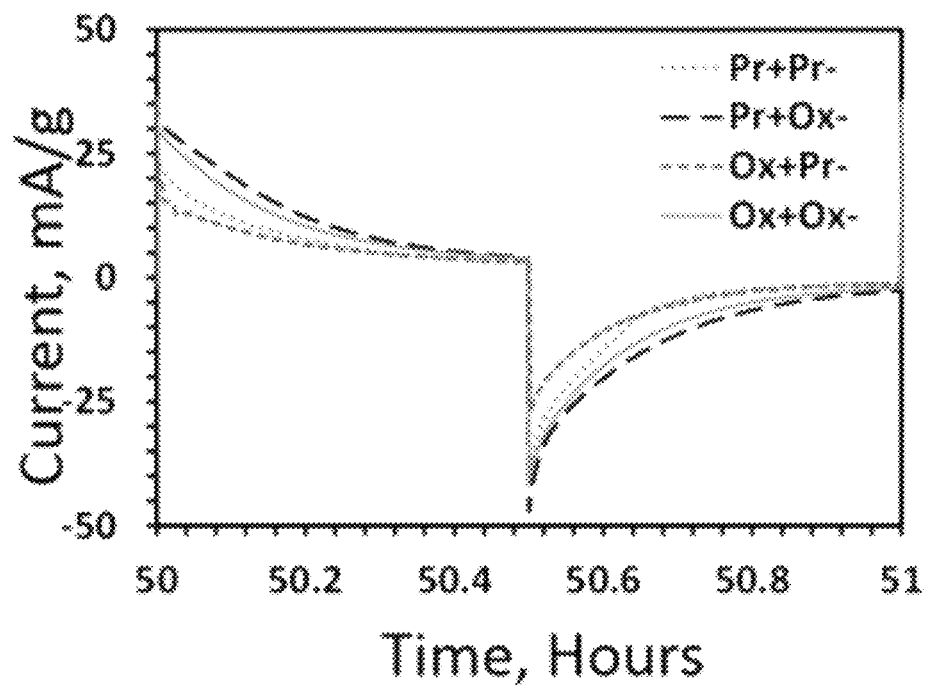
Figure 35A:
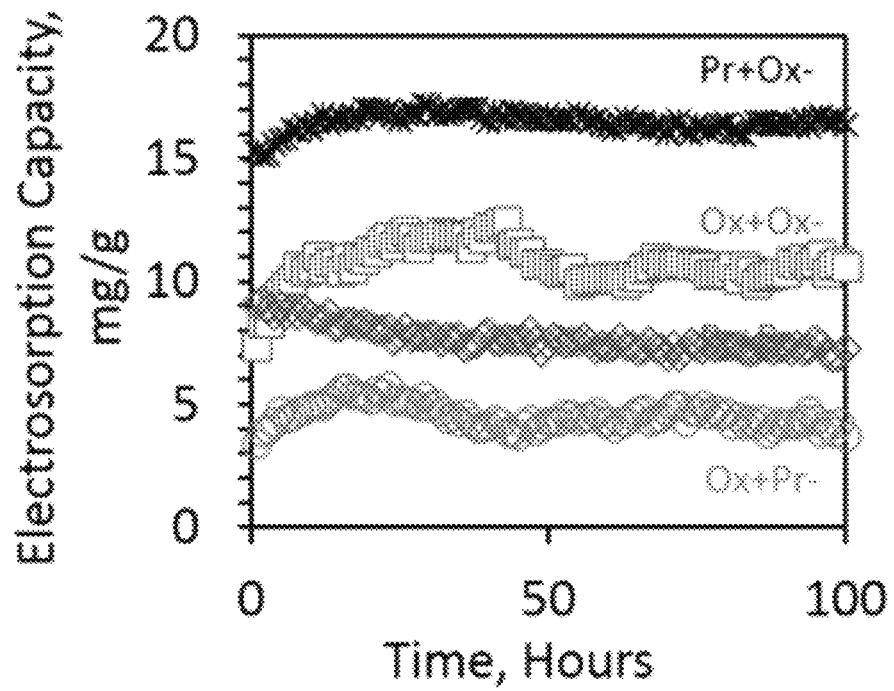
FIGS. 35A and 35B show long-term electrosorption (FIG. 35A) and charge efficiency (FIG. 35B) performance of MCDI cells formed with combinations of pristine (Pr) and oxidized (Ox) Zorflex® activated carbon as anodes (+) and cathodes (−). Cycle operation at 1.2/0 V with recirculation of 500 ml of 5 mM NaCl solution in a batch mode setup.
Figure 35B:
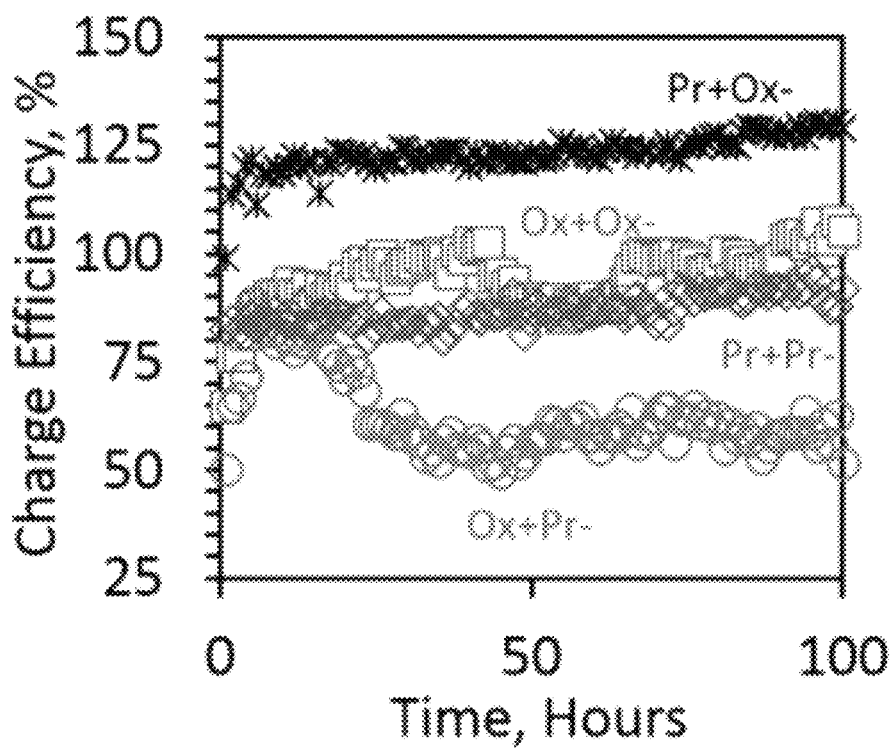

In order to demonstrate that the $E_{PZC}$-shifting method for MCDI performance improvement was not electrode specific, the aMCDI method was extended to Zorflex® activated carbon cloth electrodes (ZX). Pristine ZX is "as-supplied" ZX, without post-manufacture surface modification treatment. Oxidized ZX was synthesized via nitric acid treatment. Pristine and oxidized ZX possess a microporous structure as shown in FIG. 33A, and their respective $E_{PZC}$'s are (−)0.2 and (+)0.2 V vs. SCE reference electrode (FIG. 35B). The BET surface area for both the pristine and oxidized ZX's is 950 m²/g. Four combinations of the electrodes were used to form MCDI cells with electrode pairings that included: pristine anode-pristine cathode; oxidized anode-pristine cathode; pristine anode-oxidized cathode; and oxidized anode-oxidized cathode. As with results from the CX electrode MCDI cells (FIG. 33B), when the $E_{PZC}$ was configured in the aMCDI mode (pristine anode negative $E_{PZC}$) and oxidized cathode (positive $E_{PZC}$), improved ion adsorption was observed (FIGS. 34A and 34B). The highest salt adsorption capacity of ~17 mg NaCl/g ZX was likewise observed for the pristine anode-oxidized cathode cell, where both $E_{PZC}$'s were outside of the polarization window (FIGS. 35A and 35B). It was also found that the oxidized anode-oxidized cathode cell performed better than the pristine anode-pristine cathode cell despite both MCDI cells being formed from identical electrodes. This was attributed to the proximity of the oxidized $E_{PZC}$ to the short circuit potential ($E_o$). Long-term results (FIGS. 35A and 35B) show performance stability for all configurations over the testing period, which can be attributed to the ability of the membrane to localize the $E_{PZC}$ position and maintain performance.

$E_{PZC}$ Effect in MCDI with Spectracarb Carbon Electrodes

Figure 36A:
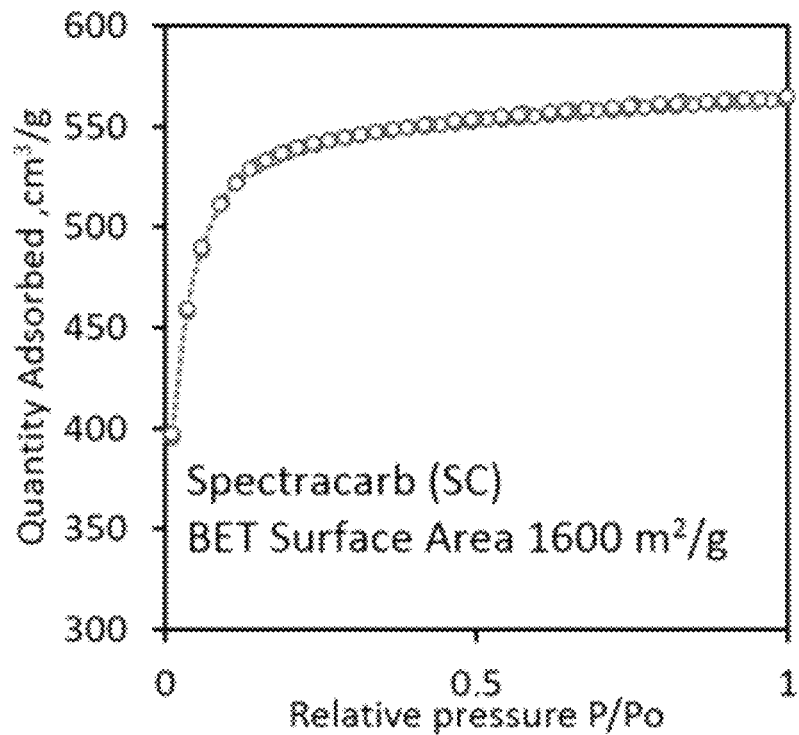
FIGS. 36A and 36B show nitrogen adsorption of Spectracarb (SC) electrodes (FIG. 36A) and the $E_{PZC}$ location of pristine and oxidized SC electrodes (FIG. 36B).
Figure 36B:
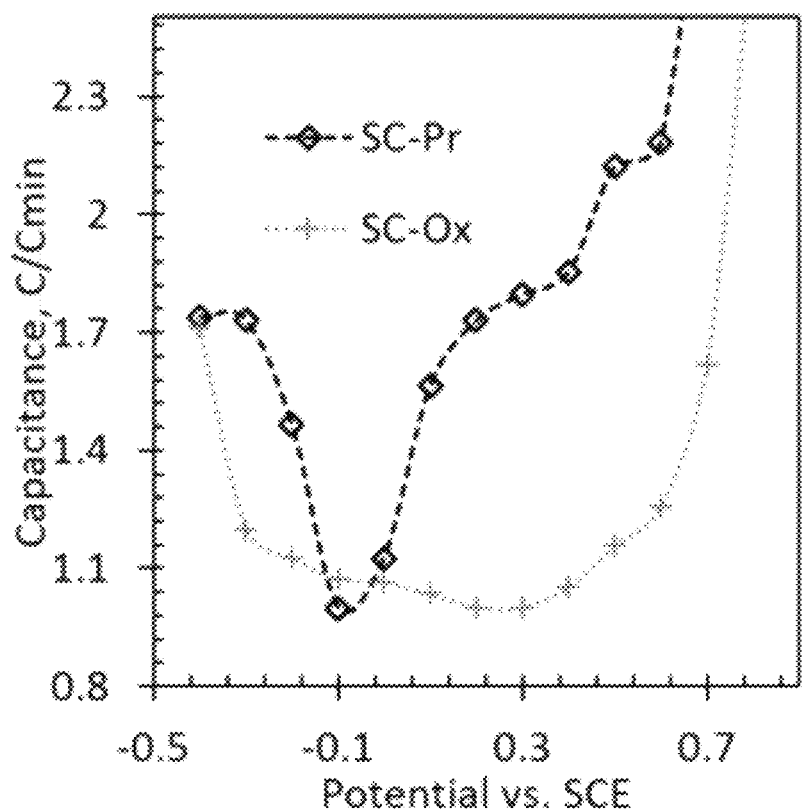
Figure 37A:
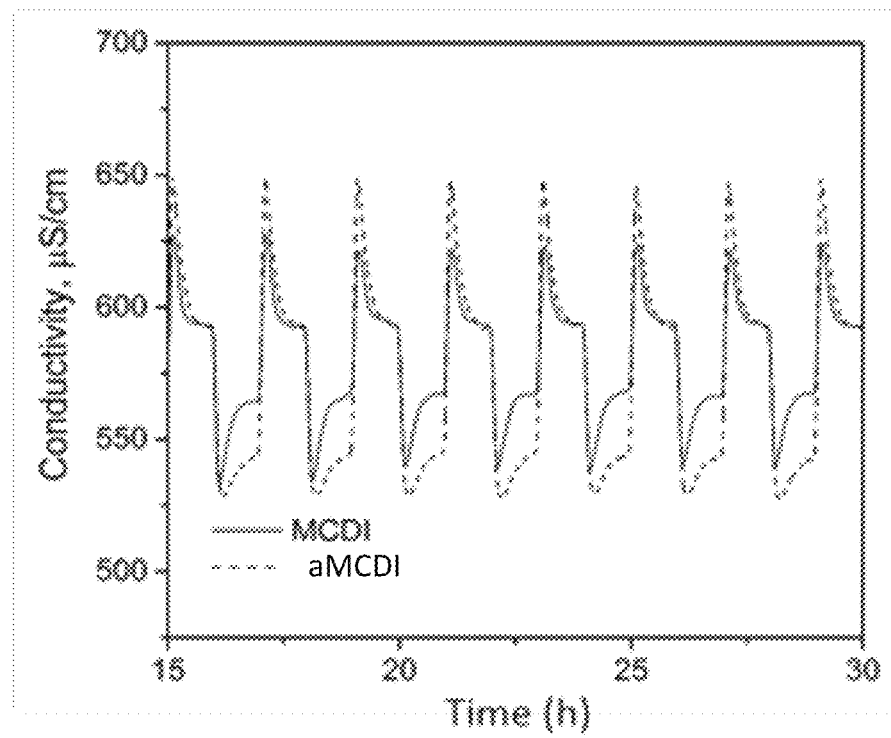
FIGS. 37A, 37B, 37C, and 37D show performance of MCDI and aMCDI cells with Spectracarb electrodes (SC) including conductivity (FIG. 37A), salt adsorption capacity (FIG. 37B), charge efficiency (37C), and charge passed (FIG. 37D). Cycle operation at 1.2/0 V with recirculation of 1000 ml of 5 mM NaCl solution in a batch mode setup.
Figure 37B:
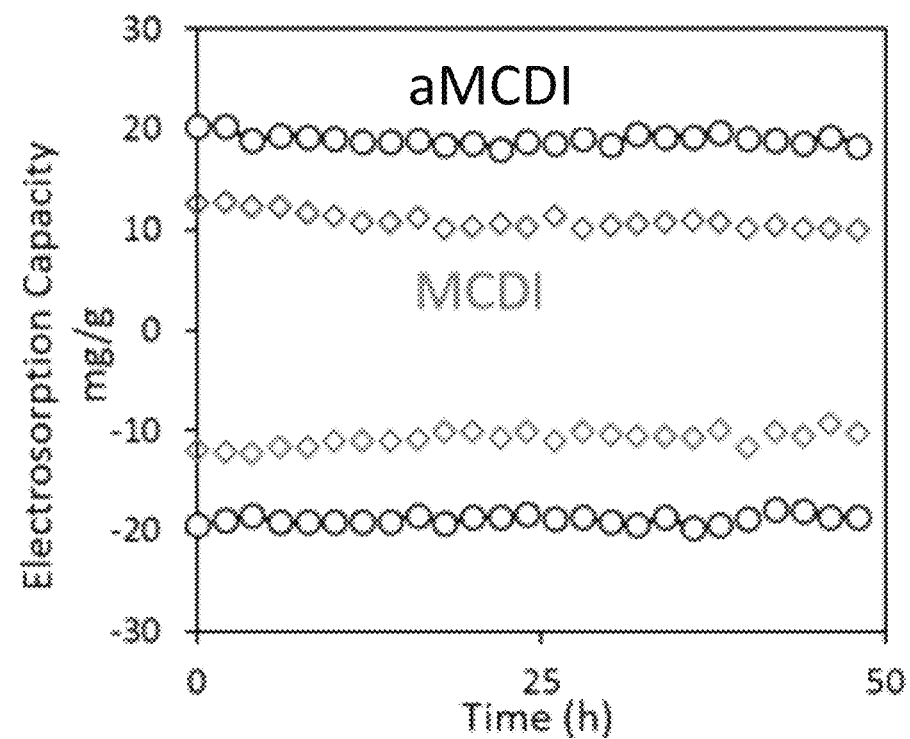
Figure 37C:
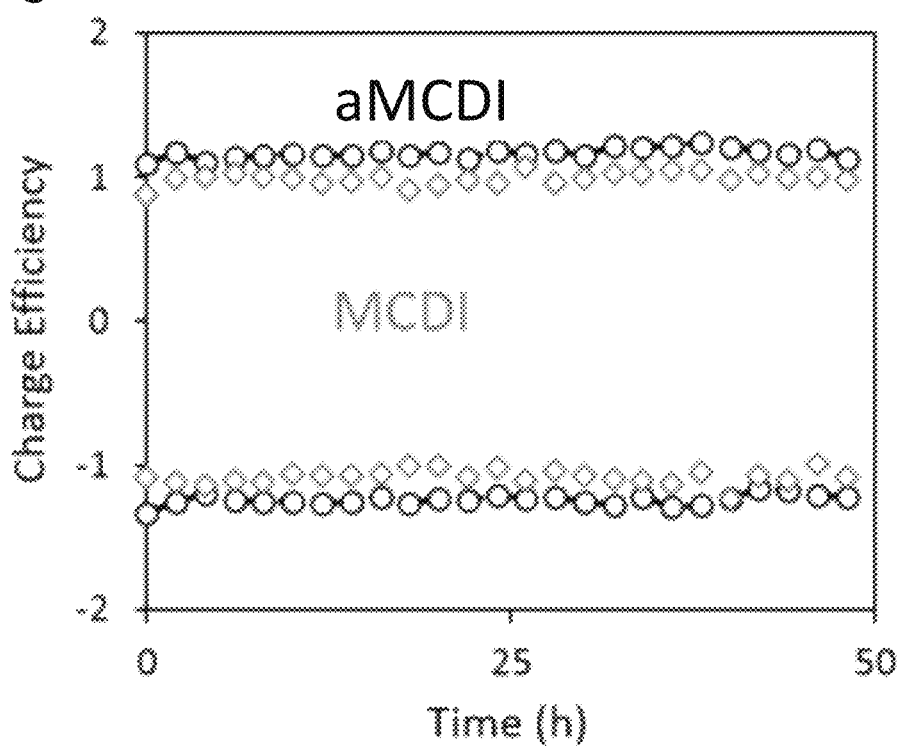
Figure 37D:
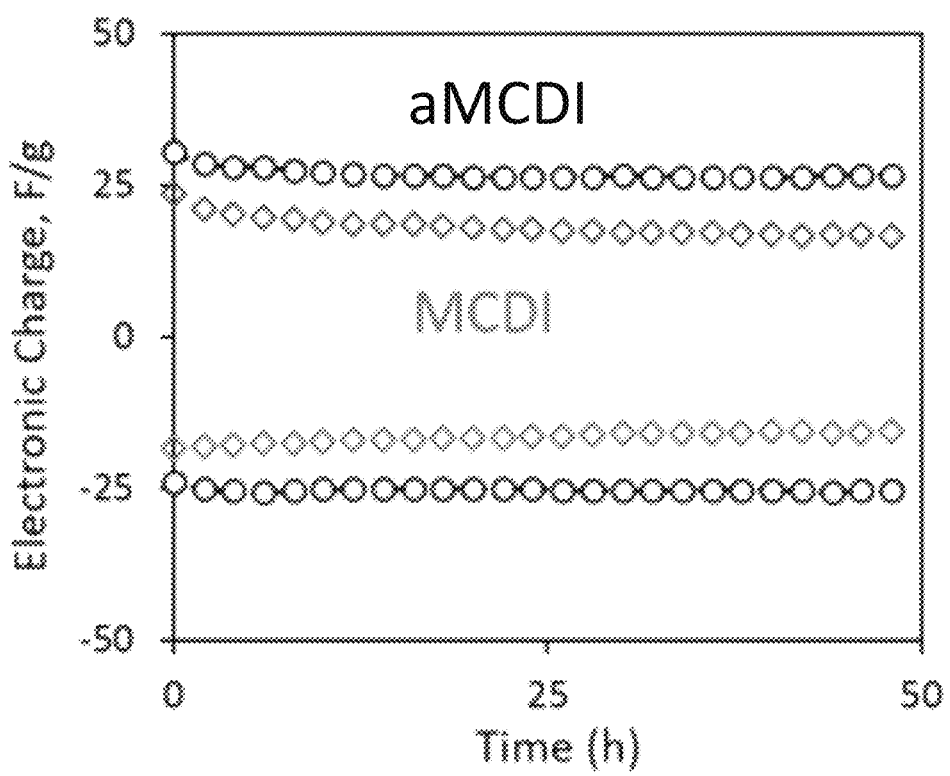

In an effort to further improve the performance of aMCDI, it was tested with high porosity, high surface area (1600 m²/g) Spectracarb (SC) electrodes. SC has a microporous structure (FIG. 36), and pristine SC is as-supplied SC. Oxidized SC was formed via nitric acid treatment, and their respective $E_{PZC}$s were (−)0.1 V and (+)0.3 V vs. SCE reference electrode (FIGS. 36A and 36B). Two cell combinations were compared: pristine anode-pristine cathode, and pristine anode-oxidized cathode. The pristine anode-oxidized cathode MCDI (i.e., aMCDI) showed a greater drop in conductivity than pristine anode-pristine cathode (FIG. 37A). Its nominal electrosorption capacity was ~20 mg/g (FIG. 37B). The aMCDI cell also passed more electronic charge, but both cells show near unity charge efficiency and excellent stability over the test period (FIGS. 37C and 37D) and mitigation of $E_{PZC}$ relocation. For comparison to CDI, if an MCDI or aMCDI cell were implemented with a separation lifetime of 180 days (compared to 10 days for conventional CDI shown previously), and the initial and replacement costs were $10000 for the unit (higher than CDI or i-CDI due to the inclusion of ion exchange membranes), this would amount to a 2-year cost of $40,556 since the unit would need to be replaced every 180 days; while more expensive than i-CDI, aMCDI is still an obvious improvement over conventional CDI, which had an estimated 2-year cost of $365,000 value. This estimate does not take into account the salt adsorption capacity, which is still a crucial value, or the salt adsorption rate.

Shifting $E_{PZC}$ Position for Single Membrane Operation

Figure 38A:
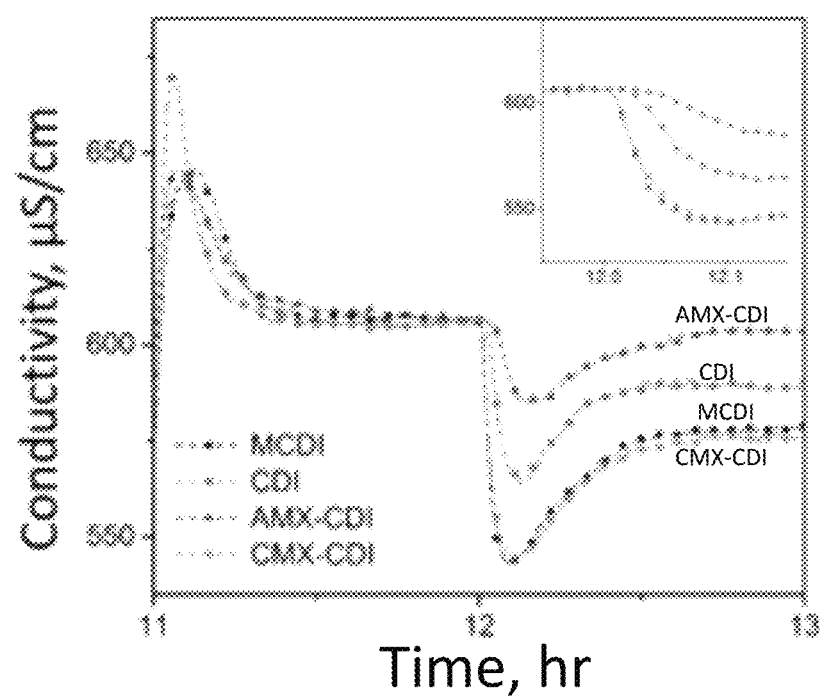
FIGS. 38A, 38B, and 38C show conductivity (FIG. 38A), dissolved oxygen (FIG. 38B), and pH (FIG. 38C) profiles of CDI, MCDI, cationic membrane only CDI (CMX-CDI), and anionic membrane only-CDI (AMX-CDI) cells formed with pristine Spectracarb (SC) anode and cathode electrodes. Cycle operation at 1.2/0 V with recirculation of 1000 ml of 5 mM NaCl solution in a batch mode setup.
Figure 38B:
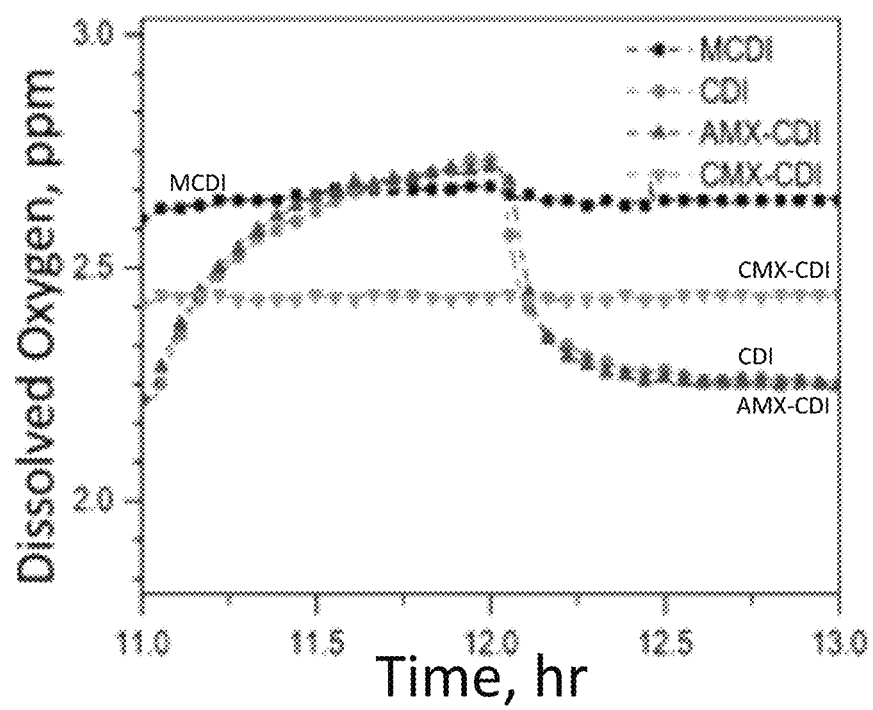
Figure 38C:
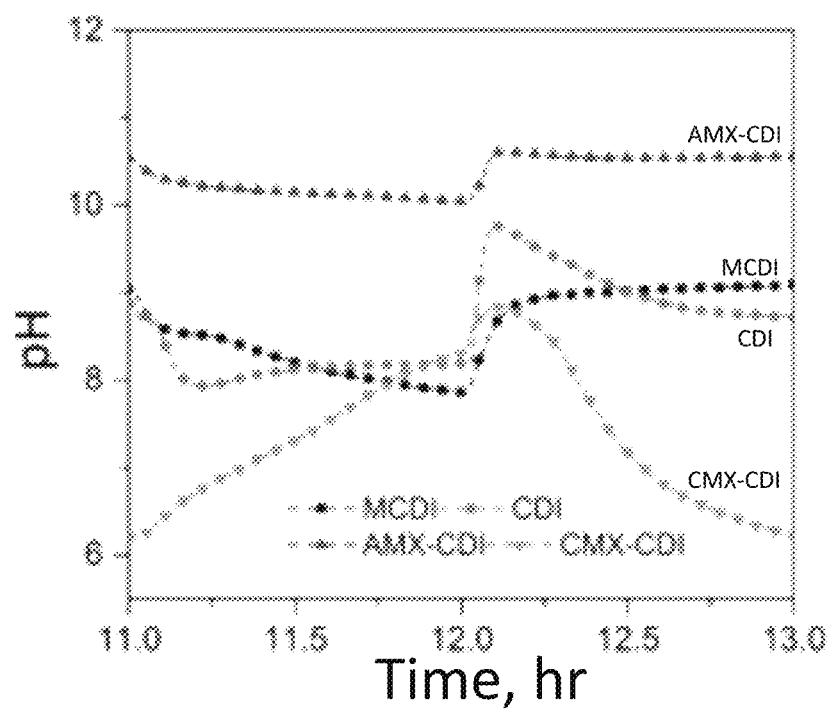
Figure 39A:
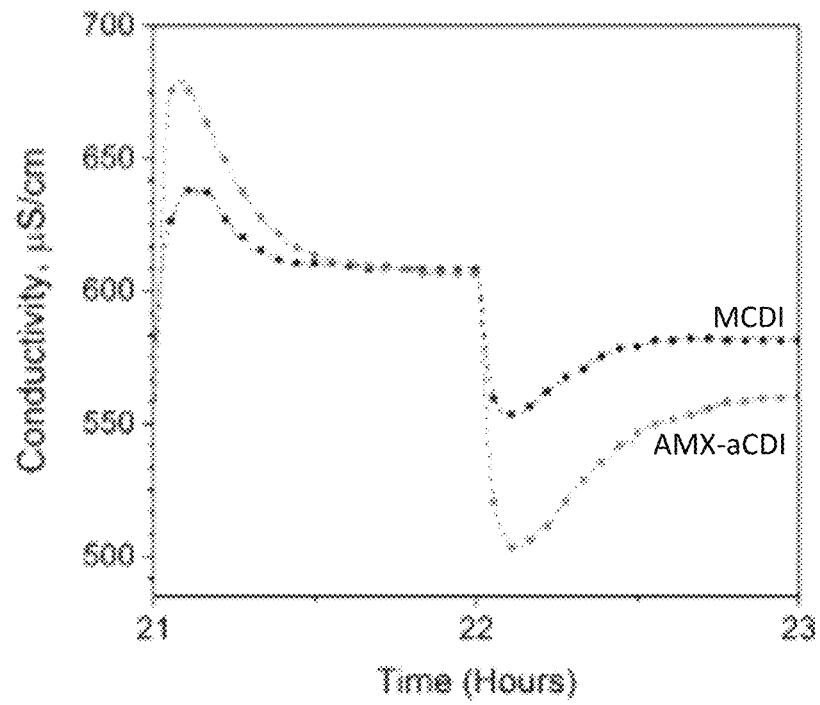
FIGS. 39A, 39B, 39C, and 39D show conductivity (FIG. 39A), dissolved oxygen (FIG. 39B), pH (FIG. 39C), and current (FIG. 39D) profiles of MCDI cell with pristine SC anode and cathode electrodes and anionic membrane only-asymmetric CDI (AMX-aCDI) cells formed with pristine SC anode and oxidized SC cathode electrodes. Cycle operation at 1.2/0 V with recirculation of 1000 ml of 5 mM NaCl solution in a batch mode setup.
Figure 39B:
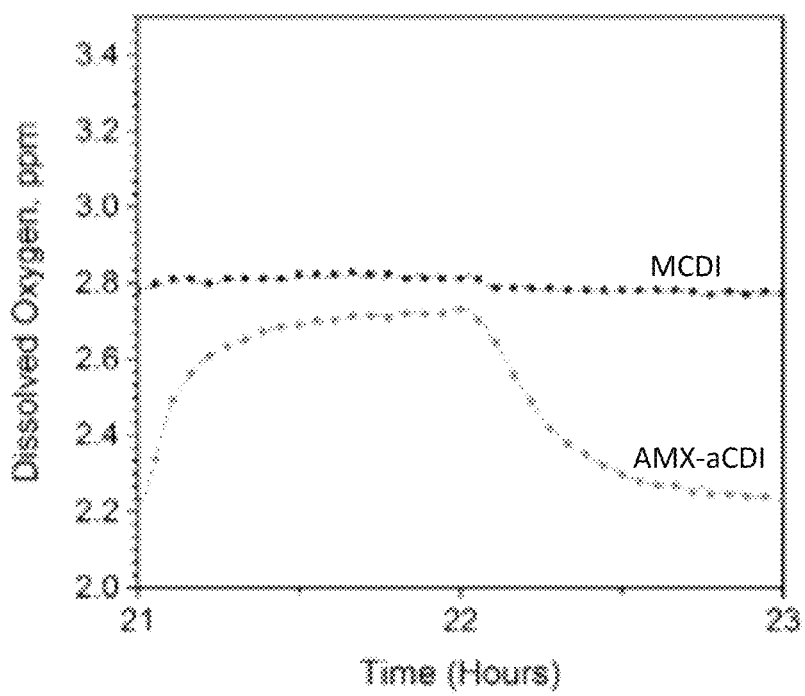
Figure 39C:
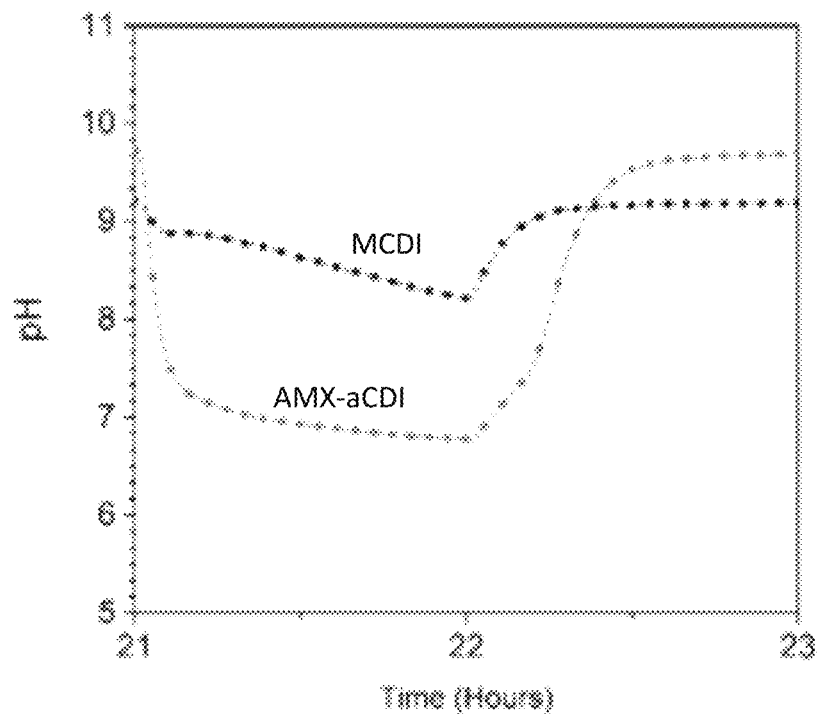
Figure 39D:
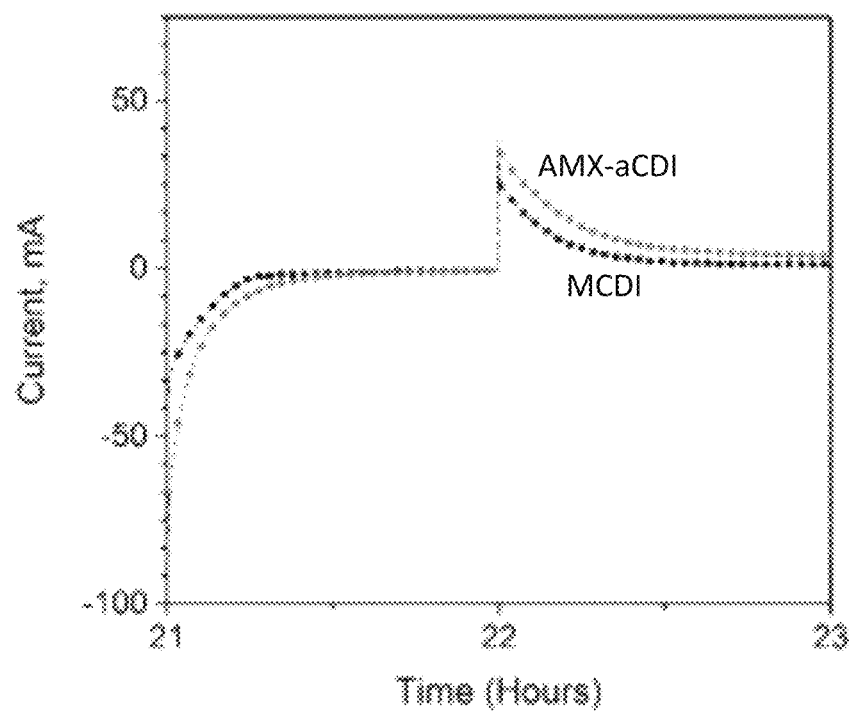
Figure 40A:
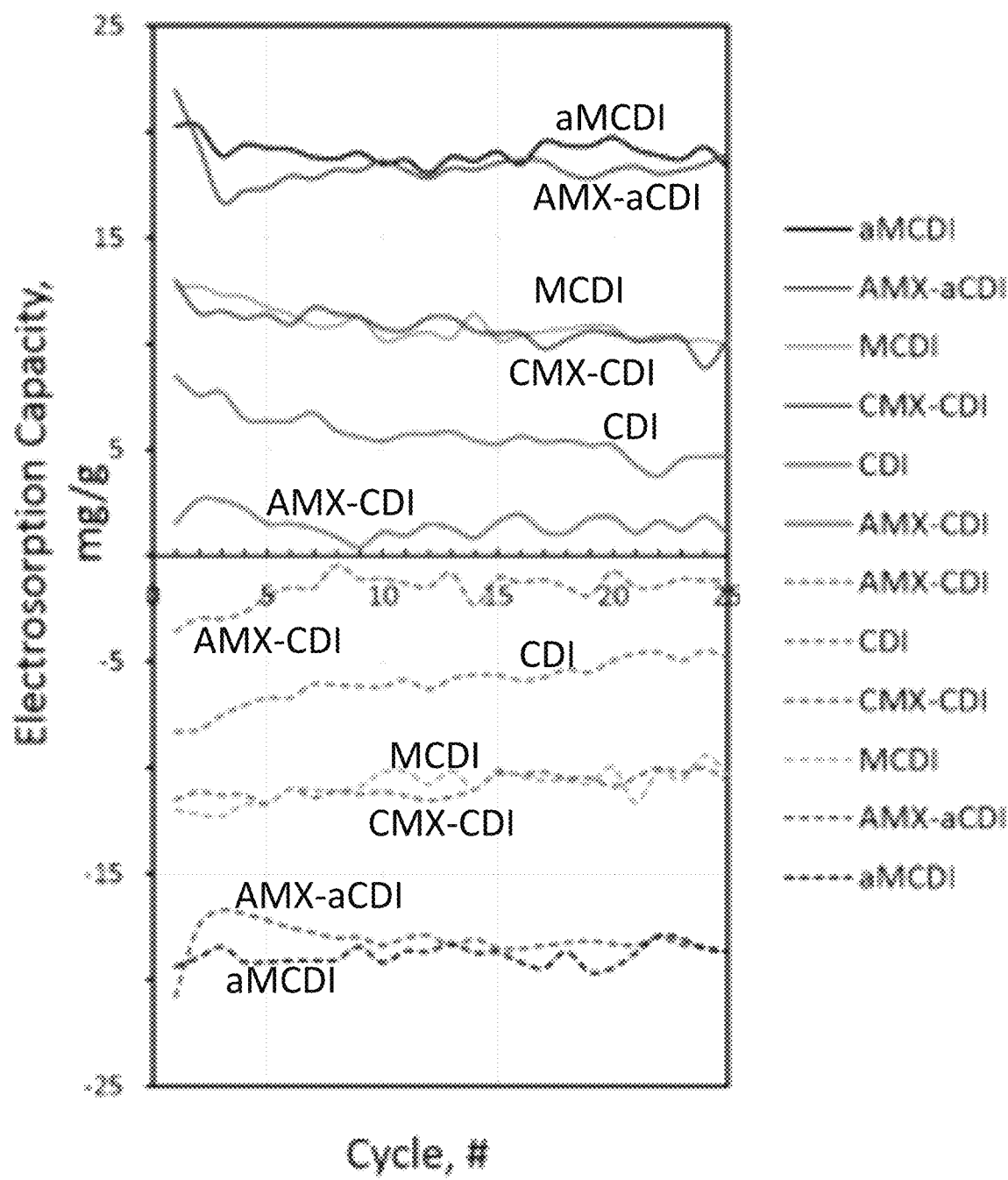
FIGS. 40A, 40B, and 40C show electrosorption capacity (FIG. 40A), electronic charge (FIG. 40B), and charge efficiency (FIG. 40C) of conventional MCDI, aMCDI, CDI, and single membrane CDI cells.
Figure 40B:
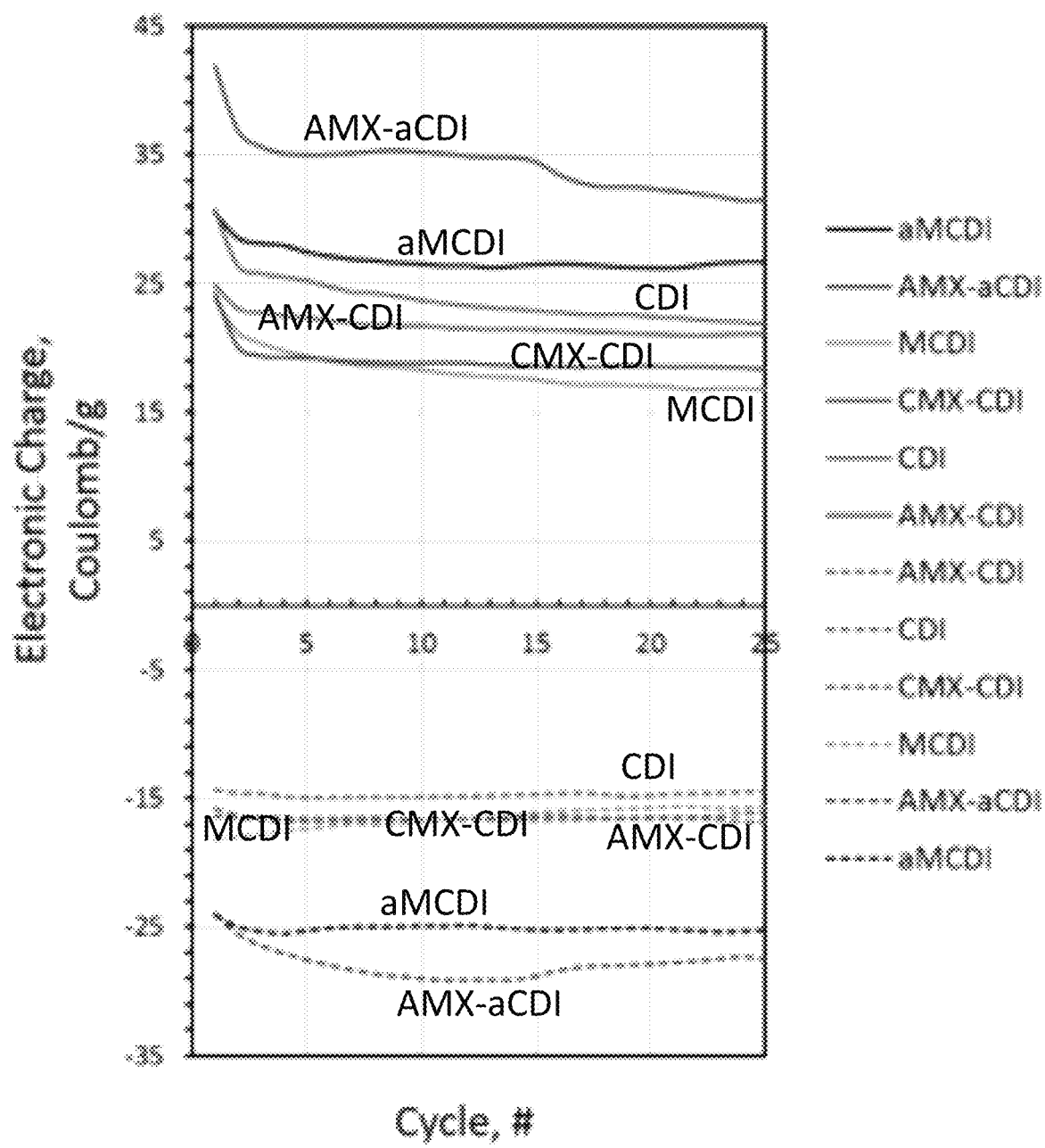
Figure 40C:
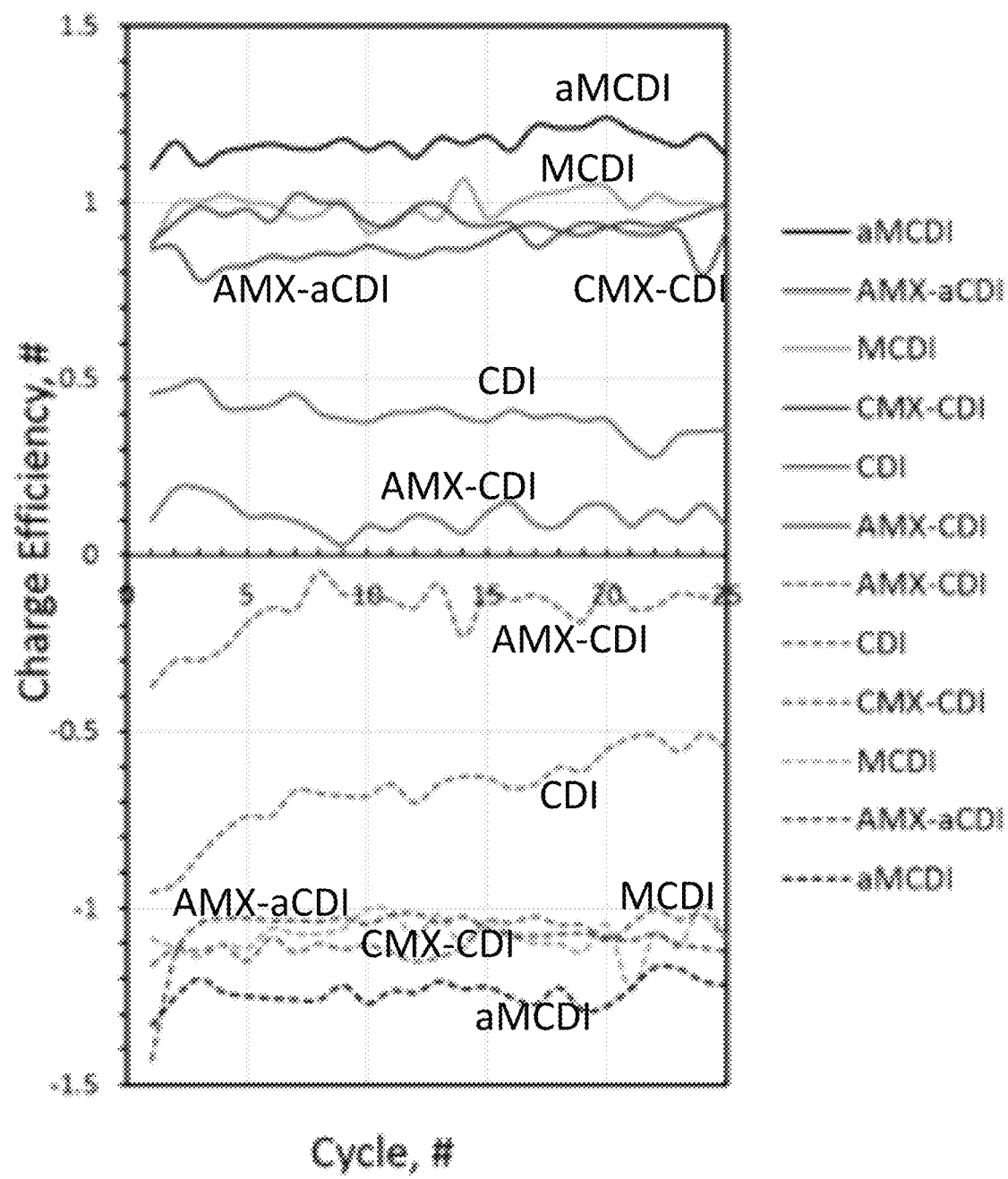

One major disadvantage with MCDI and aMCDI is the requirement for membrane pairs when forming separation cells. However, proper electrode $E_{PZC}$ position (i) to facilitate specific ion excess adsorption in the pore space and also (ii) to mitigate ion repulsion, is also possible using a single membrane aMCDI (i.e., one polarity of electrode(s) in a cell is covered with a membrane, and the other polarity of electrode(s) in that cell is not covered by a membrane). Such positioning of the $E_{PZC}$ can be sufficient both to boost and to maintain MCDI performance while at the same time providing cost savings in device fabrication. Four cell configurations were constructed with pristine SC anodes and cathodes including CDI, MCDI, CMX only CDI (CMX-CDI), and AMX only CDI (AMX-CDI). A pristine SC ($E_{PZC}$=−0.1 V) electrode provides an excess of anions at the short-circuit potential ($E_o$), which is also a limitation when that electrode is used as a cathode to adsorb cations at 1.2 V. For the single membrane CDI cells, the CMX membrane is used at the negative electrode, and an AMX membrane is used at the positive electrode. FIG. 38A shows that CMX-CDI is capable of providing similar conductivity decrease (i.e., increased ion adsorption) compared to a full MCDI cell. However, the AMX-CDI configuration did not yield any benefits, but suffered further performance loss, probably as a result of additional resistance at the membrane-electrode interface. MCDI was shown earlier to prevent or lessen $E_{PZC}$ relocation resulting from electrochemical reactions. The electrooxidation of the carbon anode is balanced by dissolved oxygen reduction at the cathode. The membrane starves the cathode of oxygen, thereby correspondingly limiting anodic oxidation. An in-situ probe was used to monitor oxygen response during cell operation, and as expected, when the cathode was covered with the CMX membrane, minimal perturbation is observed in the dissolved oxygen, and, given the similarity in $E_{PZC}$ s, performance is nearly identical with MCDI performance (FIGS. 38A and B). In contrast, for the AMX-CDI cell, performance was worse. Furthermore, as shown in FIG. 38C, the AMX-CDI cell showed the greatest influence of pH to measured conductivity; either high or low pH imply greater contribution of hydroxyl or hydronium ions to solution conductivity. Removing the cathode limitation by using an oxidized SC cathode greatly improves the performance of an AMX-CDI cell. This configuration with asymmetric electrode is denoted AMX-aCDI (FIGS. 39A-39D). Nonetheless, greater dissolved oxygen and pH perturbation are still observed when compared to a conventional MCDI cell. The long-term performance of the CDI, MCDI, aMCDI, CMX-CDI, AMX-CDI, and AMX-aCDI cells are compared in FIGS. 40A-40C and can be summarized as follows: The aMCDI possesses the highest capacity and efficiency, but similar performance can be achieved by the AMX-aCDI albeit at lower efficiency due to more limited mitigation of the parasitic electrochemical reaction as observed from the dissolved oxygen profiles. The CMX-CDI cell is capable of providing similar performance and efficiency to the standard MCDI cell, while the AMX-CDI displays the worst performance of all combinations.

Distinct from any previous work utilizing porous carbon in a capacitive deionization cell, the disclosed aMCDI processes (1) utilize electrode treatment to fabricate electrodes with dissimilar $E_{PZC}$s, (2) describe electrode $E_{PZC}$ positions and electrode configurations that lead to dramatic performance enhancement, (3) describe synergistic electrode $E_{PZC}$-membrane configurations that lead to improved deionization performance and salt adsorption capacity, and (4) demonstrate the utilization of $E_{PZC}$ and single membrane cell combinations for deionization. Also, the performance boosting procedure is not specific to a given type of pristine carbon electrode and can be adapted to various manufacturers', and structural types (e.g., cylindrical, fabric, planar, etc.), of electrodes as disclosed herein. These CDI and MCDI cells can be used for removing salt and other ionic content from any type of input stream, such as power plant wastewater, reservoir feeds for potable water purification and softening, sea water feeds for potable water purification and softening, laundry wastewater, feeds for laboratory water purification, and can be extended to other applications where salt- and/or other ion containing water needs to be deionized, purified, and/or softened. The inventions disclosed herein have broad commercial implications. Furthermore, the improved electrosorption capacity and charge efficiency achieved with the $E_{PZC}$ positioning methods disclosed herein can substantially reduce energy consumption during a deionization operation and lower overall device sizes.

Figure 41:
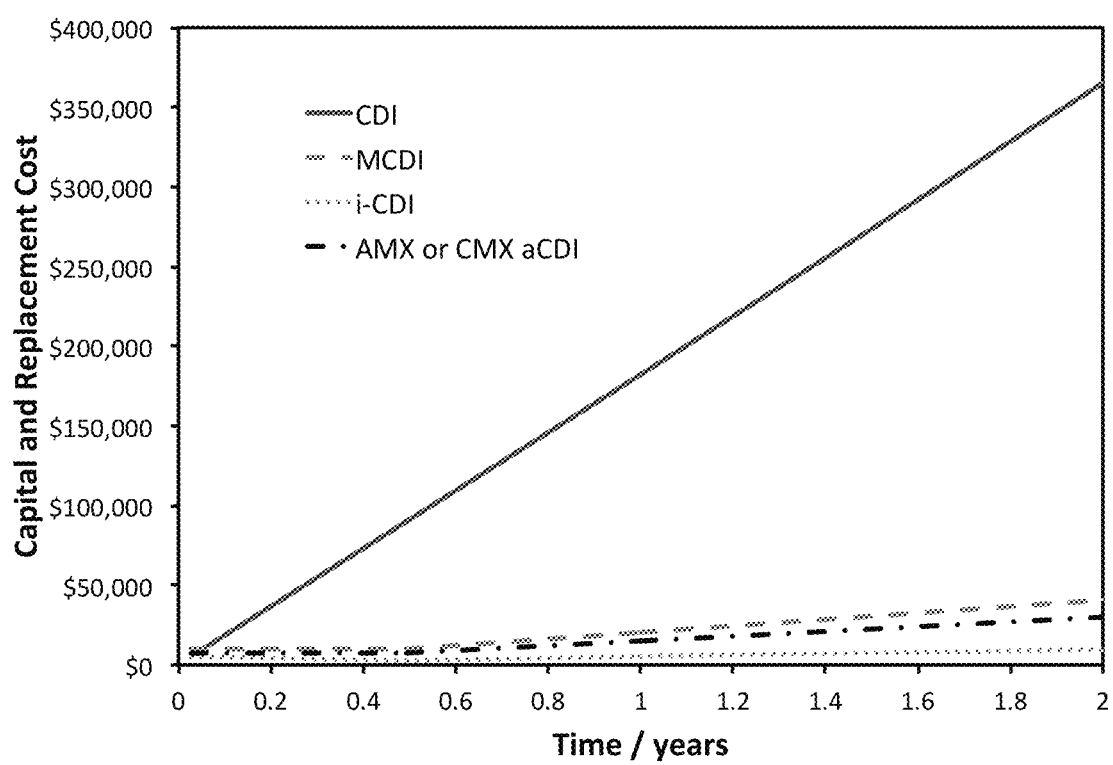
FIG. 41. Projected capital and replacement costs for CDI, MCDI, i-CDI, and AMX or CMX aCDI based on capital and replacement costs of $5,000, $10,000, $5,000, and $7,500, respectively. Device lifetimes for CDI, MCDI, i-CDI, and AMX or CMX aCDI of 10, 180, 365, and 180 days are used, respectively.

For comparison to CDI, if AMX-aCDI or CMX-aCDI cell were implemented with a separation lifetime of 180 days (compared to 10 days for conventional CDI shown previously), and the initial and replacement costs were $75,000 for the unit (somewhat higher than CDI or i-CDI due to the inclusion of ion exchange membranes), this would amount to a 2-year cost of $30,417, since the unit would need to be replaced every 180 days, a substantial improvement over conventional CDI, which had an estimated 2-year cost of $365,000 value. AMX or CMX-aCDI would be implemented instead of i-CDI when capital costs are less of an issue and device size and salt removal capacity are more important. This estimate does not take into account the salt adsorption capacity, which is still a crucial value, or the salt adsorption rate; i-CDI and AMX-MCDI/CMX-aCDI both outperform CDI and MCDI in those parameters. A plot is shown in FIG. 41, which depicts each technology cost as a function of time with initial estimates of $5,000 per unit for CDI and i-CDI, $10,000 per unit for MCDI, and $7,500 per unit for AMX-MCDI or CMX-MCDI. The projected separation lifetimes for CDI, MCDI, i-CDI, and AMX-MCDI or CMX-MCDI are 10 days, 180 days, 365 days, and 180 days, respectively.

Energy Recovery in CDI, i-CDI, aMCDI, or Other Capacitive-Based Separations

In all of the separation cells disclosed herein, when a cell is charged using an applied potential, charge will be stored at the electrode surface, regardless of the net ion separation from the bulk solution. This means that during the discharging process when the potential is short-circuited or reduced (desorption of ions in CDI, adsorption of ions in i-CDI), energy can be recovered in the form of electrical current. While there remain large resistive losses in more dilute salt solutions, energy recovery can still be quite substantial. By optimizing electrode surface chemistries and conductivities, salt adsorption/desorption processes can be matched with energy recovery scenarios (e.g., charging a capacitor, driving a dynamo, driving an inverter, driving an DC/DC converter, operating a pump) thereby optimizing the energy cost of the separation process. The surface chemistries noted herein can yield more optimal salt separation from solution, either at short-circuit conditions (i-CDI) or with an applied potential (aMCDI, AMX-aCDI, and CMX-aCDI), and can be combined with energy recovery operations by linking discharging and charging cells together. A DC/DC converter can be used to efficiently transfer this electrical energy and yield a more efficient combined water treatment/salt separation process.

Modulation of pH with Electrodes Possessing Differing Ion Adsorption Capacities

Figure 42:
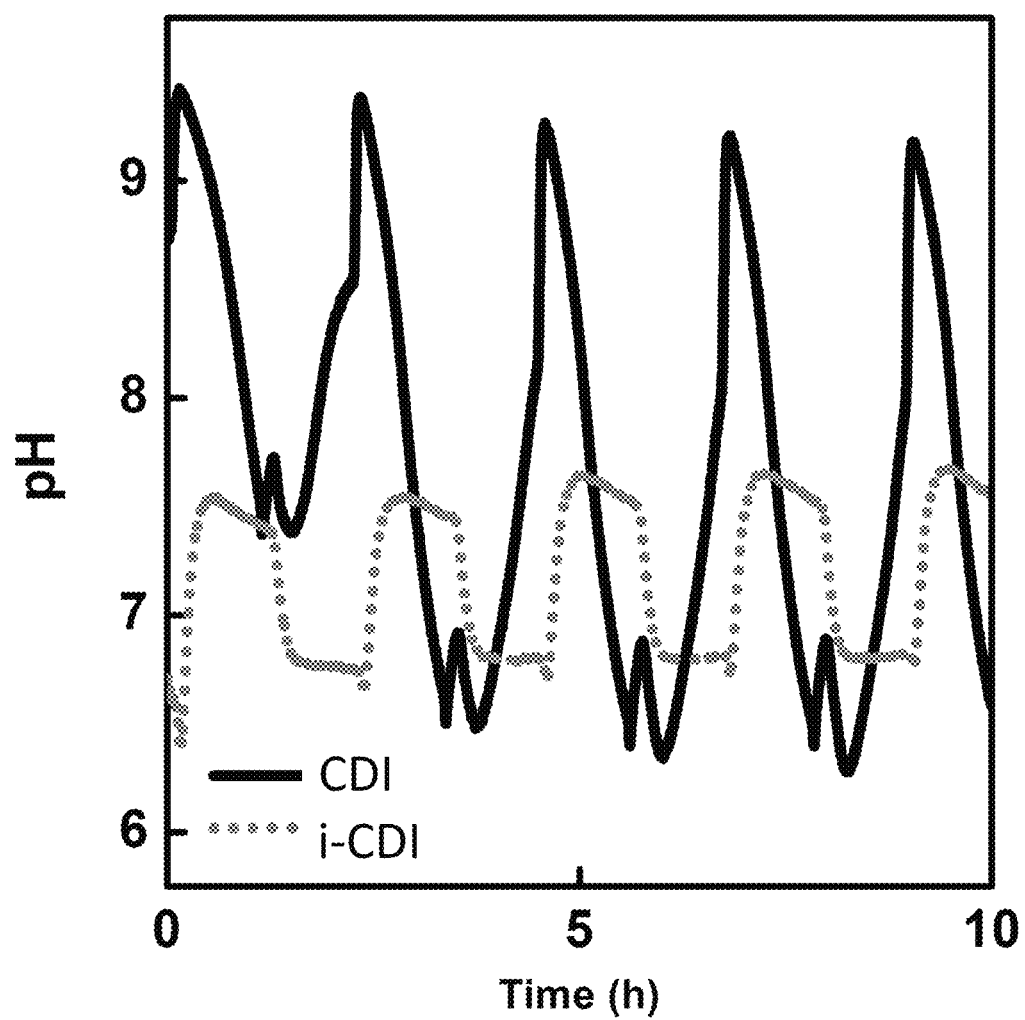
FIG. 42. pH fluctuation with and without an applied potential in both CDI (preferential anion adsorption) and i-CDI (no significant difference in ion adsorption at the anode and cathode) cells. Larger pH fluctuations are shown for the CDI cell where two similar surface charge enhanced electrodes are used.

Utilizing surface charge enhanced electrodes and purposely positioning the $E_{PZC}$ of an electrode can be used to effectively modulate the pH of an aqueous solution. For example, if two electrodes with positive enhanced surface charge (more negative $E_{PZC}$) are used, the pH under potential will increase with an applied potential and decrease when the cell is shorted. In conventional CDI cells, when pristine carbon electrodes are used, there will be a positive surface charge, meaning natural anion (e.g., chloride) adsorption. Therefore, the cathode will limit adsorption/separation using this CDI cell where only limited cation adsorption will take place at the cathode while substantial anion adsorption will take place at the anode. In the bulk solution, since more anions will be removed than cations, the pH will increase to maintain solution electroneutrality. The pH fluctuation for a CDI cell is shown in FIG. 42. Likewise, if two electrodes with negative enhanced surface charge were used, cation adsorption would be favored, and the pH would decrease under potential and increase when the cell was short-circuited. Finally, if similar amounts of anions and cations are removed from solution such as in i-CDI cells, pH fluctuations will be minimized. Example pH fluctuations for an i-CDI cell composed of oxidized anode electrodes and pristine cathode electrodes are also shown in FIG. 42. The pH fluctuations shown are much smaller than in a CDI cell.

Figure 43:
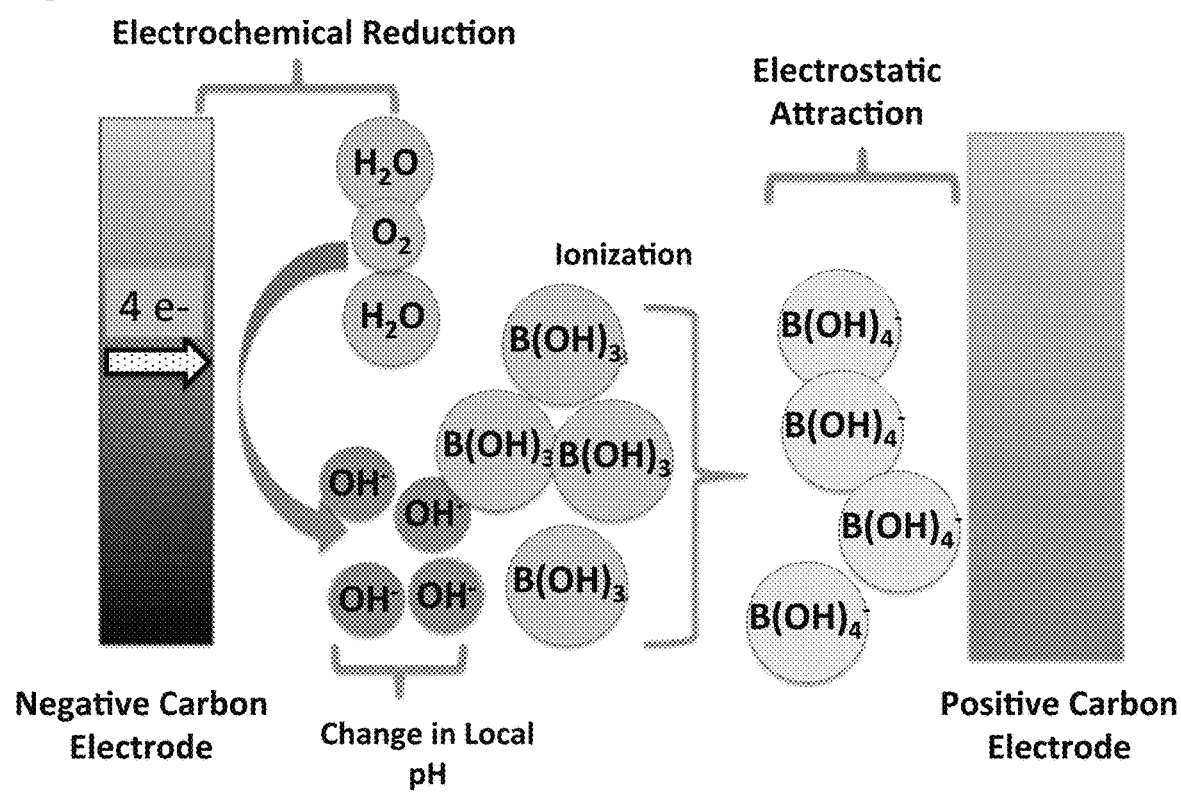
FIG. 43. Boron removal from solution by converting boron to borate through hydroxide creation (higher pH) and charged electrodes. The pH of the solution can be modulating through surface charged electrodes or through reduction/oxidation of dissolved species.

By modulating the pH of a solution, various separations can be accomplished that may be nearly impossible in other water treatment systems. For example, boron is a classically difficult compound to remove from solution since it is uncharged in neutral solutions and also not hydrated. Since it is not hydrated, it is more difficult for reverse osmosis membrane processes to remove it. However, if the pH is increased in a solution, boron will be ionized and can subsequently be separated using membrane or capacitive-based methods such as CDI, i-CDI, aMCDI, etc. In this manner, if the pH of a solution is increased using an applied potential and electrodes with positive surface charges or through oxygen reduction at the cathode, we can remove boron from solution as borate ions. Shown in FIG. 43 is a general schematic for boron conversion to borate using hydroxide creation at the cathode through oxygen reduction and subsequent separation from solution using charged electrodes.

The invention claimed is:

1. An electrostatic device in a structure comprising at least one inlet, at least one outlet, at least one anode, at least one cathode, a means of applying a short circuit or a user selectable DC constant voltage ("E+") or constant current to the at least one anode, a means of applying a short circuit or a user selectable DC constant voltage ("E−") or constant current to the at least one cathode, and an ionic solution admitted through the inlet and discharged through the outlet and that is deionized by contact with the at least one anode and the at least one cathode, wherein the location of the potential of zero charge ($E_{PZC}$) of the at least one anode has been shifted to an $E_{PZC}$ equal to or more positive than the E+ by modification of the anode surface to an increased $E_{PZC}$, wherein the location of the $E_{PZC}$ of the at least one cathode has been shifted to an $E_{PZC}$ equal to or more negative than the E− by modification of the cathode surface to a decreased $E_{PZC}$, wherein the device is configured to operate within a working voltage range selected from the group consisting of from 0.15 V up to 0.4 V between positive and negative $E_{PZC}$s, from 0.15 V up to 0.5 V between positive and negative $E_{PZC}$s, from 0.15 V up to 0.6 V between positive and negative $E_{PZC}$s, from 0.15 V up to 0.7 V between positive and negative $E_{PZC}$s, from 0.15 V up to 0.8 V between positive and negative $E_{PZC}$s, from 0.15 V up to 0.9 V between positive and negative $E_{PZC}$s, from 0.15 V up to 1.0 V between positive and negative $E_{PZC}$s, from 0.15 V up to 1.1 V between positive and negative $E_{PZC}$s, and from 0.15 V up to 1.25 V between positive and negative $E_{PZC}$s, and wherein the device is configured to maintain the selected working voltage window in operation for a duration of up to 1200 cycles.

2. The device of claim 1, wherein the modification of the anode results from a treatment selected from the group consisting of oxidation from heating in the presence of oxygen, by exposure to acid, exposure to electrochemical oxidation, covalent attachment of functional groups that are negatively charged when in contact with the ionic solution and without voltage applied to the anode, covalent attachment of silica functional groups, covalent attachment of sulfonic acid groups, and covalent attachment of any surface groups possessing net negative surface charges in aqueous solutions, and wherein the modification of the cathode results from a treatment selected from the group consisting of reduction by exposure to reducing treatment from heating in nitrogen, argon, or $H_2$, exposure to electrochemical reduction, covalent attachment of functional groups that are positively charged when in contact with the solution and without voltage applied to the cathode, covalent attachment of amine functional groups, covalent attachment of alumina surface species, and reduced carbon surfaces.

3. The device of claim 1 or 2 wherein the ionic solution to be deionized is an aqueous solution.

4. The device of claim 1 or 2 wherein the ionic solution to be deionized is an aqueous solution selected from the group consisting of power plant wastewater, power plant cooling water, laundry wastewater, water to be purified for human consumption, water to be purified for agriculture, water to be purified for horticulture, water to be purified for use in food, water to be softened, sea water to be purified for human consumption, water to be purified for laboratory use, brackish water to be purified for human consumption or agriculture use, and water to be purified for medical use.

5. The device of claim 1, wherein the means of applying a short circuit or a user selectable DC constant voltage or constant current to the at least one anode and to the at least one cathode is a switch.

6. The device of claim 1, wherein when an anode and corresponding cathode are shorted, anions are adsorbed on the cathode, and cations are adsorbed on the corresponding anode.

7. An electrostatic device in a structure comprising at least one inlet, at least one outlet, at least one anode, at least one cathode, a means of applying a short circuit or a user selectable DC constant voltage ("E+") or constant current to the at least one anode, a means of applying a short circuit or a user selectable DC constant voltage ("E−") or constant current to the at least one cathode, and an ionic solution admitted through the inlet and discharged through the outlet and that is deionized by contact with the at least one anode and the at least one cathode, wherein the location of the potential of zero charge ($E_{PZC}$) of the at least one anode has been shifted to an $E_{PZC}$ more positive than the E+ by modification of the anode surface to an increased $E_{PZC}$, wherein the location of the $E_{PZC}$ of the at least one cathode has been shifted to an $E_{PZC}$ more negative than the E− by modification of the cathode surface to a decreased $E_{PZC}$, wherein, the device is configured to operate within a working voltage range selected from the group consisting of from 0.15 V up to 0.6 V between positive and negative $E_{PZC}$s and from 0.15 V up to 0.8 V between positive and negative $E_{PZC}$s, and wherein the device is configured to maintain the selected working voltage window in operation for a duration of up to 128 cycles.

8. The device of claim 7, wherein the modification of the anode results from a treatment selected from the group consisting of electro-oxidation, nitric acid treatment, tetraethyl orthosilicate treatment, and high temperature gas phase oxidative treatment.

9. An electrostatic device in a structure comprising at least one inlet, at least one outlet, at least one anode, at least one cathode, a means of applying a short circuit or a user selectable DC constant voltage ("E+") or constant current to the at least one anode, a means of applying a short circuit or a user selectable DC constant voltage ("E−") or constant current to the at least one cathode, and an ionic solution admitted through the inlet and discharged through the outlet and that is deionized by contact with the at least one anode and the at least one cathode, wherein the location of the potential of zero charge ($E_{PZC}$) of the at least one anode has been shifted to an $E_{PZC}$ equal to or more positive than the E+ by modification of the anode surface to an increased $E_{PZC}$, wherein the location of the $E_{PZC}$ of the at least one cathode has been shifted to an $E_{PZC}$ equal to or more negative than the E− by modification of the cathode surface to a decreased $E_{PZC}$, wherein the device is configured to operate within a working voltage range selected from the group consisting of from 0.15 V up to 0.8 V between positive and negative $E_{PZC}$s, from 0.15 V up to 1.0 V between positive and negative $E_{PZC}$s, from 0.15 V up to 1.1V between positive and negative $E_{PZC}$s, and from 0.15 V up to 1.25 V between positive and negative $E_{PZC}$s, and wherein the device is configured to maintain the selected working voltage window in operation for a duration of up to 128 cycles.

10. The device of claim 9, wherein the modification of the anode results from a treatment selected from the group consisting of oxidation from exposure to acid, and coating with silica, and wherein the modification of the cathode results from a treatment selected from the group consisting of heating in a silicone oil bath with ethylenediamine, reducing treatments, and coating with materials such as alumina, magnesia, and alumina-magnesia.

11. An electrostatic device in a structure comprising at least one inlet, at least one outlet, at least one anode, at least one cathode, a means of applying a short circuit or a user selectable DC constant voltage ("E+") or constant current to the at least one anode, a means of applying a short circuit or a user selectable DC constant voltage ("E−") or constant current to the at least one cathode, and an ionic solution admitted through the inlet and discharged through the outlet and that is deionized by contact with the at least one anode and the at least one cathode, wherein the location of the potential of zero charge ($E_{PZC}$) of the at least one anode has been shifted to an $E_{PZC}$ equal to or more positive than the E+ by modification of the anode surface to an increased $E_{PZC}$, wherein the location of the $E_{PZC}$ of the at least one cathode has been shifted to an $E_{PZC}$ equal to or more negative than the E− by modification of the cathode surface to a decreased $E_{PZC}$, wherein the device is configured to maintain salt adsorption capacity of at least 50% of peak salt adsorption capacity in operation for a duration of up to 545 cycles, and wherein the difference between positive and negative $E_{PZC}$s is from 0.15 V up to 1.25 V.

12. An electrostatic device in a structure comprising at least one inlet, at least one outlet, at least one anode, at least one cathode, a means of applying a short circuit or a user selectable DC constant voltage ("E+") or constant current to the at least one anode, a means of applying a short circuit or a user selectable DC constant voltage ("E−") or constant current to the at least one cathode, and an ionic solution admitted through the inlet and discharged through the outlet and that is deionized by contact with the at least one anode and the at least one cathode, wherein the location of the potential of zero charge ($E_{PZC}$) of the at least one anode has been shifted to an $E_{PZC}$ equal to or more positive than the E+ by modification of the anode surface to an increased $E_{PZC}$, wherein the location of the $E_{PZC}$ of the at least one cathode has been shifted to an $E_{PZC}$ equal to or more negative than the E− by modification of the cathode surface to a decreased $E_{PZC}$, wherein the device is configured to maintain charge efficiency of at least 50% of peak charge efficiency in operation for a duration of up to 545 cycles, and wherein the difference between positive and negative $E_{PZC}$s is from 0.15 V up to 1.25 V.

13. An electrostatic device in a structure comprising at least one inlet, at least one outlet, at least one electrically conductive anode, at least one electrically conductive cathode, a power supply configured to operate under computer control to apply a short circuit or a user selectable DC constant voltage ("E+") or constant current to the at least one anode and to apply a short circuit or a user selectable DC constant voltage ("E−") or constant current to the at least one cathode, and an ionic solution admitted through the inlet and discharged through the outlet and that is deionized by contact with the at least one anode and the at least one cathode, wherein the location of the potential of zero charge ($E_{PZC}$) of the at least one anode has been shifted to an $E_{PZC}$ equal to or more positive than the E+ by modification of the anode surface to an increased $E_{PZC}$, wherein the location of the $E_{PZC}$ of the at least one cathode has been shifted to an $E_{PZC}$ equal to or more negative than the E− by modification of the cathode surface to a decreased $E_{PZC}$, and wherein the difference between positive and negative $E_{PZC}$s is from 0.15 V up to 1.25 V.

* * * * *